US009559388B2

(12) United States Patent
Lee et al.

(10) Patent No.: US 9,559,388 B2
(45) Date of Patent: Jan. 31, 2017

(54) ELECTROCHEMICAL SYSTEMS CONFIGURED TO HARVEST HEAT ENERGY

(71) Applicants: Massachusetts Institute of Technology, Cambridge, MA (US); The Board of Trustees of the Leland Stanford Junior University, Stanford, CA (US)

(72) Inventors: Seok Woo Lee, Palo Alto, CA (US); Yuan Yang, Cambridge, MA (US); Hadi Ghasemi, Boston, MA (US); Gang Chen, Carlisle, MA (US); Yi Cui, Stanford, CA (US)

(73) Assignees: Massachusetts Institute of Technology, Cambridge, MA (US); The Board of Trustees of the Leland Staford Junior University, Stanford, CA (US)

( * ) Notice: Subject to any disclaimer, the term of this patent is extended or adjusted under 35 U.S.C. 154(b) by 0 days.

(21) Appl. No.: 14/308,669

(22) Filed: Jun. 18, 2014

(65) Prior Publication Data
US 2015/0099150 A1  Apr. 9, 2015

Related U.S. Application Data

(60) Provisional application No. 61/883,125, filed on Sep. 26, 2013, provisional application No. 61/864,056, (Continued)

(51) Int. Cl.
*H01M 6/24* (2006.01)
*H01M 10/42* (2006.01)
(Continued)

(52) U.S. Cl.
CPC ........... *H01M 10/4242* (2013.01); *H01M 4/38* (2013.01); *H01M 4/48* (2013.01); (Continued)

(58) Field of Classification Search
CPC .. H01M 10/4242; H01M 10/66; H01M 10/65; H01M 10/61; H01M 10/613; H01M 10/615; H01M 10/617; H01M 10/38; H01M 10/48; H01M 10/58; H01M 10/583
See application file for complete search history.

(56) References Cited

U.S. PATENT DOCUMENTS 3,318,734 A  5/1967 McCully
3,374,120 A  3/1968 Lawson
(Continued)

OTHER PUBLICATIONS

Agrisuelas et al., Usefulness of F(dm/dQ) Function for Elucidating the Ions Role in PB Films. J. Electrochem. Soc. 2007 . 154 (6): F134-F140. doi: 10.1149/1.2728038.
(Continued)

*Primary Examiner* — Raymond Alejandro
(74) *Attorney, Agent, or Firm* — Wolf, Greenfield & Sacks, P.C.

(57) ABSTRACT

Electrochemical systems for harvesting heat energy, and associated electrochemical cells and methods, are generally described. The electrochemical cells can be configured, in certain cases, such that at least a portion of the regeneration of the first electrochemically active material is driven by a change in temperature of the electrochemical cell. The electrochemical cells can be configured to include a first electrochemically active material and a second electrochemically active material, and, in some cases, the absolute value of the difference between the first thermogalvanic coefficient of the first electrochemically active material and
(Continued)

the second thermogalvanic coefficient of the second electrochemically active material is at least about 0.5 millivolts/Kelvin.

15 Claims, 32 Drawing Sheets

Related U.S. Application Data filed on Aug. 9, 2013, provisional application No. 61/847,025, filed on Jul. 16, 2013, provisional application No. 61/836,593, filed on Jun. 18, 2013.

(51) Int. Cl.
| | |
|---|---|
| H01M 4/58 | (2010.01) |
| H01M 4/583 | (2010.01) |
| H01M 10/66 | (2014.01) |
| H01M 4/38 | (2006.01) |
| H01M 4/48 | (2010.01) |

(52) U.S. Cl.
CPC .............. *H01M 4/58* (2013.01); *H01M 4/583* (2013.01); *H01M 10/66* (2015.04)

(56) References Cited

U.S. PATENT DOCUMENTS

| | | | |
|---|---|---|---|
| 3,741,809 A | 6/1973 | Anbar | |
| 4,090,012 A | 5/1978 | Elliott et al. | |
| 4,410,606 A | 10/1983 | Loutfy et al. | |
| 5,470,669 A * | 11/1995 | Ludwig ................ | H01M 8/182 |
| | | | 136/206 |
| 7,943,250 B1 | 5/2011 | Johnson et al. | |
| 7,981,556 B2 | 7/2011 | Shiroma et al. | |
| 2006/0134515 A1* | 6/2006 | Kumashiro .............. | H01G 9/22 |
| | | | 429/209 |
| 2009/0123810 A1 | 5/2009 | Devoe et al. | |
| 2009/0226779 A1 | 9/2009 | Ohkawara | |
| 2011/0076542 A1 | 3/2011 | Farmer | |

OTHER PUBLICATIONS

Agrisuelas et al., Insights on the Mechanism of Insoluble-to-Soluble Prussian Blue Transformation. Journal of the Electrochemical Society. J. Electrochem. Soc. 2009. 156(10): p. 149-p. 156. doi: 10.1149/1.3177258.

Anderson et al., Thermally and photochemically regenerative electrochemical systems. Adv in Chem Series. Jan. 1, 1967. 64 (15): 213-276. Doi:10.1021/ba-1967-0064.ch015.

Bell et al., Cooling, heating, generating power, and recovering waste heat with thermoelectric systems. Sci. Sep. 12, 2008. 321 (5895): 1457-61. DOI:10.1126/science.1158899.

Biswas et al., High-performance bulk thermoelectrics with all-scale hierarchical architectures. Nature. Sep. 20, 2012;489(7416):414-8. doi: 10.1038/nature11439. Erratum in: Nature. Oct. 25, 2012;490(7421):570.

Chu et al., Opportunities and challenges for a sustainable energy future. Nature. Aug. 16, 2012. 488 (7411):294-303. doi: 10.1038/nature11475.

Debethune et al., The temperature coefficients of electrode potentials—the isothermal and thermal coefficients—the standard ionic entropy of electrochemical transport of the hydrogen ion. J. Electrochem. Soc. 1959. 106(7), 616-625. doi: 10.1149/1.2427448.

Disalvo et al, Thermoelectric cooling and power generation. Science. Jul. 30, 1999;285(5428):703-6. DOI:10.1126/science.285. 5428.703.

Gunawan et al., Liquid thermoelectrics: review of recent and limited new data of thermogalvanic cell experiments. Nanoscale Microscale Thermophys Engineering. Feb. 10, 2013. 17(4). 304-23. Published Sep. 5, 2013. DOI:10.1080/15567265.2013.776149.

Gur et al., Engineering. Searching for a better thermal battery. Science. Mar. 23, 2012; 335(6075):1454-5. doi: 10.1126/science. 1218761.

Hesson et al., "Thermodynamics and Thermal Efficiencies of Thermally Regenerative Bimetallic and Hydride EMF Cell Systems," in Regenerative EMF Cells. American Chemical Society. 1967. 64: 82-104.

Hu et al., Harvesting waste thermal energy using a carbon-nanotube-based thermo-electrochemical cell. Nano Lett. Mar. 10, 2010;10(3):838-46. doi: 10.1021/n1903267n.

Itaya et al., Catalysis of the reduction of molecular-oxygen to water at Prussian blue modified electrodes. J. Am Chem Soc. Jun. 1984. 106(12): 3423-9. DOI: 10.1021/ja00324a007.

Kraemer et al., High-performance flat-panel solar thermoelectric generators with high thermal concentration. Nat Mater. May 1, 2011;10(7):532-8. doi: 10.1038/nmat3013.

Kuzminskii et al., Thermoelectric effects in electrochemical systems. Nonconventional thermogalvanic cells. J. Power Sources. Dec. 1994. 52(2) 231-42. doi:10.1016/0378-7753(94)02015-9.

Liu et al., Thermoelectric property studies on Cu-doped n-type CuxBi2Te2.7Se0.3 nanocomposites. Adv Energy Mater. Jul. 2011. 1(4): 577-87. DOI: 10.1002/aenm.201100149. Epub Jun. 9, 2011.

Lu et al., Prussian blue: a new framework of electrode materials for sodium batteries. Chem Commun (Camb). Jul. 4, 2012;48(52):6544-6. doi: 10.1039/c2cc31777j. Epub May 24, 2012.

Mortimer et al., Electrochemical polychromicity in iron hexacyanoferrate films, and a new film form of ferric ferricyanide. Journal of Electroanalytical Chemistry. Aug. 10, 1983. 151(1-2): 133-47. doi:10.1016/S0022-0728(83)80429-X.

Paradiso et al., Energy scavenging for mobile and wireless electronics. IEEE CS and IEEE ComSoc. Pervas. Comput. Jan.-Mar. 2005. 4: 18-27.

Pasta et al. A high-rate and long cycle life aqueous electrolyte battery for grid-scale energy storage. Nat. Commun. Oct. 23, 2012. 3: 1149-55. doi:10.1038/ncomms2139.

Pharr et al., Infrared spectroelectrochemical analysis of adsorbed hexacyanoferrate species formed during potential cycling in the ferrocyanide/ferricyanide redox couple. Anal Chem. Nov. 1997. 69(22):4673-9. DOI: 10.1021/ac9611201.

Poudel et al., High-thermoelectric performance of nanostructured bismuth antimony telluride bulk alloys. Science. May 2, 2008;320(5876):634-8. doi: 10.1126/science.1156446. Epub Mar. 20, 2008.

Quickenden et al., A review of power-generation in aqueous thermogalvanic cells. J of the Electrochem Soc. Apr. 5, 1995. 142(11): 3985-94. doi: 10.1149/1.2048446. Epub Nov. 1, 1995.

Rattner et al., Energy harvesting, reuse and upgrade to reduce primary energy usage in the USA. Energy. 2011. 36(10): 6172-83.

Rosi et al., Thermoelectricity and thermoelectric power generation. Solid-State Electronics. 1968. 11: 833-68.

Snyder et al., Complex thermoelectric materials. Nat Mater. Feb. 2008;7(2):105-14. doi: 10.1038/nmat2090.

Stilwell et al., Electrochemical studies of the factors influencing the cycle stability of prussian blue films. Journal of Applied Electrochemistry. Apr. 1992. 22(4): 325-31.

Tchanche et al., Low-grade heat conversion into power using organic Rankine cycles—A review of various applications. Renewable & Sustainable Energy Reviews. 2011. 15: 3963-79.

Wang et al., Nanotechnology-enabled energy harvesting for self-powered micro-/nanosystems. Angew Chem Int Ed Engl. Nov. 19, 2012;51(47):11700-21. doi: 10.1002/anie.201201656. Epub Nov. 4, 2012. Review.

Wessells et al., Copper hexacyanoferrate battery electrodes with long cycle life and high power. Nat Commun. Nov. 22, 2011;2:550. doi:10.1038/ncomms1563.

Wessells et al., The effect of insertion species on nanostructured open framework hexacyanoferrate battery electrodes. J. Electrochem. Soc. 2012. 159:A98-A103.

Xu et al., Self-powered nanowire devices. Nat Nanotechnol. May 2010;5(5):366-73. doi: 10.1038/nnano.2010.46. Epub Mar. 28, 2010.

(56) References Cited

OTHER PUBLICATIONS

Zebarjadi et al. Perspectives on thermoelectrics: from fundamentals to device applications. Energy & Environmental Science. 2012. 5: 5147-62. DOI: 10.1039/C1EE02497C Epub Nov. 23, 2011.

Zhao et al., Ultralow thermal conductivity and high thermoelectric figure of merit in SnSe crystals. Nature. Apr. 17, 2014;508(7496):373-7. doi: 10.1038/nature13184.

International Preliminary Report on Patentability for Application No. PCT/US2014/043047 mailed Dec. 30, 2015.

International Search Report and Written Opinion for PCT/US2014/043047 mailed Mar. 13, 2015.

Lee et al., An electrochemical system for efficiently harvesting low-grade heat energy. Nat Commun. May 21, 2014;5:3942. DOI: 10.1038/ncomms4942.

Yang et al., Charging-free electrochemical system for harvesting low-grade thermal energy. Proc Natl Acad Sci U S A. Dec. 2, 2014;111(48):17011-6.

Chum et al. Review of thermally regenerative electrochemical systems. Solar Energy Research Institute, Golden, Colorado. Apr. 1981; vol. 2, 226 pages.

Hammond et al., An electrochemical heat engine for direct solar energy conversion. Solar Energy. 1979;23:443-9.

\* cited by examiner

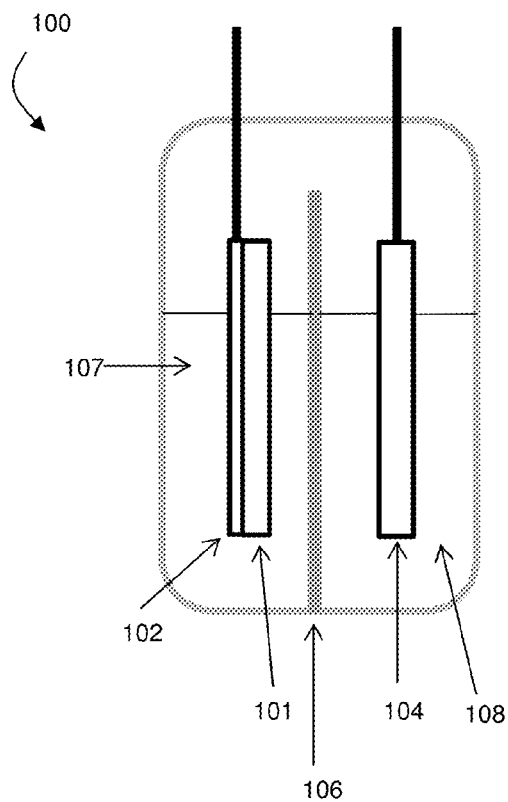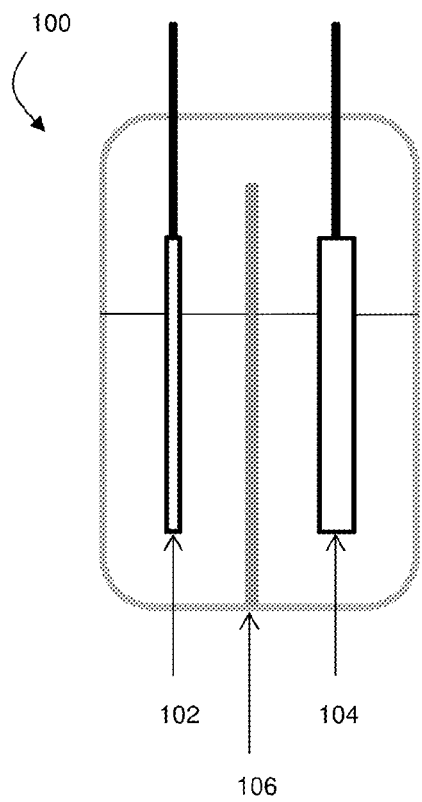
*FIG. 1A*   *FIG. 1B*

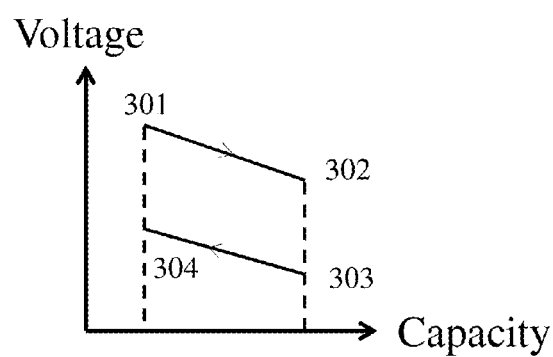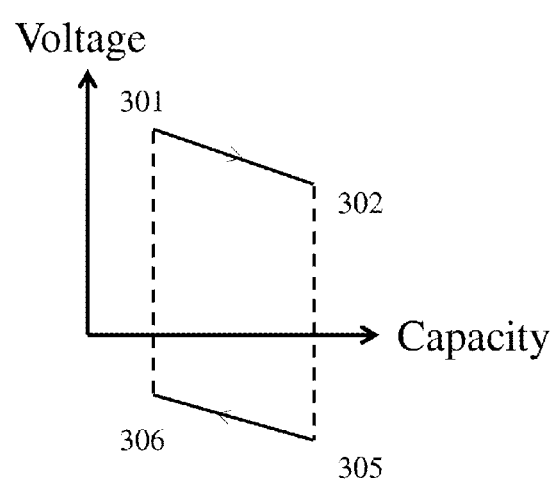
*FIG. 3A*  *FIG. 3B*

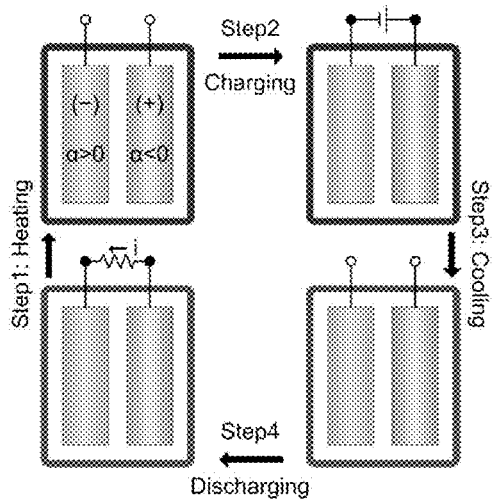
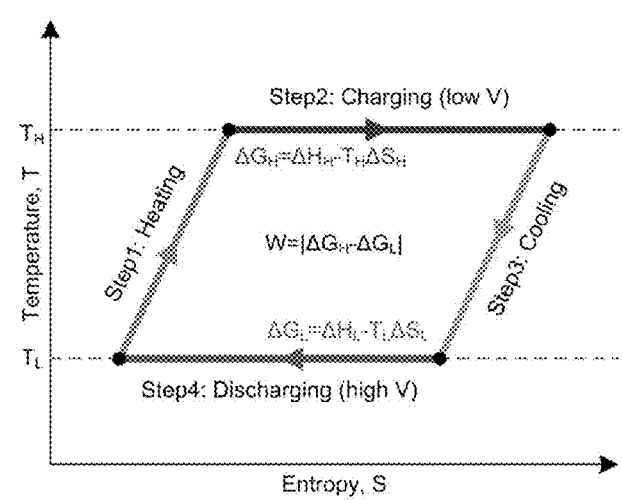
*FIG. 8A*          *FIG. 8B*

ELECTROCHEMICAL SYSTEMS CONFIGURED TO HARVEST HEAT ENERGY

RELATED APPLICATIONS

This application claims priority under 35 U.S.C. §119(e) to U.S. Provisional Patent Application Ser. No. 61/836,593, filed Jun. 18, 2013, and entitled "An Electrochemical System for Highly Efficient Harvesting of Low-Grade Heat Energy"; U.S. Provisional Patent Application Ser. No. 61/847,025, filed Jul. 16, 2013, and entitled "Electrochemical Systems and Methods for Harvesting Heat Energy"; U.S. Provisional Patent Application Ser. No. 61/864,056, filed Aug. 9, 2013, and entitled "Electrochemical Systems and Methods for Harvesting Heat Energy"; and U.S. Provisional Patent Application Ser. No. 61/883,125, filed Sep. 26, 2013, and entitled "Electrochemical Systems and Methods for Harvesting Heat Energy," each of which is incorporated herein by reference in its entirety for all purposes.

STATEMENT OF GOVERNMENT SUPPORT

This invention was made with government support under Contract Nos. DE-SC0001299, DE-FG02-09ER46577, DE-EE0005806, and DE-AC02-76SF00515 awarded by the U.S. Department of Energy and under Contract No. FA9550-11-1-0174 awarded by the Air Force Office of Scientific Research. The government has certain rights in the invention.

TECHNICAL FIELD

Electrochemical systems for harvesting heat energy, and associated electrochemical cells and methods, are generally described.

BACKGROUND

Thermally regenerative electrochemical systems (TRES) are systems in which heat is converted into electricity in an electrochemical heat engine. The heat recovery strategy in TRES is based on the temperature dependence of the electrochemical potential of the system components. For the half reaction, $A + n\ e^- \rightarrow B$, the thermogalvanic coefficient $\alpha$ is defined as:

$$\alpha = \frac{\partial V}{\partial T} = \frac{\Delta S_{A,B}}{nF} \quad (1)$$

where V is the electrode potential, T is temperature, n is the number of electrons transferred in the reaction, F is Faraday's constant, and $\Delta S_{A,B}$ is the partial molar entropy change for the half cell reaction at isothermal conditions. For the full cell reaction, $A + B \rightarrow C + D$ (discharge), the thermogalvanic coefficient $\alpha$ is defined as:

$$\alpha = \frac{\partial E}{\partial T} = -\frac{1}{nF}\frac{\partial \Delta G}{\partial T} = \frac{\Delta S}{nF} \quad (2)$$

where E is the full cell voltage and $\Delta G$ and $\Delta S$ are the change of partial molar Gibbs free energy and partial molar entropy, respectively, in the full cell reaction.

Generally, the voltage of the electrochemical cell depends on temperature; thus, a thermodynamic cycle can be constructed by discharging the electrochemical cell at $T_1$ and charging the electrochemical cell at $T_2$. If the charging voltage at $T_2$ is lower than the discharging voltage at $T_1$, net energy is produced by the voltage difference, similar to a thermomechanical engine whose theoretical efficiency is limited by Carnot efficiency.

Traditional TRES are often impractical, as such systems must often be operated at conditions that are incompatible with many processes in which heat recovery would be useful. Improved systems and associated methods would be desirable.

SUMMARY

Electrochemical cells, electrochemical systems, and electrochemical methods for harvesting heat energy are generally described. Certain embodiments relate to electrochemically harvesting low-grade heat energy using electrochemical cells and related electrochemical systems. The subject matter of the present invention involves, in some cases, interrelated products, alternative solutions to a particular problem, and/or a plurality of different uses of one or more systems and/or articles.

Certain embodiments relate to electrochemical cells comprising a first electrode comprising a first electrochemically active material and a second electrode comprising a second electrochemically active material.

In some embodiments, the electrochemical cell is configured to be discharged at a discharge voltage and at a discharge temperature at or below about 200° C. such that the first electrochemically active material is at least partially electrochemically consumed. In some embodiments, the electrochemical cell is configured to regenerate electrochemically active material from a product of at least a portion of electrochemically active material consumed during discharge at a regeneration voltage that is at least about 5 mV lower than the discharge voltage and at a regeneration temperature that is different than the discharge temperature and at or below about 200° C. In certain cases, at least one of the first and second electrodes comprises an electrochemically active material that is in a solid phase in both a reduced state and an oxidized state.

In some embodiments, the electrochemical cell is configured to be discharged at a discharge temperature such that the first electrochemically active material is at least partially electrochemically consumed. In some cases, the electrochemical cell is configured to regenerate electrochemically active material from a product of at least a portion of electrochemically active material consumed during discharge via a non-chemical-reaction regeneration pathway at a temperature different than the discharge temperature, such that at least a portion of the regeneration of the electrochemically active material is not driven by the application of electrical current external to the electrochemical cell.

In some embodiments, methods are described. One method comprises, in some embodiments, discharging an electrochemical cell at a discharge voltage and a discharge temperature at or below about 200° C. In some embodiments, the method further comprises electrochemically regenerating electrochemically active material from a product of at least a portion of electrochemically active material consumed during discharge, at a regeneration voltage that is at least about 5 mV lower than the discharge voltage and a regeneration temperature that is different than the discharge temperature and at or below about 200° C. In certain embodiments, the electrochemical cell comprises at least one electrode comprising an electrochemically active material that is in a solid phase in both a reduced state and an oxidized state.

Some methods comprise, in certain embodiments, discharging an electrochemical cell at a discharge temperature such that an electrochemically active material within the electrochemical cell is at least partially electrochemically consumed. In some embodiments, the methods further comprise electrochemically regenerating electrochemically active material from a product of at least a portion of electrochemically active material consumed during discharge via a non-chemical-reaction regeneration pathway at a temperature different than the discharge temperature, such that at least a portion of the regeneration of the electrochemically active material is not driven by the application of electrical current external to the electrochemical cell.

In some embodiments, methods of transferring heat from a first set of electrochemical cells to a second set of electrochemical cells are described. In certain embodiments, the methods comprise transferring heat from a first electrochemical cell at a first temperature to a second electrochemical cell at a second temperature lower than the first temperature. In some cases, the methods further comprise, after transferring heat from the first electrochemical cell to the second electrochemical cell, transferring heat from the first electrochemical cell to a third electrochemical cell at a temperature lower than the first temperature. In certain embodiments, the methods further comprise, after transferring heat from the first electrochemical cell to the second electrochemical cell, transferring heat from a fourth electrochemical cell to the second electrochemical cell.

Certain embodiments relate to methods of transferring heat from a first electrochemical cell to a second electrochemical cell. In some embodiments, the methods comprise flowing a first fluid at a first temperature through a first heat exchanger, wherein the temperature of the first fluid is reduced to a second temperature lower than the first temperature. In some embodiments, the methods further comprise flowing the first fluid at the second temperature through a first electrochemical cell, wherein the temperature of the first fluid is increased to a third temperature higher than the second temperature. In certain cases, the methods further comprise flowing a second fluid at a fourth temperature through the first heat exchanger, wherein the temperature of the second fluid is increased to a fifth temperature higher than the fourth temperature. In some embodiments, the methods further comprise flowing the second fluid at the fifth temperature through a second electrochemical cell, wherein the temperature of the second fluid is reduced to a sixth temperature lower than the fifth temperature.

In some embodiments, methods of transferring heat from a first electrochemical cell to a second electrochemical cell are described. The methods, in certain cases, comprise flowing a first electrolyte for a first electrochemical cell at a first temperature through a heat exchanger. In some cases, the methods further comprise flowing a second electrolyte for the second electrochemical cell at a second temperature through the heat exchanger. In some cases, the first temperature is higher than the second temperature. In certain embodiments, the heat exchanger places the first electrolyte in thermal communication with the second electrolyte. The methods, in some embodiments, further comprise flowing the first electrolyte from the heat exchanger to the first electrochemical cell. In some embodiments, the methods further comprise flowing the second electrolyte from the heat exchanger to the second electrochemical cell.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 1A-1B are exemplary schematic illustrations of an electrochemical cell, according to certain embodiments;

FIG. 3A is an exemplary plot of voltage as a function of capacity for a thermally-regenerated electrochemical cell undergoing a thermodynamic cycle in which external electrical current is applied to complete the cycle, according to certain embodiments;

FIG. 3B is, according to some embodiments, an exemplary plot of voltage as a function of capacity for a thermally-regenerated electrochemical cell undergoing a thermodynamic cycle in which the cycle is completed without the application of external electrical current;

FIG. 8A is an exemplary schematic diagram illustrating the thermodynamic cycling of an electrochemical cell, according to some embodiments;

FIG. 8B is, according to some embodiments, an exemplary plot of temperature as a function of entropy for an electrochemical cell undergoing a thermodynamic cycle;

DETAILED DESCRIPTION

Figure 2:
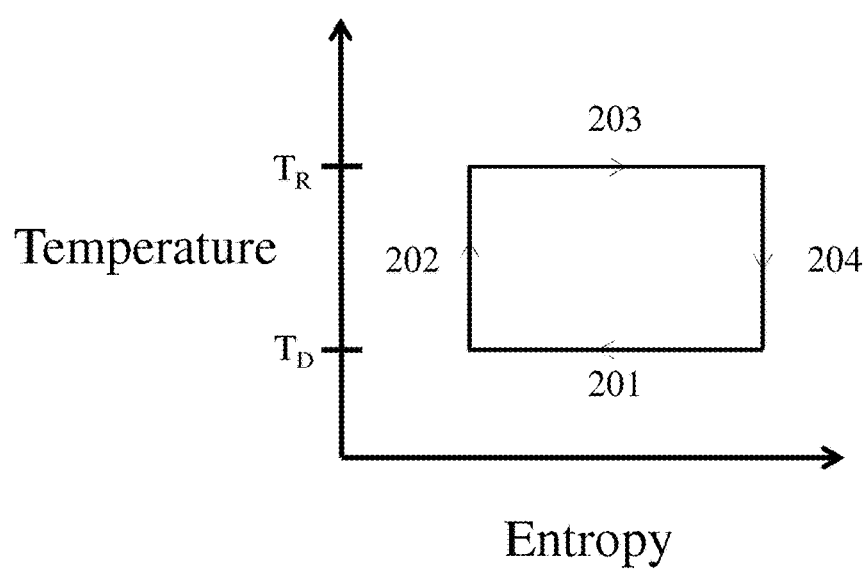
FIG. 2 is, according to some embodiments, an exemplary plot of temperature as a function of entropy for an electrochemical cell undergoing a thermodynamic cycle.

Electrochemical systems for harvesting heat energy, and associated electrochemical cells and methods, are generally described. Certain embodiments relate to electrochemical systems in which the cell voltage varies as a function of temperature. It has been discovered that the operating voltage of electrochemical cells can be efficiently altered in a desired fashion by employing at least one electrode comprising an electrochemically active material that is in solid phase during both discharge and regeneration. Without wishing to be bound by any particular theory, it is believed that such solid electrode materials have relatively low heat capacities, compared to liquid and gaseous electrodes. Accordingly, the temperatures of such electrodes can be changed relatively rapidly, reducing the amount of heat lost from the system. In some embodiments, such properties can be useful in operating electrochemical cells in thermally regenerative electrochemical systems (TRES). In addition, in some embodiments, the use of such electrode materials can be particularly useful in electrochemical cells that are operated at discharge and/or regeneration temperatures at or below about 200° C. For example, such materials may be useful in electrochemical systems (including certain TRES systems) used to capture low-grade thermal energy.

In some embodiments, certain of the electrochemical cells described herein can be discharged and regenerated spontaneously. That is to say, certain of the electrochemical cells described herein can be both discharged and regenerated without the application of an external electrical current. In some such embodiments, the temperature at which the cell is operated can be altered to achieve spontaneous operation. For example, in some embodiments, the electrochemical cell can be discharged at a first temperature at which discharge of the electrochemical cell is thermodynamically favored. Subsequently, in some embodiments, the electrochemical cell can be heated or cooled to a second temperature at which a reverse electrochemical reaction is thermodynamically favored. In this way, the heat that is input to the electrochemical cell to alter its temperature is effectively converted to electricity.

Still further embodiments relate to inventive methods for transferring heat to and from electrochemical cells within a multi-cell system. In some such embodiments, a plurality of hot electrochemical cells and a plurality of cold electrochemical cells are provided. In certain embodiments, the heat from the hot cells can be used to raise the temperature of one or more of the cold cells to a temperature that is greater than the temperature that could be achieved if all hot cells were simultaneously thermally connected to all of the cold cells.

FIGS. 1A-1B are exemplary cross-sectional schematic diagrams illustrating the arrangement and operation of certain of the inventive electrochemical cells described herein. In some embodiments, the electrochemical cell comprises a first electrode comprising a first electrochemically active material and a second electrode comprising a second electrochemically active material. For example, referring to FIGS. 1A-1B, electrochemical cell 100 comprises first electrode 101 and second electrode 104. Those of ordinary skill in the art are familiar with electrochemically active materials, which generally refer to materials that participate in oxidation and/or reduction reactions within an electrochemical cell. One of ordinary skill in the art would be capable of discerning an electrochemically active material (which participates in electrochemical reactions) from, for example, a current collector (which generally facilitates transfer of electrons from electrochemically active materials to an external circuit, but does not itself participate in electrochemical reactions). Referring to FIGS. 1A-1B, first electrode 101 comprises a first electrochemically active material, and second electrode 104 comprises a second electrochemically active material. In addition, current collector 102 is in electrical contact with electrode 101, as illustrated in FIG. 1A.

In some embodiments, at least one of the electrodes may comprise a solid electrochemically active material. In some such embodiments, the solid electrochemically active material is in a solid phase in both its discharged and its regenerated states. For example, referring to FIGS. 1A-1B, second electrode 104 can comprise an electrochemically active material that is in solid phase in both its regenerated state (as shown in FIG. 1A) and its discharged state (as shown in FIG. 1B). A variety of electrochemically active materials that are in a solid phase during both discharged and regenerated states may be used, including Prussian Blue ($KFe^{II}Fe^{III}(CN)_6$), copper hexacyanoferrate (CuHCF, $KCu^{II}Fe^{III}(CN)_6$), nickel hexacyanoferrate (NiHCF, $KNi^{II}Fe^{III}(CN)_6$), and others, as described in more detail below.

In contrast, in FIGS. 1A-1B, first electrode 101 comprises an electrochemically active material that is in a solid phase in its regenerated state (as shown in FIG. 1A) but is in solution in its discharged state (as shown in FIG. 1B). A variety of electrochemically active materials that are not in a solid state during both discharged and regenerated states may be used, including for example $Cu/Cu^{2+}$, Ag/AgCl, and/or $Fe(CN)_6^{3-/4-}$ among others, as described in more detail below.

In some embodiments, one of the electrodes may be referred to as the anode and the other electrode may be referred to as the cathode. Those of ordinary skill in the art will be familiar with the terms anode and cathode. Generally, an anode refers to a negative electrode; typically, oxidation reactions occur at the anode in discharge. A cathode generally refers to a positive electrode typically, reduction reactions occur at the cathode in discharge. For example, in FIGS. 1A-1B, for the particular non-limiting example wherein electrode 101 comprises $Cu/Cu^{2+}$ and electrode 104 comprises copper hexacyanoferrate, electrode 101 may be referred to as the anode, and electrode 104 may be referred to as the cathode.

In some embodiments, the electrochemical cell may comprise one or more electrolytes. For example, referring to FIGS. 1A-1B, first electrode 101 is at least partially immersed in first electrolyte 107. In addition, second electrode 104 is at least partially immersed in second electrolyte 108. Generally, an electrolyte can be configured to conduct one or more electrochemically active ions. Non-limiting examples of electrochemically active ions include $Li^+$, $Na^+$, $K^+$, $Cu^{2+}$, and $Zn^{2+}$. In certain embodiments, the electrolyte can be configured to be substantially electronically insulating. By configuring the electrolyte such that it does not substantially conduct electrons, an electrical short circuit between the electrodes of the electrochemical cell during operation may be prevented.

An electrochemical cell may additionally comprise an optional separator (e.g., in the form of a membrane, such as an ion-exchange membrane) that electronically separates the electrodes but permits transfer of ions (e.g., electrochemically active ions) across the separator. For example, referring back to FIGS. 1A-1B, first electrode 101 is separated from second electrode 104 by separator 106. In some embodiments, the separator (e.g., separator 106) is an ion-selective membrane. The ion-selective membrane may advantageously be selected to prevent transfer of certain ions (e.g., to prevent side reactions). For example, in the non-limiting case in which the cathode comprises CuHCF and the anode comprises $Cu/Cu^{2+}$, an ion-selective membrane may be selected that prevents transfer of $Cu^{2+}$ ions to avoid side reactions between CuHCF and $Cu^{2+}$. In certain embodiments, the ion-selective membrane is a Nafion membrane (e.g., a Nafion 115 membrane). In some embodiments, an ion-selective membrane is not necessary. For example, if ions involved in the anode and the cathode do not have side reactions with each other and/or with other materials associated with the anode or cathode (e.g., an ion involved in the anode does not have side reactions with any materials of the cathode, or an ion involved in the cathode does not have side reactions with any materials of the anode), an ion-selective membrane may not be needed. In some cases, not using an ion-selective membrane may advantageously reduce the costs associated with an electrochemical cell. In certain cases, not using an ion-selective membrane may advantageously improve long-term operation of an electrochemical cell. In cases where an ion-selective membrane is not needed, any porous separator may be used. A non-limiting example of a porous separator is a glass fiber filter. It should be understood that separator 106 is an optional component, and in certain embodiments, separator 106 may be absent. For example, separator 106 may be absent in some embodiments in which the electrodes are exposed to a single electrolyte that is substantially electronically insulating.

In some embodiments, the electrochemical cell may be configured to be discharged. Those of ordinary skill in the art are familiar with the concept of discharge, which generally refers to a process in which an electrochemical reaction proceeds such that net electrical current is generated. In certain embodiments, an electrical circuit connecting the two electrodes may be formed by one or more electrolytes configured to conduct one or more electronically active ions and an external element configured to conduct electrons. In some embodiments, as the electrochemical reaction proceeds, electrons released at one electrode travel through the external element to the other electrode, resulting in an electrical current.

During discharge, at least one of the electrochemically active materials may be at least partially electrochemically consumed. Two half-cell reactions typically occur during discharge of an electrochemical cell. In some embodiments, electrons may be emitted at one electrode as a result of oxidation of the electrochemically active material of the electrode. Those of ordinary skill in the art are familiar with oxidation, which generally refers to a process in which electrons are lost by the oxidized material, leading to an increase in oxidation state of the material that is being oxidized. In some embodiments, one of the electrodes may absorb electrons. For example, electrons may be absorbed at an electrode as a result of reduction of the electrochemically active material of the electrode. Those of ordinary skill in the art are familiar with reduction, which generally refers to a process in which electrons are gained by the reduced material, leading to a decrease in oxidation state of the material that is being reduced. During electrochemical cycling of an electrochemical cell, an electrode may be both oxidized and reduced. For example, in certain embodiments, an electrode may be oxidized during discharge and reduced during regeneration. Alternatively, an electrode may be reduced during discharge and oxidized during regeneration. In general, those of ordinary skill in the art understand electrochemical consumption to refer to oxidation or reduction of an electrochemically active material, thereby causing the material to become depleted.

In some embodiments, the two half-cell reactions that occur during discharge are both spontaneous. Generally, a reaction is spontaneous when the change in the Gibbs free energy associated with the reaction (ΔG) is less than zero. Gibbs free energy can be expressed mathematically as ΔG=ΔH−TΔS, where H is enthalpy, T is temperature, and S is entropy. It may be advantageous, in some cases, for a reaction to be spontaneous, because a spontaneous reaction generally does not require application of an external source of energy to proceed. For example, in some instances, it may be advantageous for an electrochemical reaction to be spontaneous because such spontaneous reactions generally do not require application of an external electrical current to proceed.

In some cases, the electrochemical cell may be configured to regenerate electrochemically active material from a product of at least a portion of electrochemically active material consumed during discharge. As used herein, regeneration refers to a process in which the reverse reactions of the electrochemical reactions that occur during discharge proceed. For example, in one particular non-limiting example of the system in FIGS. 1A-1B in which the electrochemically active material of first electrode 101 comprises copper metal (Cu), and the electrochemically active material of second electrode 104 comprises copper hexacyanoferrate, the two half-cell reactions that occur at the two electrodes can be expressed as:

$$Na_{0.71}Cu[Fe^{III}(CN)_6]_{0.72}+a(Na^++e^-) \leftrightarrows Na_{0.71+a}Cu[Fe^{III}(CN)_6]_{0.72-a}[Fe^{II}(CN)_6]_{0.72+a}$$

and:

$$Cu \leftrightarrows Cu^{2+}+2e^-$$

In another non-limiting example of the system in FIGS. 1A-1B, the electrochemically active material of first electrode 101 comprises silver chloride, and the electrochemically active material of second electrode 104 comprises nickel hexacyanoferrate. The two half-cell reactions that occur at the two electrodes can be expressed as:

$$KNi^{II}Fe^{III}(CN)_6+K^++e^- \leftrightarrows K_2Ni^{II}Fe^{II}(CN)_6$$

and:

$$Ag+Cl^- \leftrightarrows AgCl+e^-$$

During discharge, these reactions proceed in the forward direction (i.e., from left to right as written above), and during regeneration, these reactions proceed in the reverse direction (i.e., from right to left as written above).

In certain embodiments, the electrochemical cell is configured to regenerate at least a portion of the consumed electrochemically active material via a non-chemical-reaction regeneration pathway. A chemical reaction regeneration pathway generally refers to a pathway in which regeneration occurs by contacting discharged components such that regeneration occurs via a chemical reaction between the discharged components. For example, in a system comprising $Cr^{3+}$ and Sn, contacting the discharged components $Cr^{2+}$ and $Sn^{2+}$ can result in a chemical reaction that regenerates $Cr^{3+}$ and Sn. In some embodiments, regeneration may occur by transporting electrons via external electrical circuitry. This can be achieved, for example, by applying an external electrical current to supply electrons. In some embodiments, the electrons may be provided spontaneously, for example, by altering the temperature of the system such that ΔG becomes negative, and electrons are exchanged between discharged components spontaneously. In some embodiments, regeneration is achieved by initiating electrochemical reactions that are the reverse of those that occur during discharge. At least a portion of the regeneration of the electrochemically active material may be driven by heating and cooling the electrochemical cell. In certain embodiments, regeneration of the electrochemically active material is driven only by heating and cooling the electrochemical cell.

Generally, electrochemical cells are discharged at a discharge voltage. Similarly, electrochemical cells are generally regenerated at a regeneration voltage. As used herein, discharge voltage refers to the open-circuit voltage of the electrochemical cell when discharge begins. Regeneration voltage, as used herein, refers to the open-circuit voltage of the electrochemical cell when regeneration begins. Those of ordinary skill in the art are familiar with the concept of open-circuit voltage, which generally corresponds to the difference in electrode potential between two electrodes when disconnected from a circuit.

Electrochemical cells are generally discharged at a discharge temperature ($T_D$), which corresponds to the temperature at which the electrochemical cell is discharged. Electrochemical cells are also generally regenerated at a regeneration temperature ($T_R$), which corresponds to the temperature at which the electrochemical cell is regenerated. Discharge and regeneration temperatures can be calculated by determining the mass-averaged average temperature of each electrode within the electrochemical cell during operation (e.g., during discharge or during regeneration) and averaging the two average electrode temperatures. In certain of the embodiments described herein, the electrochemical cell is substantially isothermal. That is to say, the temperature of the first electrode is substantially the same as the temperature of the second electrode. In some embodiments, the temperature of the first electrode is within about 10° C., within about 5° C., within about 2° C., or within about 1° C. of the temperature of the second electrode.

In some embodiments, the discharge and/or regeneration voltage of the electrochemical cell varies with temperature. One material property reflecting the voltage response of an electrochemically active material to change in temperature is the thermogalvanic coefficient. Those of ordinary skill in the art are familiar with the thermogalvanic coefficient (α) of an electrochemically active material, which generally refers to the change in electrode potential with change in temperature. The thermogalvanic coefficient of a particular material can be expressed mathematically as:

$$\alpha = \frac{\partial V}{\partial T} \quad (3)$$

where V is electrode potential and T is temperature. The thermogalvanic coefficient of an electrode may be determined experimentally, for example, by measuring voltage across an electrochemical cell having a counter electrode with known thermogalvanic behavior at various temperatures. Generally, the thermogalvanic coefficient of a full electrochemical cell corresponds to the difference between the thermogalvanic coefficient of the two electrodes, and can be calculated by subtracting the thermogalvanic coefficient of the anode from the thermogalvanic coefficient of the cathode.

In certain embodiments, the first electrode comprises an electrochemically active material having a first thermogalvanic coefficient and the second electrode comprises an electrochemically active material having a second thermogalvanic coefficient. The absolute value of the difference between the first and second thermogalvanic coefficients may be, in some cases, relatively large. The use of electrode material pairs in which the difference in thermogalvanic coefficients, and thus the thermogalvanic coefficient for the full electrochemical cell, is relatively large, may be advantageous in certain instances because a relatively modest change in temperature can be accompanied by a relatively large change in voltage. In some cases, the difference between the first and second thermogalvanic coefficients is at least about 0.5 millivolts/Kelvin, at least about 1 mV/K, or at least about 2 mV/K (and/or, in certain embodiments, up to about 10 mV/K, or more).

In certain embodiments, the electrochemical cell can be configured to be operated such that the regeneration temperature $T_R$ is different from the discharge temperature $T_D$. In some embodiments, as temperature changes from $T_D$ to $T_R$, the open-circuit voltage of the electrochemical cell changes from discharge voltage $V_D$ to regeneration voltage $V_R$. For example, one or more electrodes of the electrochemical cell may have a thermogalvanic coefficient that has a relatively high absolute value, causing a relatively large change in potential as a function of temperature. In some embodiments, the electrochemical cell can be configured such that regeneration voltage is lower than the discharge voltage. In some embodiments, the regeneration voltage is at least about 1 mV, at least about 5 mV, at least about 10 mV, at least about 20 mV, at least about 50 mV, at least about 100 mV, at least about 200 mV, or at least about 500 mV (and/or, in some embodiments, up to about 1 V, or more) lower than the discharge voltage.

As described in detail below, it may be advantageous, in certain embodiments (although not required), for regeneration voltage to be lower than discharge voltage. For example, in certain systems in which the regeneration voltage is lower than the discharge voltage, the amount of electrical current required to perform the regeneration step can be smaller than the amount of current required to perform the discharge step, resulting in net electrical current.

Additionally, it may be advantageous, in certain embodiments, for regeneration voltage to be reduced due to change in temperature. For example, in certain systems in which the regeneration voltage is lower than the discharge voltage, the amount of electrical current required to perform the regeneration step can be smaller than the amount of current that would be required were the regeneration voltage not lowered. By reducing the amount of electrical current required to perform the regeneration step, the net amount of electrical current extracted from the electrochemical cell (calculated by subtracting the current input during the regeneration step from the current produced during the discharge step) can be increased.

Thus, in some embodiments, the electrochemical cell is heated and/or cooled to obtain net energy. For example, in some embodiments, the electrochemical cell(s) may be heated or cooled between discharge and regeneration steps to alter the discharge and/or regeneration voltage which can, in certain embodiments, increase the amount of net electricity extracted from the electrochemical cell. Such operation is schematically illustrated, for example, in FIG. 2. FIG. 2 is an exemplary temperature-entropy diagram depicting a thermodynamic cycle an electrochemical cell may undergo to generate net work from input heat. In FIG. 2, an electrochemical cell may be discharged at discharge temperature $T_D$ via pathway 201. In some embodiments, the electrochemical cell is subsequently heated from $T_D$ to regeneration temperature $T_R$, for example, via pathway 202 in FIG. 2. In some embodiments, after the electrochemical cell has been heated to $T_D$, the electrochemical cell can be regenerated at $T_R$, for example, via pathway 203 in FIG. 2. In some embodiments, heating the electrochemical cell such that the regeneration temperature is higher than the discharge temperature can lower the regeneration voltage of the electrochemical cell, relative to the regeneration voltage that would have been observed were the electrochemical cell maintained at the discharge temperature (and, in certain embodiments, lower than the discharge voltage). In some such embodiments, lowering the regeneration voltage in this manner can reduce the amount of electrical current needed to complete the regeneration process, thus increasing the net electrical current extracted from the electrochemical cell. Referring back to FIG. 2, after regenerating the electrochemical cell, the electrochemical cell may be cooled to discharge temperature $T_D$ via pathway 204.

In some embodiments, $T_D$ and $T_R$ are less than about 200° C. Many previous thermally regenerated electrochemical systems relied on input of a large amount of heat at high temperature (typically greater than 300° C., and often above 1000° C.). It was unexpectedly found, according to certain aspects of the present invention, that highly efficient systems may be formed with discharge and regeneration temperatures of less than about 200° C. A thermally-regenerated electrochemical cell with relatively low discharge and regeneration temperatures may be advantageous, according to certain embodiments, because it can allow for generation of electrical energy with input from low temperature waste heat, including certain waste heat which is abundantly available from industrial processes, solar-thermal energy, and geothermal energy. Although low-temperature thermal energy is abundant, it has generally been difficult to convert such energy into electricity using traditional methods. In certain embodiments described herein, waste heat from an industrial or other process is used to heat an electrochemical cell to its regeneration temperature, at which point the cell is discharged at a regeneration voltage that is lower than the discharge voltage.

In some embodiments, the electrochemical cell has a negative thermogalvanic coefficient. That is, when the temperature of the electrochemical cell is increased, the voltage of the electrochemical cell is decreased. In some such embodiments, the regeneration temperature may be at least about 5° C. higher, at least about 10° C. higher, or at least about 20° C. higher than the discharge temperature (and/or, in certain embodiments, up to about 100° C. higher, up to about 200° C. higher, or more than the discharge temperature).

In some embodiments, regeneration temperature $T_R$ and/or discharge temperature $T_D$ may be at or below about 200° C., at or below about 150° C., at or below about 100° C., or at or below about 50° C. (and/or, in certain embodiments, down to −100° C. or lower). In some embodiments, the discharge temperature may be within about 5° C., within about 2° C., or within about 1° C. of the temperature of the ambient environment. In some cases, the discharge temperature may be substantially the same as the temperature of the ambient environment. For example, in some embodiments, the discharge temperature may be about 24° C.

In some embodiments, the electrochemical cell has a positive thermogalvanic coefficient. For such a cell, voltage would increase with an increase in temperature. In order for net energy to be extracted, the electrochemical cell may be discharged at high temperature (high voltage) and regenerated at low temperature (low voltage). In some such embodiments, the regeneration temperature may be at least about 5° C. lower, at least about 10° C. lower, or at least about 20° C. lower than the discharge temperature (and/or, in certain embodiments, up to about 100° C. lower, up to about 200° C. lower, or more than the discharge temperature). In some embodiments, regeneration temperature $T_R$ may be within about 5° C., within about 2° C., or within about 1° C. of the temperature of the ambient environment. In some cases, the regeneration temperature may be substantially the same as the temperature of the ambient environment. For example, in some embodiments, the regeneration temperature may be about 24° C.

In some embodiments, a change in temperature from $T_D$ to $T_R$ results in a regeneration voltage $V_R$ that is negative. The impact of altering the temperature on operating voltages is illustrated for two exemplary systems in the voltage-capacity diagrams of FIGS. 3A-3B. FIG. 3A shows an exemplary voltage-capacity diagram for a thermally regenerative electrochemical system in which temperature change results in a regeneration voltage that is smaller than the discharge voltage but is still positive. In FIG. 3A, as the cycle progresses from point 301 to point 302, the electrochemical cell discharges at temperature $T_D$, with voltage decreasing from voltage $V_{301}$ to voltage $V_{302}$, and electricity is produced in this process. Discharge voltage is $V_{301}$, the voltage at the beginning of the discharge process. As the cycle progresses from point 302 to point 303, the cell is disconnected, and the temperature changes from $T_D$ to regeneration temperature $T_R$. As the cycle progresses from point 303 to point 304, the electrochemical cell regenerates (i.e., a process that is the reverse of the discharging electrochemical process occurs) at $T_R$, with voltage increasing from $V_{303}$ to $V_{304}$. The regeneration voltage is $V_{303}$, the voltage of the electrochemical cell at the beginning of the regeneration process. In the exemplary system illustrated in FIG. 3A, the net electricity generated within the system may be greater than the net electricity that would have been generated were the temperature kept constant because the regeneration voltage $V_R$ is less than the discharge voltage $V_D$. However, in the example of FIG. 3A, application of an external electrical current is still needed to drive the system from point 303 to point 304.

FIG. 3B shows an exemplary voltage-capacity diagram for a thermally regenerative electrochemical system in which temperature change results in a regeneration voltage that is less than zero. As the cycle progresses from point 301 to point 302, the pathway is substantially identical to the pathway from 301 to 302 in FIG. 3A, with the electrochemical cell discharging at temperature $T_D$ and voltage decreasing from $V_{301}$ to $V_{302}$. As the cycle progresses from point 302 to point 305, temperature changes from discharge temperature $T_D$ to regeneration temperature $T_R$. Unlike the voltage at point 303 in FIG. 3A, however, the voltage at point 305 in FIG. 3B is negative. As the cycle progresses from point 305 to point 306, the absolute value of the voltage decreases. As a result, the process from point 305 to point 306 is spontaneous and does not require external electrical current to proceed. Unlike in FIG. 3A, electricity is produced during the pathway from 305 to 306 in FIG. 3B as well. The cycle illustrated in FIG. 3B therefore does not require application of an external electrical current, and electricity is produced during both discharge and regeneration. In some such embodiments, such electricity generation may be driven only by the heating and cooling of the electrochemical cell.

An electrochemical cell that requires only external heat as input may be advantageous, in some instances. Certain embodiments in which both $T_D$ and $T_R$ are below 200° C. may be especially advantageous, since low-grade waste heat can be used to generate electricity in some such instances. Such embodiments may be particularly advantageous for off-grid applications, especially in remote areas where external electrical sources are not accessible.

In some embodiments, the electrochemical cell may be highly efficient. The efficiency of a thermally regenerative electrochemical cycle may be mathematically expressed as:

$$\eta = \frac{W}{Q_H + Q_{HX}} \quad (4)$$

where W is the net work output in one cycle, $Q_H$ is the heat absorbed at $T_H$, and $Q_{HX}$ is the external energy needed to heat the system. In some embodiments, the efficiency is at least about 0.25%, at least about 0.5%, at least about 1%, at least about 1.5%, at least about 1.9%, at least about 2%, at least about 3.5%, at least about 5%, at least about 6%, at least about 6.5%, at least about 10% (and/or, in certain embodiments, up to about 15%, up to about 25%, or higher).

In some embodiments, at least one of the first and second electrodes comprises an insoluble solid in both oxidized and reduced states. Use of solids in an electrode may be advantageous due to their low heat capacity and high charge capacity compared to, for example, liquid electrode materials. Low heat capacity may be important in certain instances because less heat is required to obtain the desired temperature change during operation of the electrochemical cell. For example, as described above, operation of the electrochemical systems of FIGS. 2 and 3A-3B involve heating and cooling the electrochemical cell. In certain instances in which low heat capacity materials are employed in the electrode, less heat is required to be input into the cell to achieve the desired temperatures. Less heat input results in less wasted energy, yielding a more efficient system. The use of materials with high charge capacities may also be advantageous, in certain embodiments, because more energy can be stored and obtained from the system when such materials are used.

In some embodiments, the electrodes described herein can have relatively low specific heat capacities. Those of ordinary skill in the art are familiar with the concept of specific heat capacity, which generally refers to the amount of energy (generally in the form of heat) required to change the temperature of a material by a given amount per unit mass. The specific heat capacity of a particular material may be measured, for example, by differential scanning calorimetry (DSC). In some embodiments, the specific heat capacity of at least one of the first electrode and the second electrode may be less than about 5 J/g K, less than about 4 J/g K, less than about 3 J/g K, less than about 2 J/g K, less than about 1 J/g K, or less than about 0.5 J/g K (and/or, in certain embodiments, down to about 0.1 J/g, or lower). However, it should be understood that the electroactive materials of the electrodes are not limited to electrode materials having the above specific heat capacities, and in other embodiments, electrode materials having higher heat capacities than those outlined above could be used.

In certain embodiments, the materials from which certain of the electrodes described herein are made have a relatively high specific charge capacity. Those of ordinary skill in the art are familiar with specific charge capacity, which generally refers to the amount of charge per unit mass of electroactive material. Generally, it is advantageous for the specific charge capacity of a particular electrode material to be as high as possible. In certain cases, the specific charge capacity of at least one of the first electrode and second electrode may be greater than about 10 mAh/g, greater than about 20 mAh/g, greater than about 30 mAh/g, greater than about 40 mAh/g, greater than about 50 mAh/g, greater than about 200 mAh/g, greater than about 1000 mAh/g, or greater than about 4000 mAh/g (and/or in some embodiments, up to about 100 mAh/g, up to about 10,000 mAh/g, or greater). It should be understood that the electroactive materials of the electrodes are not limited to electrode materials having the above specific charge capacities, and in other embodiments, electrode materials having smaller specific charge capacities could be used.

In some embodiments, a material figure of merit Y is used to assess efficiency of an electrochemical system. Y may be mathematically expressed as:

$$Y = \frac{\alpha q}{c_p} \quad (5)$$

where $\alpha$ is the thermogalvanic coefficient, q is the specific charge capacity, and $c_p$ is the specific heat capacity. It may be advantageous, in some embodiments, for the absolute value of Y to be as large as possible. In certain of the electrochemical cells and systems described herein, the value of Y of at least one of the electrodes may be at least about 0.01, at least about 0.05, at least about 0.1, at least about 0.2, at least about 0.5, at least about 1, or at least about 5 (and/or, in certain embodiments, up to about 10, up to about 20, or more).

In certain embodiments in which solid electrochemically active materials are used, the solid electrochemically active material can be of a variety of suitable shapes and sizes. In some embodiments, the solid electrochemically active material may comprise particles. In certain cases, the solid electrochemically active material may comprise nanoparticles. The average nanoparticle diameter may be, in some embodiments, less than about 1 micron, less than about 500 nm, less than about 200 nm, less than about 100 nm, or less than about 50 nm (and/or, in certain embodiments, as low as 1 nm, or less). Without wishing to be bound by any particular theory, the use of nanoparticulate electrode active material may be advantageous due to an increase in surface area, which can provide for enhanced electronic conductivity. The use of particulate electrochemically active material is not required, however, and in some embodiments, the electrochemically active material can be in another form factor (e.g., in the form of a slab, block, or any other suitable form).

In some embodiments in which an electrochemically active material is in a solid phase, particles (e.g., nanoparticles) of the electrochemically active material are suspended in a fluid. The fluid may be an electrolyte (e.g., a liquid electrolyte). In some cases, an electrode comprising the solid electrochemically active material particles suspended in the fluid is a flowable electrode (e.g., the electrode is substantially fluid or easily deformed). For example, the electrode may have measurable viscosity and/or may tend to flow and to conform to the outline of its container.

In some embodiments, the solid electrochemically active material may comprise an intercalation compound. Intercalation compounds may be considered to be those that can be oxidized and/or reduced by the insertion and/or extraction of ions. Intercalation compounds include, but are not limited to, metal oxides, metal chalcogenides, Prussian Blue and its analogues, and graphitic compounds. Exemplary, non-limiting examples of Prussian Blue analogues include transition metal hexacyanoferrates, such as copper hexacyanoferrate (CuHCF) and nickel hexacyanoferrate (NiHCF). Examples of suitable transition metal hexacyanoferrates include, but are not limited to, hexacyanoferrates of transition metals selected from the group consisting of Sc, Ti, V, Cr, Mn, Fe, Co, Ni, and Cu. Oxidation of CuHCF and/or NiHCF may include intercalation of, for example, $Na^+$ ions and/or $K^+$ ions from an electrolyte. Chalcogenides may pertain to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir.

In some embodiments, the solid electrochemically active material may be capable of undergoing a conversion reaction. In some embodiments, the material comprises a metal salt that stores an alkali ion by undergoing a displacement or conversion reaction. Examples of such compounds include metal oxides such as CoO, $Co_3O_4$, NiO, CuO, MnO.

In some cases, the electrochemically active material of an electrode may comprise a metal (e.g., in the form of an elemental metal, a metal alloy, or in another form). Examples of suitable metals include, but are not limited to, silicon, germanium, tin, lead, silver, nickel, cadmium, and/or lithium. In some embodiments, the electrochemically active material of an electrode may comprise $PbO_2$, $PbSO_4$, and/or metal hydrides (e.g., Ni-metal hydrides ($Ni(OH)_2$)).

In some embodiments, the electrochemically active material of an electrode is not in solid phase in both the discharged and regenerated states. For example, the electrochemically active material may be in a solid phase in a first state (e.g., a regenerated state) and in a liquid phase in a second state (e.g., a discharged state). Examples of suitable electrochemically active materials that are not in solid state during in both the discharged and regenerated states include, but are not limited to, $Cu/Cu^{2+}$, $Zn/Zn^{2+}$, $Ni/Ni^{2+}$, $Ag/AgCl$, and/or $Fe(CN)_6^{3-/4-}$. In some embodiments, when the electrode is part of an electrochemical cell comprising another electrode (e.g., an electrode having an electrochemically active material in solid phase in both the discharged and regenerated states), the ions that participate in the half-cell reaction of the electrode may not react (e.g., engage in a side reaction) with the electrochemically active material of the other electrode.

In certain embodiments, the electrochemically active material in one or both electrodes of certain of the electrochemical cells described herein is non-radioactive. A radioactive material generally refers to a material that has sufficient spontaneous radioactive decay such that the decay products can be detected above the background radiation of the earth. Additionally, a radioactive material generally has a half-life of less than about one million years. Examples of radioactive materials include, but are not limited to, $UF_6$ and $UF_5$. Radioactive materials generally pose hazards to human health if not managed properly. Thus, in certain applications, it may be advantageous for electrodes to be formed from non-radioactive materials.

In certain embodiments, the electrochemically active material in one or both electrodes of certain of the electrochemical cells described herein is non-toxic to humans. Non-toxic materials include materials with median lethal doses ($LD_{50}$) of greater than 90 g/kg. Toxic materials generally pose a danger to human health if not managed properly. Thus, in certain instances, it may be advantageous for electrodes to be formed from non-toxic materials.

In some embodiments, the electrochemically active material in one or both electrodes of certain of the electrochemical cells described herein is Earth-abundant. Earth-abundant elements include elements that are higher in elemental abundance than Pt-group metals. Examples of Earth-abundant elements include, but are not limited to, first row transition metals, silicon, oxygen, carbon, and sulfur. Earth-abundant materials are typically low in cost. Thus, for certain applications, it may be advantageous to form electrodes from Earth-abundant materials.

In some cases, certain of the electrodes described herein are stable over at least about 100 cycles, at least about 200 cycles, at least about 250 cycles, at least about 300 cycles, at least about 400 cycles (and/or, in certain embodiments, up to about 500 cycles, or more). In certain embodiments, the initial specific charge capacity of an electrode decreases by less than about 5 mAh/g or less than about 2 mAh/g (and/or, in certain embodiments, down to about 1 mAh/g, or lower) after 30 cycles. In some cases, the change in specific charge capacity is less than about 5 mAh/g after about 30 cycles, about 50 cycles, about 100 cycles, about 150 cycles, about 200 cycles, about 250 cycles, about 300 cycles, about 350 cycles, about 400 cycles (and/or, in certain embodiments, about 500 cycles, or more). Generally, each cycle has two steps, a discharge step and a regeneration step, one at a first temperature and one at a second, different temperature. After 500 cycles, decaying of specific charge capacity may be less than about 30%, less than about 20%, less than about 15%, less than about 10%, or less than about 5% (and/or, in certain embodiments, down to about 1%, or lower).

In some embodiments, a system comprises a plurality of electrochemical cells. In one embodiment, the system comprises a second electrochemical cell to which heat is transferred from the first electrochemical cell. The second electrochemical cell, in some embodiments, may be configured to be regenerated while the first electrochemical cell is discharged. The temperature of the second electrochemical cell during regeneration may be different than (e.g., less than or higher than) the temperature of the first electrochemical cell during discharge. In some embodiments, the first electrochemical cell is in direct thermal contact with at least the second electrochemical cell.

In some embodiments, one or more heat exchangers may be used to harvest heat rejected during the cooling process. Use of such heat exchangers may be advantageous, in some embodiments, because less external energy is required to cycle the electrochemical cell.

Figure 4:
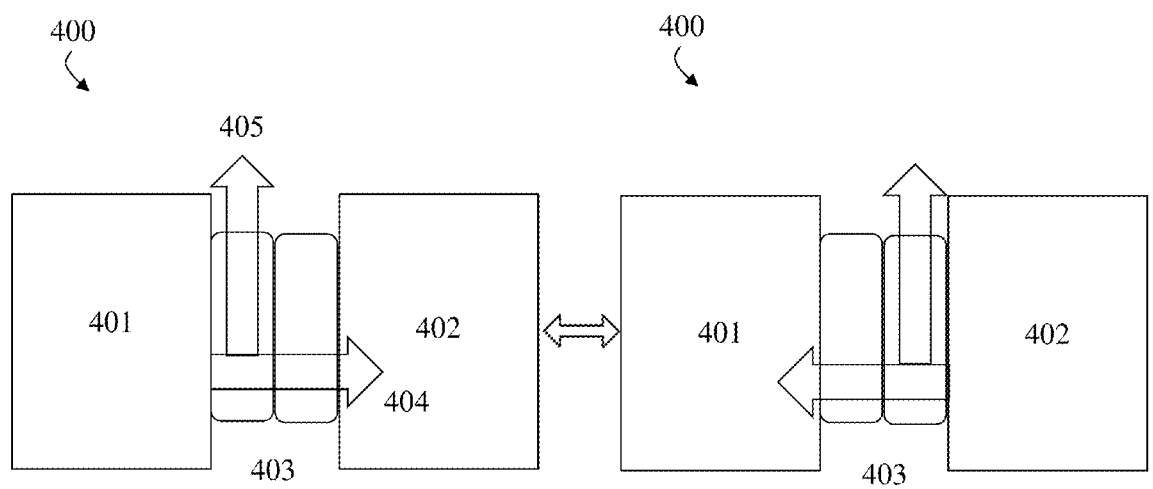
FIG. 4 is an exemplary schematic diagram illustrating heat transfer between two electrochemical cells, according to certain embodiments.

FIG. 4 is an exemplary schematic illustration of a system 400 comprising a plurality of electrochemical cells between which heat is exchanged during operation. In FIG. 4, heat exchanger 403 can be used to transfer heat between cell 401 at regeneration temperature $T_R$ and cell 402 at discharge temperature $T_D$, where $T_R$ is different than $T_D$. In the set of embodiments illustrated in FIG. 4, $T_R$ is larger than $T_D$, although in other embodiments, $T_R$ could be smaller than $T_D$. In FIG. 4, after cell 401 has been regenerated and cell 402 has been discharged, some portion of heat 404 is transferred from cell 401 to cell 402. Because the efficiency of the heat exchanger in FIG. 4 is not 100%, a portion of heat 405 is expelled to the environment. In order to fully heat cell 402 to regeneration temperature $T_R$, external energy is generally used. At the end of the heat transfer process, cell 401 is at discharge temperature $T_D$, and cell 402 is at regeneration temperature $T_R$. As the cells continue to proceed through the thermodynamic cycle shown in FIG. 2, cell 401 is discharged at temperature $T_D$, and cell 402 is regenerated at temperature $T_R$. Heat is then transferred from cell 402 to cell 401. Eventually, additional heat may be input into the system such that cell 401 is at temperature $T_R$ and cell 402 is at temperature $T_D$. Subsequently, cell 401 may be regenerated at temperature $T_R$ and cell 402 may be discharged at temperature $T_D$, completing the cycle. This cycle may be repeated any number of times.

Heat may be transferred between electrochemical cells using any suitable method. In some embodiments, heat may be transferred between electrochemical cells by configuring the first and second electrochemical cells such that they are in direct thermal contact. Generally, two electrochemical cells are in direct thermal contact when one may trace at least one spatial pathway from the outer boundary of the first electrochemical cell to the outer boundary of the second electrochemical cell without passing through a fluid. In some embodiments, two electrochemical cells in direct thermal contact may share at least a portion of at least one wall. In some embodiments, heat may be transferred between two electrochemical cells using a heat transfer fluid, as described in more detail below.

In certain embodiments, more than two electrochemical cells may be used in an electrochemical system to generate electrical current. In some such embodiments, heat is exchanged between one hot cell with more than one cold cell in sequence, and subsequently, heat is exchanged between another hot cell with more than cold cell in sequence.

Figure 5A:
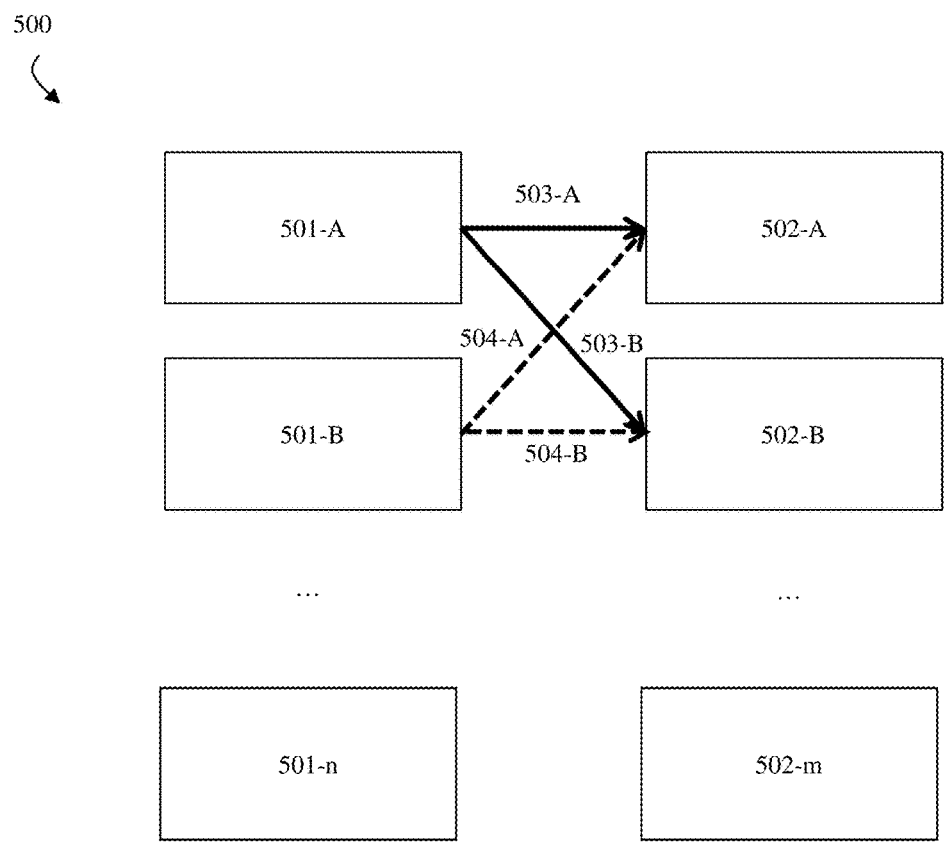
FIGS. 5A-5B are, according to some embodiments, exemplary schematic illustrations of electrochemical systems in which heat is transferred from hot electrochemical cells to cold electrochemical cells.

FIG. 5A is an exemplary schematic illustration of system 500 comprising multiple hot and multiple cold electrochemical cells, configured such that heat is exchanged among the cells during operation. FIG. 5A includes two hot cells 501-A and 501-B. In other embodiments, three, four, or more hot cells (e.g., as many as 10, 20, 50, 100, or more hot cells), up to n total hot cells (with the $n^{th}$ hot cell shown as hot cell 501-$n$ in FIG. 5A), could be included. In addition, system 500 includes two cold cells 502-A and 502-B. In other embodiments, three, four, or more cold cells (e.g., as many as 10, 20, 50, 100, or more cold cells), up to m total cold cells (with the $m^{th}$ cold cell shown as cold cell 502-$m$ in FIG. 5A), could be included.

In certain embodiments, heat can be transferred from a first electrochemical cell at a first temperature to a second electrochemical cell at a second temperature lower than the first temperature. For example, referring back to FIG. 5A, heat can be transferred from first hot cell 501-A to first cold cell 502-A, for example, as illustrated by arrow 503-A in FIG. 5A.

In some embodiments, after transferring heat from the first electrochemical cell to the second electrochemical cell, heat can be transferred from the first electrochemical cell to a third electrochemical cell at a temperature lower than the first temperature. For example, referring to FIG. 5A, after heat is transferred from cell 501-A to cell 502-A, heat can be transferred from cell 501-A to cell 502-B, as illustrated via arrow 503-B in FIG. 5A.

In certain embodiments, after transferring heat from the first electrochemical cell to the second electrochemical cell, heat can be transferred from a fourth electrochemical cell to the second electrochemical cell. For example, referring to FIG. 5A, after heat is transferred from cell 501-A to cell 502-A, heat can be transferred from cell 501-B to cell 502-A, as illustrated via dashed arrow 504-A in FIG. 5A. In some embodiments, the transfer of heat from the fourth cell to the second cell (e.g., from cell 501-B to cell 502-A in FIG. 5A) can occur before, during, and/or after the transfer of heat from the first cell to the second cell (e.g., from cell 501-A to cell 502-A in FIG. 5A).

In some embodiments, after transferring heat from the first electrochemical cell to the second electrochemical cell, heat can be transferred from the fourth electrochemical cell to the third electrochemical cell. For example, referring to FIG. 5A, after heat is transferred from cell 501-A to cell 502-A, heat can be transferred from cell 501-B to cell 502-B, as illustrated via dashed arrow 504-B in FIG. 5A.

Figure 5B:
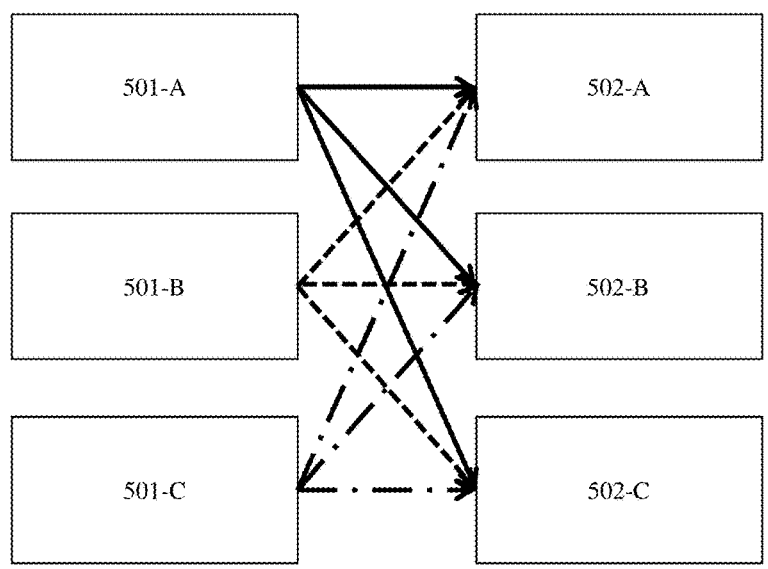

In certain embodiments, fifth, sixth, seventh, eighth, and/or additional cells may be present within the electrochemical system. For example, FIG. 5B is a schematic illustration of system 550, comprising six electrochemical cells. System 550 comprises three hot cells 501-A, 501-B, and 501-C. In addition, system 550 comprises three cold cells 502-A, 502-B, and 502-C. System 550 can be operated in a similar fashion as system 500 in FIG. 5A. In some embodiments, however, after heat has been transferred from hot cell 501-A to cold cell 502-A and from hot cell 501-A to cold cell 502-B, heat can be transferred from first cell 501-A to cold cell 502-C. Similarly, after heat has been transferred from hot cell 501-B to cold cells 502-A and 502-B, heat can be transferred from hot cell 501-B to cold cell 502C. In addition, in some embodiments, after heat has been transferred from hot cell 501-A to cold cells 502-A, 502-B, and/or 502-C and/or after heat has been transferred from hot cell 501-B to cold cells 502-A, 502-B, and/or 502-C, heat can be transferred from hot cell 501-C to cold cell 502-A, 502-B, and/or 502-C.

A specific example of the operation of system 550 of FIG. 5B is now described. In this example, cold cells 502-A, 502-B, and 502-C are initially at 0° C., and hot cells 501-A, 501-B, and 501-C are initially at 100° C. During the heat exchange process, hot cell 501-A first transfers heat to first cold cell 502-A. Assuming that substantially perfect heat exchange occurs through direct contact, with no thermal losses, hot cell 501-A is reduced in temperature to 50° C. and cold cell 502-A is raised to 50° C. Subsequently, hot cell 501-A transfers heat to second cold cell 502-B. Again, assuming substantially perfect heat exchange, hot cell 501-A is reduced to 25° C. and cold cell 502-B is raised to 25° C. Finally, hot cell 501-A transfers heat to cold cell 502-C, after which both hot cell 501-A and cold cell 502-C are at 12.5° C. In some such embodiments, after heat has been transferred from hot cell 501-A to cold cells 502-A, 502-B, and/or 502-C, hot cell 501-B transfers heat to cold cell 502-A, after which hot cell 501-B and cold cell 502-A are at 75° C. Next, hot cell 501-B transfers heat to cold cell 502-B, after which hot cell 501-B and cold cell 502-B are at 50° C. Finally, hot cell 501-B transfers heat to cold cell 502-C, after which hot cell 501-B and cold cell 502-C are at 31.25° C. Subsequently, hot cell 501-C can be contacted with cold cell 502-A, and the temperatures of hot cell 501-C and cold cell 502-A become 87.5° C. Next, heat can be transferred from hot cell 501-C to cold cell 502-B, such that the temperatures of hot cell 501-C and cold cell 502-B become 68.75° C. Finally, heat can be transferred from hot cell 501-C to cold cell 502-C such that the temperatures of hot cell 501-C and cold cell 502-C each become 50° C. After this heat exchange step has been performed, the temperature of the initially "hot" cells can be as follows: cell 501-A=12.5° C.; cell 501-B=31.25°; and cell 501-C=50° C. In addition, the temperature of the initially "cold" cells can be as follows: cell 502-A=87.5° C.; cell 502-B=68.75° C., and cell 502-C=50° C. As a result of the serial heat exchange process described above, the initially "hot" cells (which one desired to cool) are able to achieve lower temperatures than would have been possible if all hot cells had been directly contacted in parallel with all cold cells. In addition, by using the serial heat exchange process described above, the initially "cold" cells (which one desires to heat) are able to achieve higher temperatures than would have been possible if all hot cells had been directly contacted in parallel with all cold cells. Although only three hot cells and three cold cells are shown in FIG. 5B, it should be understood that heat can be exchanged between any number of hot cells and any number of cold cells. In some embodiments, increasing the number of cells will further increase efficiency.

Figure 6A:
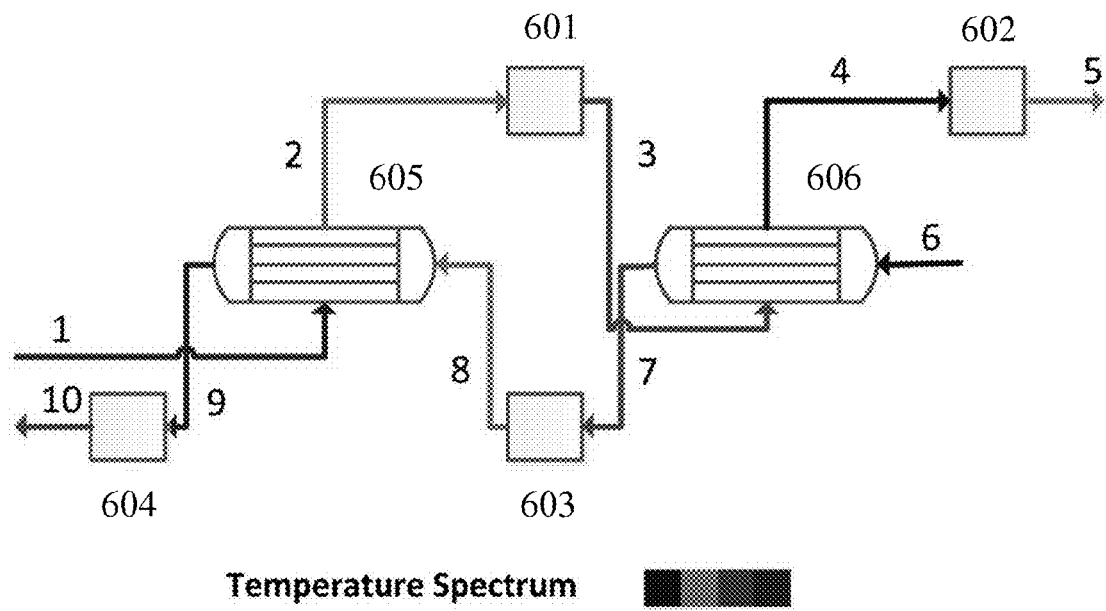
FIG. 6A is, according to certain embodiments, a schematic illustration of an electrochemical system in which heat is transferred between four electrochemical cells using a heat transfer fluid.
Figure 6B:
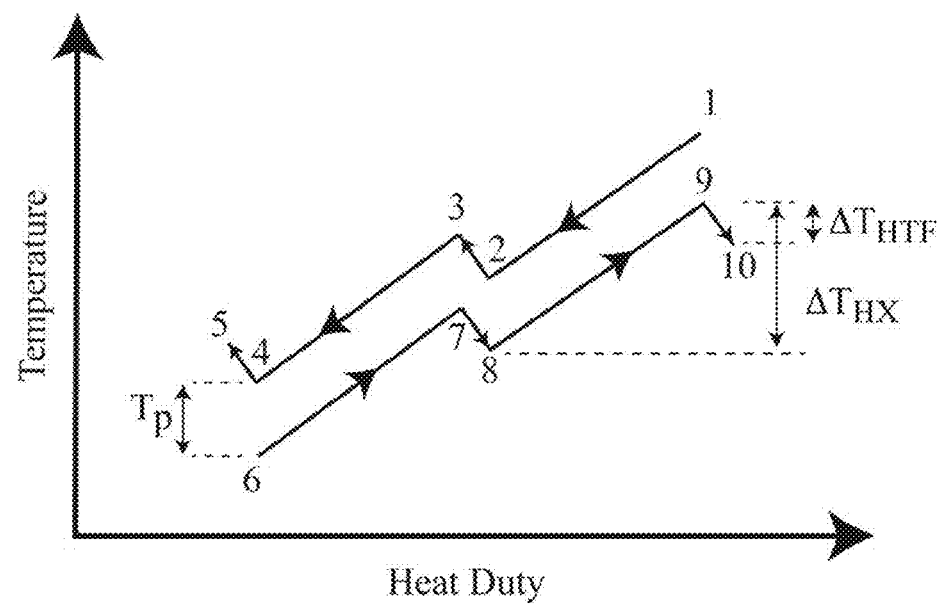
FIG. 6B is a schematic illustration of a pinch diagram, according to some embodiments, for a system in which heat is transferred between four electrochemical cells using a heat transfer fluid.

While FIG. 5B illustrates an example in which the electrochemical cells between which heat is transferred are in direct contact, heat may also be exchanged between electrochemical cells using heat transfer fluid. FIG. 6A provides an exemplary schematic of cells 601 and 602 in heating process, cells 603 and 604 in cooling process, and heat exchangers 605 and 606 used to assist the heat transfer process. FIG. 6B provides a corresponding diagram of temperature as a function of heat duty for the system illustrated in FIG. 6A, where heat duty generally refers to the amount of heat transferred to a heat transfer fluid. In the example of FIG. 6A, heat exchanger 605 is at temperature $T_1$, and heat exchanger 606 is at temperature $T_6$, where $T_1$ is greater than $T_6$. Heat transfer fluid with a temperature of $T_1$ can be introduced in heat exchanger 605, and its temperature at the outlet can be reduced by $\Delta T_{HX}$. The heat transfer fluid can then be guided through cell 601, and its temperature can be increased by $\Delta T_{HTF}$. The heat transfer fluid can then flow through heat exchanger 606, and its temperature can be reduced by $\Delta T_{HX}$. The heat transfer fluid can then flow into cell 602, and its temperature can be increased by $\Delta T_{HTF}$. Flowing in the opposite direction through the system, heat transfer fluid with a temperature of $T_6$ can be introduced in heat exchanger 606 and can absorb thermal energy from the hot stream, increasing the temperature by $\Delta T_{HX}$. The heat transfer fluid can then be transported through cell 603, transferring some of its thermal energy to the cell. The temperature of the fluid at the outlet of cell 603 can drop by $\Delta T_{HTF}$. The heat transfer fluid can then flow to heat exchanger 605, and the temperature of the heat transfer fluid can increase by $\Delta T_{HX}$. The fluid can subsequently flow to cell 604, and its temperature can decrease by $\Delta T_{HTF}$. Heat transfer between electrochemical cells may be achieved using any suitable heat transfer fluid known to those of ordinary skill in the art. Heat transfer fluids generally refer to fluids that are capable of transferring heat in the range of temperatures at which the electrochemical cell is operated. The heat transfer fluid may be a liquid or a gas. Suitable heat transfer fluids may have a specific heat capacity of at least about 1 J/g·K or at least about 2 J/g·K (and/or, in certain embodiments, up to about 3 J/g·K, or more). In some embodiments, the heat transfer fluid comprises a fluid external to the electrochemical cells. Non-limiting examples of suitable heat transfer fluids include fluids comprising water, one or more oils, one or more alcohols, one or more polyalkylene glycols, one or more refrigerants, or any combination thereof.

In some embodiments, heat transfer between one or more electrochemical cells may be achieved using a heat transfer fluid that is internal to at least one of the electrochemical cells. In certain cases, a heat transfer fluid may be used to transfer heat between a first electrochemical cell at a first temperature (e.g., a hot cell) and a second electrochemical cell at a second temperature (e.g., a cold cell). The heat transfer fluid may comprise an electrolyte of one or more of the electrochemical cells between which heat is being transferred. In some embodiments, the heat transfer fluid may comprise a liquid electrolyte. In some embodiments, the heat transfer fluid may consist essentially of a liquid electrolyte. The heat transfer fluid, in certain cases, may comprise a solid electrochemically active material (e.g., particles of a solid electrochemically active material) suspended in a liquid electrolyte. The solid electrochemically active material may be electrochemically active material of the first electrochemical cell and/or the second electrochemical cell. In some cases, the use of an internal heat transfer fluid may advantageously increase heat transfer efficiency. It should be noted that an electrochemical cell may comprise two or more electrolytes, each of which may be used as a heat transfer fluid.

In some embodiments, a method of transferring heat from a first electrochemical cell to a second electrochemical cell comprises flowing a first electrolyte for the first electrochemical cell to a heat exchanger. The first electrolyte may be at a first temperature. In certain embodiments, the method further comprises flowing a second electrolyte for the second electrochemical cell to the heat exchanger. The second electrolyte may be at a second temperature, where the first temperature is higher than the second temperature. The heat exchanger may place the first electrolyte and the second electrolyte in thermal communication. In some embodiments, heat may thereby be transferred from the first electrolyte to the second electrolyte. The first electrolyte may then be flowed to the first electrochemical cell, and the second electrolyte may be flowed to the second electrochemical cell.

Figure 7:
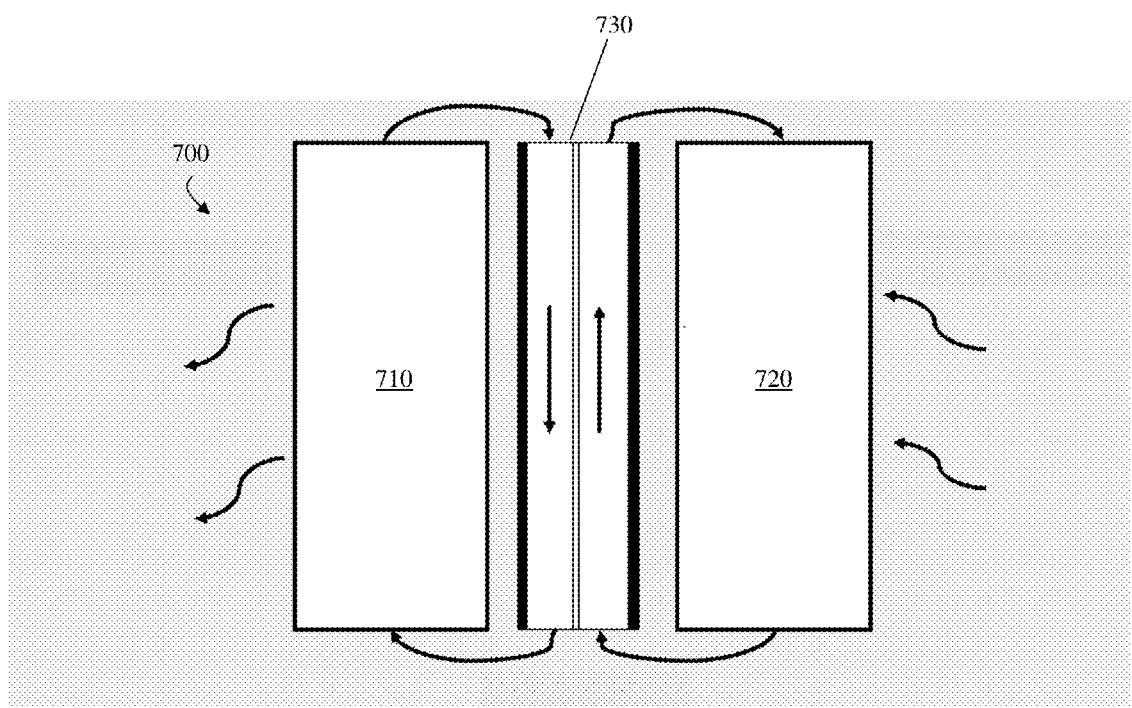
FIG. 7 is an exemplary schematic illustration of a system in which heat is transferred between two electrochemical cells, according to some embodiments.

An exemplary system in which heat is transferred between two electrochemical cells using internal fluids is shown in FIG. 7. In FIG. 7, system 700 comprises a first electrochemical cell 710, a second electrochemical cell 720, and a heat exchanger 730. As shown in FIG. 7, first electrochemical cell 710 is in fluid communication with heat exchanger 730, and second electrochemical cell 720 is in fluid communication with heat exchanger 730. First electrochemical cell 710 may comprise a first electrode comprising a first electrochemically active material and a second electrode comprising a second electrochemically active material. In some embodiments, first electrochemical cell 710 further comprises a first electrolyte. The first electrolyte may, in some cases, comprise a liquid. In some cases, the first electrolyte consists essentially of a liquid. In certain embodiments, solid particles of the first electrochemically active material and/or the second electrochemically active material are suspended in the first electrolyte (e.g., a liquid electrolyte). In some embodiments, the first electrode and/or second electrode are flowable electrodes.

Second electrochemical cell 720 may comprise a third electrode comprising a third electrochemically active material and a fourth electrode comprising a fourth electrochemically active material. Second electrochemical cell 720 may, in some embodiments, further comprise a second electrolyte. In some cases, the second electrolyte comprises a liquid. In some cases, the second electrolyte consists essentially of a liquid. In certain embodiments, solid particles of the third electrochemically active material and/or the fourth electrochemically active material are suspended in the second electrolyte (e.g., a liquid electrolyte). In some embodiments, the third electrode and/or fourth electrode are flowable electrodes.

In operation, first electrochemical cell 710 may be at a first temperature, and second electrochemical cell 720 may be at a second temperature. In some cases, the first temperature may be higher than the second temperature. The first temperature may be at least about 5° C., at least about 10° C., at least about 20° C., at least about 50° C., at least about 100° C. (and/or, in certain embodiments, up to about 200° C., or more) higher than the second temperature.

In some embodiments, first electrochemical cell 710 is configured such that a first electrochemical reaction is thermodynamically favored at the first temperature. For example, the first electrochemical cell may be configured to discharge at a first discharge voltage (e.g., such that the first and/or second electrochemically active material is at least partially electrochemically consumed) or to regenerate at a first regeneration voltage (e.g., such that electrochemically active material is regenerated from a product of at least a portion of the electrochemically active material consumed during discharge) at the first temperature. First electrochemical cell 710 may have a first polarity at the first temperature. In some embodiments, second electrochemical cell 720 is configured such that a second electrochemical reaction is thermodynamically favored at the second temperature. For example, the second electrochemical cell may be configured to discharge at a second discharge voltage (e.g., such that the third and/or fourth electrochemically active material is at least partially electrochemically consumed) or regenerate at a second regeneration voltage at the second temperature. Second electrochemical cell 720 may have a second polarity at the second temperature.

A first fluid may be flowed from first electrochemical cell 710 to heat exchanger 730. In some embodiments, the first fluid comprises the first electrolyte. In some embodiments, the first fluid consists essentially of the first electrolyte. In some embodiments, the first fluid comprises solid particles of the first and/or second electrochemically active material suspended in the first electrolyte. The first fluid may be at the first temperature at an inlet to heat exchanger 730. In heat exchanger 730, the first fluid may be cooled, such that the first fluid may be at a third temperature at an outlet to heat exchanger 730, where the third temperature is lower than the first temperature. The first fluid at the third temperature may be flowed back to first electrochemical cell 710. As a result, the temperature of first electrochemical cell 710 may decrease to a fourth temperature (e.g., a temperature that is lower than the first temperature and higher than the third temperature). In some cases, the reverse of the electrochemical reaction favored at the first temperature may be favored at the fourth temperature. For example, if discharge was thermodynamically favored at the first temperature, regeneration may be thermodynamically favored at the fourth temperature. If regeneration was thermodynamically favored at the first temperature, discharge may be thermodynamically favored at the fourth temperature. The polarity of the first electrochemical cell at the fourth temperature may be the opposite of the polarity at the first temperature. In some cases, the first electrochemical cell may be further cooled (e.g., by any suitable external cooling device) to a fifth temperature that is lower than the fourth temperature. This may be advantageous because, for example, the heat exchanger generally will not have 100% heat recuperation efficiency. In some cases, the reverse of the electrochemical reaction favored at the first temperature may be favored at the fifth temperature. The polarity of the first electrochemical cell at the fifth temperature may be the opposite of the polarity at the first temperature.

A second fluid may be flowed from second electrochemical cell 720 to heat exchanger 730. In some embodiments, the second fluid comprises the second electrolyte. In some embodiments, the second fluid consists essentially of a liquid electrolyte. In some embodiments, the second fluid comprises solid particles of the third and/or fourth electrochemically active material suspended in the liquid electrolyte. The second fluid may be at the second temperature at an inlet to heat exchanger 730. In heat exchanger 730, heat may be transferred from the first fluid to the second fluid, such that the temperature of the second fluid is at a sixth temperature at an outlet to heat exchanger 730, where the sixth temperature is higher than the second temperature. The second fluid at the sixth temperature may be flowed back to second electrochemical cell 720. As a result, the temperature of second electrochemical cell 720 may increase to a seventh temperature (e.g., a temperature higher than the second temperature and lower than the sixth temperature). In some cases, the reverse of the electrochemical reaction favored at the second temperature may be favored at the seventh temperature. For example, if regeneration was thermodynamically favored at the second temperature, discharge may be thermodynamically favored at the seventh temperature. If discharge was thermodynamically favored at the first temperature, regeneration may be thermodynamically favored at the seventh temperature. In some cases, the second electrochemical cell may be further heated (e.g., by any suitable external heating device) to an eighth temperature that is higher than the seventh temperature. In some cases, the reverse of the electrochemical reaction favored at the second temperature may be favored at the eighth temperature. The polarity of the second electrochemical cell at the eighth temperature may be the opposite of the polarity at the second temperature.

In some embodiments, the first fluid at the fourth temperature may be flowed to heat exchanger 730. In heat exchanger 730, heat may be transferred from the second fluid to the first fluid, and the first fluid may be heated such that the first fluid is at a ninth temperature at an outlet to heat exchanger 730, where the ninth temperature is higher than the fourth temperature. The first fluid at the ninth temperature may be flowed back to first electrochemical cell 710. As a result, the temperature of the first electrochemical cell may increase to a tenth temperature (e.g., a temperature that is higher than the fourth temperature and lower than the ninth temperature). In some embodiments, the electrochemical reaction favored at the first temperature may be favored at the tenth temperature. The polarity of the first electrochemical cell at the first temperature may be the same as the polarity at the tenth temperature. In some embodiments, the tenth temperature may be substantially the same as the first temperature. For example, the difference between the tenth temperature and the first temperature may be less than about 20° C., less than about 10° C., less than about 5° C. (and/or, in certain embodiments, less than about 1° C., or less). In some embodiments, the tenth temperature may be substantially different from the first temperature. In certain cases, the electrochemical cell may be further heated (e.g., by any suitable external heating device) to an eleventh temperature. In some embodiments, the electrochemical reaction favored at the first temperature may be favored at the eleventh temperature. The polarity of the first electrochemical cell at the first temperature may be the same as the polarity at the eleventh temperature. The eleventh temperature may be substantially the same as the first temperature. For example, the difference between the eleventh temperature and the first temperature may be less than about 20° C., less than about 10° C., less than about 5° C. (and/or, in certain embodiments, less than about 1° C., or less). In some embodiments, the eleventh temperature may be substantially different from the first temperature. It should be noted that although flow of the first fluid at the fourth temperature to heat exchanger 730 is described, the first fluid may, alternatively, be at the fifth temperature when it is flowed to heat exchanger 730.

In some embodiments, the second fluid at the seventh temperature may be flowed to heat exchanger 730. In heat exchanger 730, heat may be transferred from the second fluid to the first fluid, and the second fluid may be cooled such that the second fluid is at a twelfth temperature at an outlet to heat exchanger 730, where the twelfth temperature is lower than the seventh temperature. The second fluid at the twelfth temperature may be flowed back to second electrochemical cell 720. As a result, the temperature of the second electrochemical cell may decrease to a thirteenth temperature (e.g., a temperature that is lower than the seventh temperature and higher than the twelfth temperature). In some embodiments, the electrochemical reaction favored at the second temperature may be favored at the thirteenth temperature. The polarity of the second electrochemical cell at the second temperature may be the same as the polarity at the thirteenth temperature. In some embodiments, the thirteenth temperature may be substantially the same as the second temperature. For example, the difference between the thirteenth temperature and the second temperature may be less than about 20° C., less than about 10° C., less than about 5° C. (and/or, in certain embodiments, less than about 1° C., or less). In some embodiments, the thirteenth temperature may be substantially different from the second temperature. In certain cases, the electrochemical cell may be further cooled (e.g., by any suitable external cooling device) to a fourteenth temperature. In some embodiments, the electrochemical reaction favored at the second temperature may be favored at the fourteenth temperature. The polarity of the second electrochemical cell at the second temperature may be the same as the polarity at the fourteenth temperature. The fourteenth temperature may be substantially the same as the second temperature. For example, the difference between the fourteenth temperature and the second temperature may be less than about 20° C., less than about 10° C., less than about 5° C. (and/or, in certain embodiments, less than about 1° C., or less). In some embodiments, the fourteenth temperature may be substantially different from the second temperature. It should be noted that although flow of the second fluid at the seventh temperature to heat exchanger 730 is described, the second fluid may, alternatively, be at the eighth temperature when it is flowed to heat exchanger 730.

In some embodiments, the electrochemical cell comprises a current collector. The current collector can be electronically conductive and should generally be electrochemically inactive under the operation conditions of the electrochemical cell. Typical materials from which current collectors can be made include metals including, but not limited to, copper, aluminum, titanium, and the like. The current collector may be in the form of, for example, a sheet, a mesh, or any other configuration in which the current collector is distributed in the electrolyte and permits fluid flow. Selection of current collector materials is well-known to those skilled in the art.

Also as noted above, in some embodiments, the electrochemical cell comprises an electrolyte. The electrolyte may be a liquid in certain cases. In some embodiments, the electrolyte may be aqueous-based. In other embodiments, the electrolyte may be non-aqueous-based. In some cases, the electrolyte may be a gel. In some cases, the electrolyte may be a solid. The electrolytes used in certain of the electrochemical cells described herein can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of electrochemical ions between the anode and the cathode. The electrolyte may be electronically non-conductive to prevent short circuiting between the anode and the cathode.

Those of ordinary skill in the art would be capable of selecting appropriate electrolyte materials (including electrolyte salts, electrolyte solvents, and separator materials) for use in an electrochemical cell. Generally, such materials are selected based at least in part upon the electrodes and the electrochemical half cell reactions being employed in the electrochemical cell.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes.

The electrolyte might also, in certain embodiments, include a solvent, for example, in which the ionic electrolyte salt is dissolved. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing could also be used as liquid electrolyte solvents. In some cases, aqueous solvents can be used as electrolytes. Aqueous solvents can include water, which can contain other components such as ionic salts.

The following examples are intended to illustrate certain embodiments of the present invention, but do not exemplify the full scope of the invention.

Example 1

This example describes a high-efficiency thermally regenerative electrochemical cycle (TREC) for harvesting low-grade heat energy by employing solid copper hexacyanoferrate (CuHCF) as a positive electrode and $Cu/Cu^{2+}$ as a negative electrode in an aqueous electrolyte. The fast kinetics, high charge capacity, high thermogalvanic coefficient ($\alpha$), and low heat capacity of these materials allowed the system to operate with excellent efficiency. As illustrated in FIG. 8A, to harvest thermal energy, the entire device underwent a thermal cycle containing four processes: heating up, charging at high temperature, cooling down, and discharging at low temperature. FIG. 8B is a plot of this cycle on a temperature-entropy (T-S) diagram to clarify the thermodynamics. In process 1, the cell was in the discharged state and heated from $T_L$ (low temperature) to $T_H$ (high temperature) at open circuit. Since CuHCF has a negative $\alpha$ and $Cu/Cu^{2+}$ has a positive $\alpha$, the open circuit voltage (OCV) of the full cell decreased during this process. The cell was then charged at a low voltage at temperature $T_H$ in process 2, and the entropy of the cell increased through heat absorption during the electrochemical reaction. In process 3, the cell was disconnected and cooled from $T_H$ to $T_L$, and thus the OCV was increased. In the final process, the cell was discharged at a higher voltage at temperature $T_L$, and the entropy of the cell decreased through the ejection of heat into the environment. After the cycle, the system returned to the original discharged state at $T_L$. Since the charging voltage was lower than the discharging voltage, net work (W) was extracted as the difference between charging and discharging energy. The theoretical energy gained over one cycle was the area of the loop determined by the temperature difference and entropy change. This was the opposite of the consumption of energy due to electrochemical hysteresis during a typical charge/discharge cycle of a battery, since the charging energy here was partially provided by heat (see FIG. 9).

Figure 9:
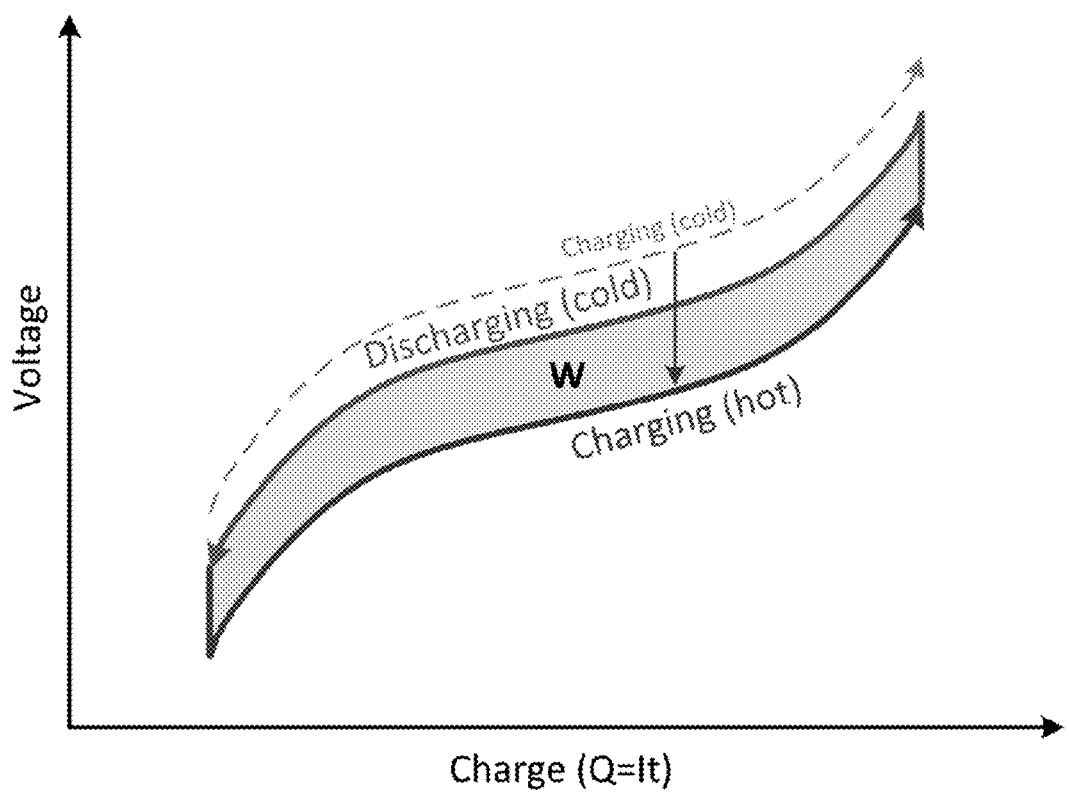
FIG. 9 is an exemplary schematic plot of voltage as a function of charge for an electrochemical cell undergoing a thermally regenerative electrochemical cycle, according to some embodiments.

FIG. 9 shows an exemplary schematic plot of voltage as a function of charge for an electrochemical cell. As shown for a cold temperature, typically the charging (dashed line) and discharging (solid line) voltage curves at a given temperature form a closed loop, the area of which means energy loss during a cycle. In the example shown in FIG. 9, the negative thermogalvanic coefficient of the cell shifted down the charging curve at a high temperature (labeled as charging (hot)), below the voltage curve for discharging at a low temperature. The area of the closed loop between charging at the high temperature and discharging at the low temperature was the theoretical energy obtained during the cycle.

Figure 10:
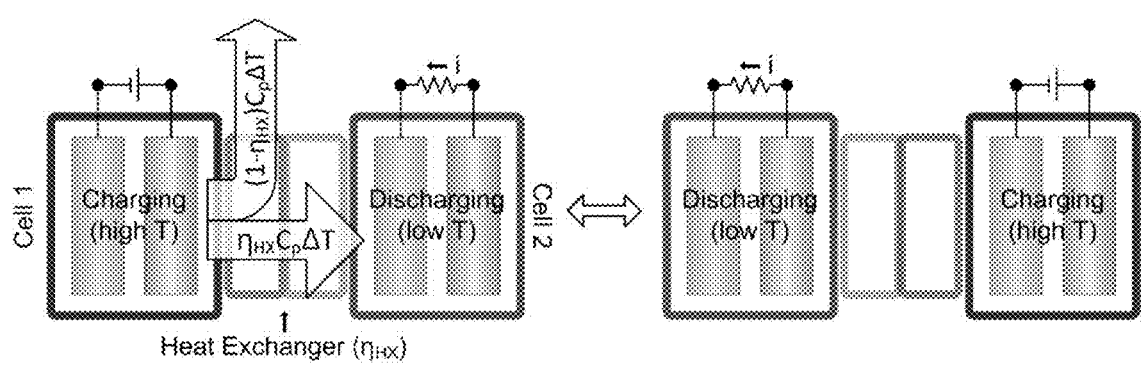
FIG. 10 is an exemplary schematic illustration of energy transfer at a heat exchanger during a cycle of an electrochemical cell, according to some embodiments.

The efficiency of the system ($\eta$) was calculated as the net work (W) divided by the energy input. If the enthalpy change $\Delta H$ and the entropy change $\Delta S$ were the same at $T_H$ and $T_L$, which was a good approximation when $\Delta T=(T_H-T_L)$ was small, then the maximum W was $\Delta T \Delta S$ (see FIG. 8B). The energy input to complete the cycle included two parts: the heat absorbed at $T_H$ ($Q_H=T_H\Delta S$) and the external heat required to raise the temperature of the system ($Q_{HX}$). As part of heat rejected from the cooling process could be used for heating up through heat exchangers, $Q_{HX}=(1-\eta_{HX})C_p\Delta T$, where $C_p$ was the total heat capacity of the electrochemical cell, and $\eta_{HX}$ was the effectiveness of the heat exchanger (see FIG. 10). Consequently $\eta$ could be expressed as:

$$\eta = \frac{W}{Q_H + Q_{HX}} = \frac{\Delta T \Delta S - E_{loss}}{T_H \Delta S + (1 - \eta_{HX})C_p \Delta T} \quad (6)$$

where $E_{loss}$ was the energy loss due to the cell resistance. Note that $\Delta T \Delta S = \alpha Q \Delta T$, where Q was the charge capacity of the battery and $\alpha$ was the thermogalvanic coefficient of the electrochemical cell. The efficiency could be written as:

$$\eta = \eta_c \frac{1 - I(R_H + R_L)/|\alpha|Q\Delta T}{1 + \eta_c(1 - \eta_{HX})/|Y|} \quad (7)$$

where I was the current used in discharging and charging. $R_H$ and $R_L$ were the internal resistance at $T_H$ and $T_L$, respectively. $Y=\alpha Q/C_p$, was a dimensionless parameter to describe the features of the system that can be used for high efficiency. If only the contributions of the electrode materials were considered, and it was assumed that both electrodes had the same properties except opposite signs of the thermogalvanic coefficient, $Y=\alpha q/c_p$ and it was defined as the figure of merit of an electrode material for TREC. Here, q was the specific charge capacity and $c_p$ was the specific heat capacity. Consequently, it was clear that a higher thermogalvanic coefficient ($\alpha$), a higher specific charge capacity (q), and a smaller heat capacity ($c_p$) led to higher efficiency for heat-to-electricity conversion. In addition, low voltage polarization and a high-efficiency heat exchanger could also improve the efficiency.

Considering these requirements, solid copper hexacyanoferrate (CuHCF) was selected as the positive electrode for the TREC because of its negative thermogalvanic coefficient (−0.36 mV K$^{-1}$), high specific charge capacity (60 mAh g$^{-1}$) compared to redox couples in solution, relatively low heat capacity (1.07 J K$^{-1}$g$^{-1}$), and ultra-low voltage hysteresis. The corresponding figure of merit Y was −0.073, almost three times that of the Fe(CN)$_6^{3-/4-}$ redox pair in solution (−0.026), commonly used in thermogalvanic cells. For the negative electrode, a copper metal immersed in 3M Cu(NO$_3$)$_2$ aqueous solution was selected because of the high positive thermogalvanic coefficient (0.83 mV K$^{-1}$) of Cu/Cu$^{2+}$ and its large specific charge capacity (118 mAh g$^{-1}$) due to the high solubility of Cu(NO$_3$)$_2$ in water. The corresponding Y was as high as 0.107.

Figure 11:
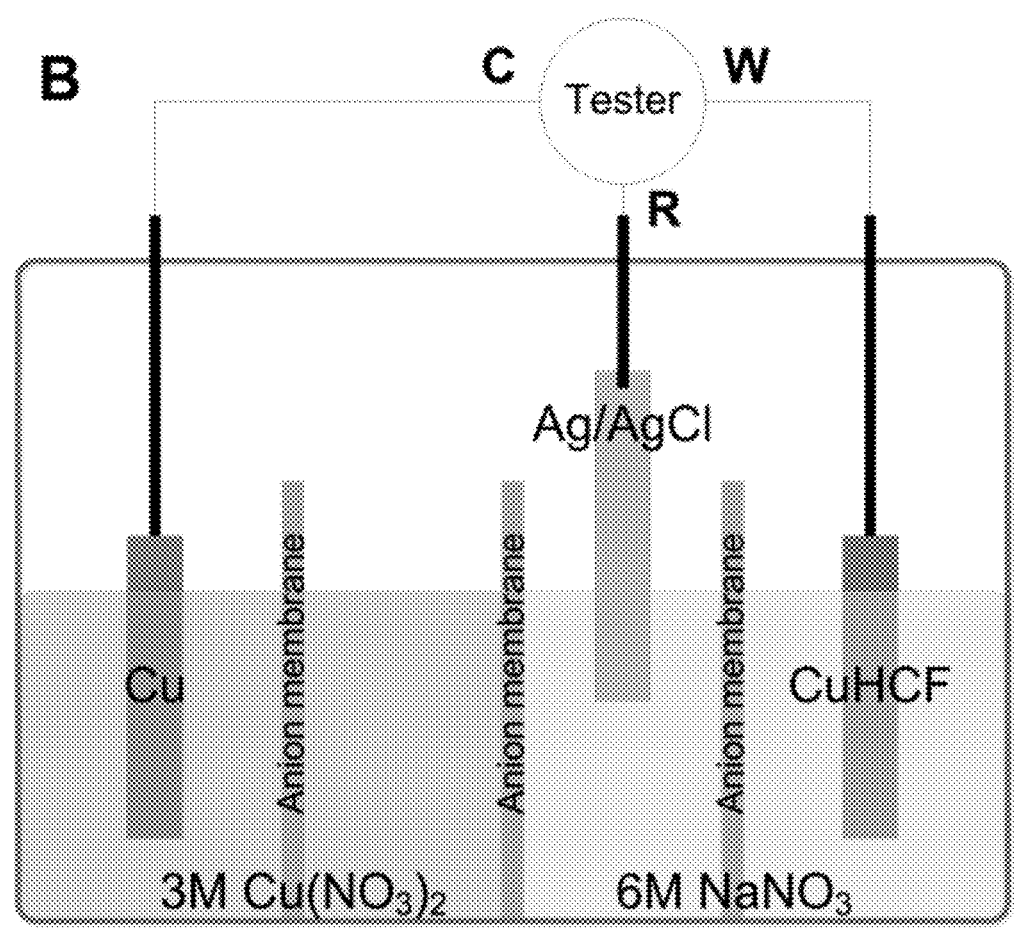
FIG. 11 is, according to certain embodiments, an exemplary schematic view of an electrochemical cell.

The electrochemical cell for TREC was assembled with the CuHCF and Cu/Cu$^{2+}$ electrodes in a flooded beaker cell containing an anion exchange membrane, as shown in FIG. 11. The relevant redox reactions at each electrode were $$Na_{0.71}Cu[Fe^{III}(CN)_6]_{0.72} + a(Na^+ + e^-) = Na_{0.71+a}Cu[Fe^{III}(CN)_6]_{0.72-a}[Fe^{II}(CN)_6]_{0.72+a}$$

and:

$$Cu^{2+} + 2e^- = Cu.$$

Figure 12A:
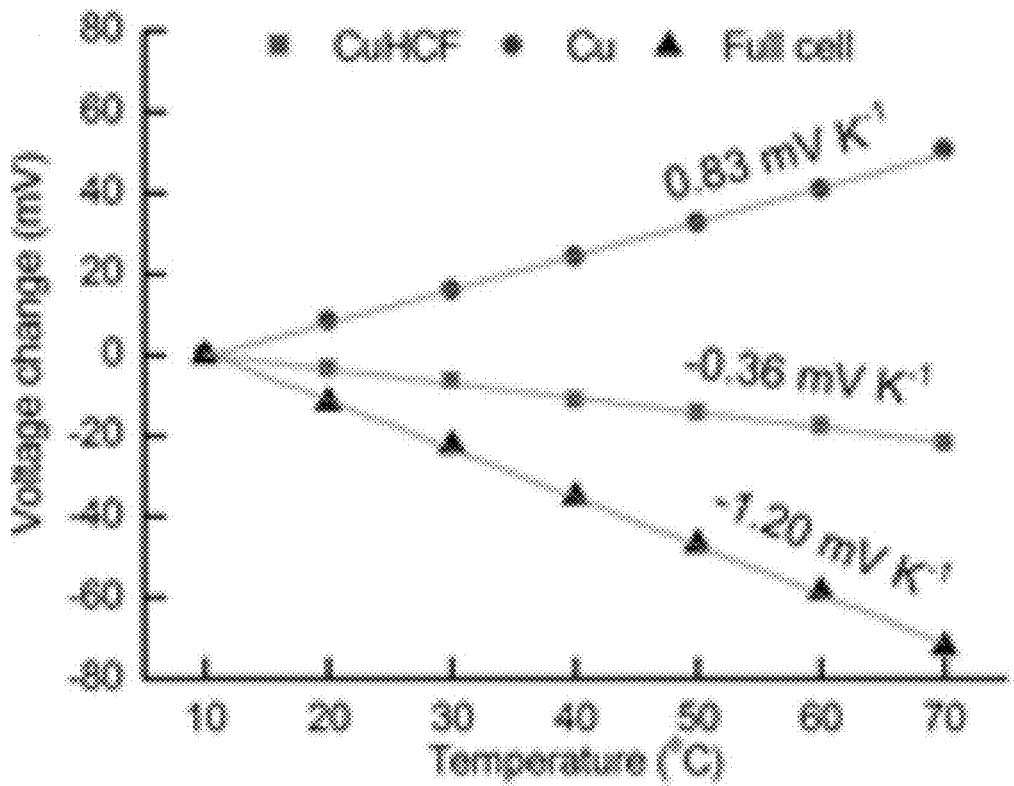
FIGS. 12A-12C are, according to some embodiments, exemplary plots illustrating the behavior of an electrochemical cell using CuHCF and Cu/Cu$^{2+}$ electrodes undergoing a thermodynamic cycle.

The thermogalvanic coefficient of each electrode was tested by measuring the open-circuit voltage while varying temperature from 10 to 70° C. FIG. 12A shows the OCV change of the CuHCF electrode (50% state of charge), the Cu/Cu$^{2+}$(3M) electrode, and the full cell for each 10° C. increment when the voltage was set at 0 V at 10° C. The potentials of both electrodes exhibited a linear dependence on temperature, indicating a constant α in the temperature window tested. The measured thermogalvanic coefficients of CuHCF, Cu/Cu$^{2+}$, and the full cell were −0.36, 0.83, and −1.20 mV K$^{-1}$, respectively. These experimental values matched the expected ones.

Figure 12B:
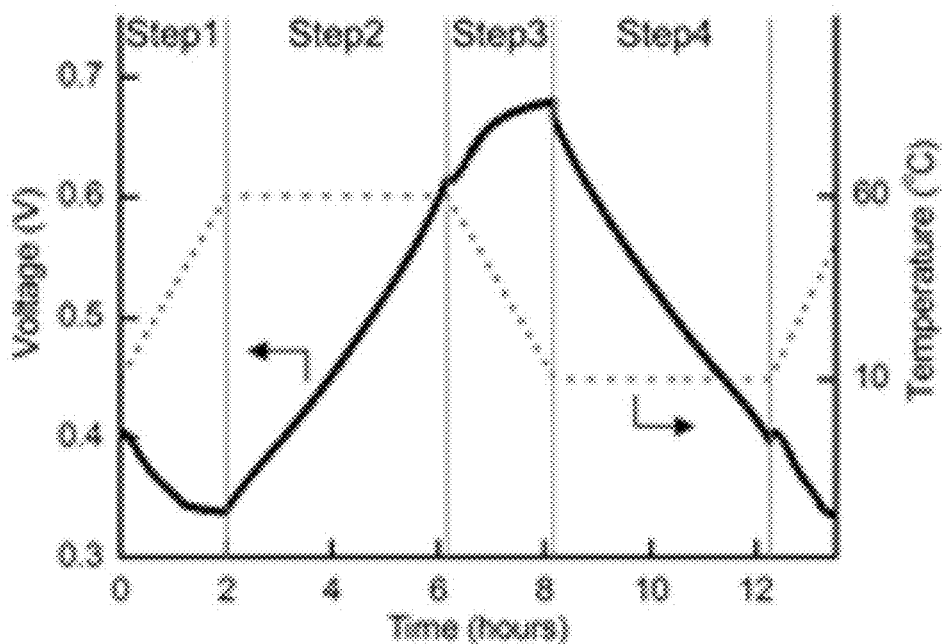
Figure 12C:
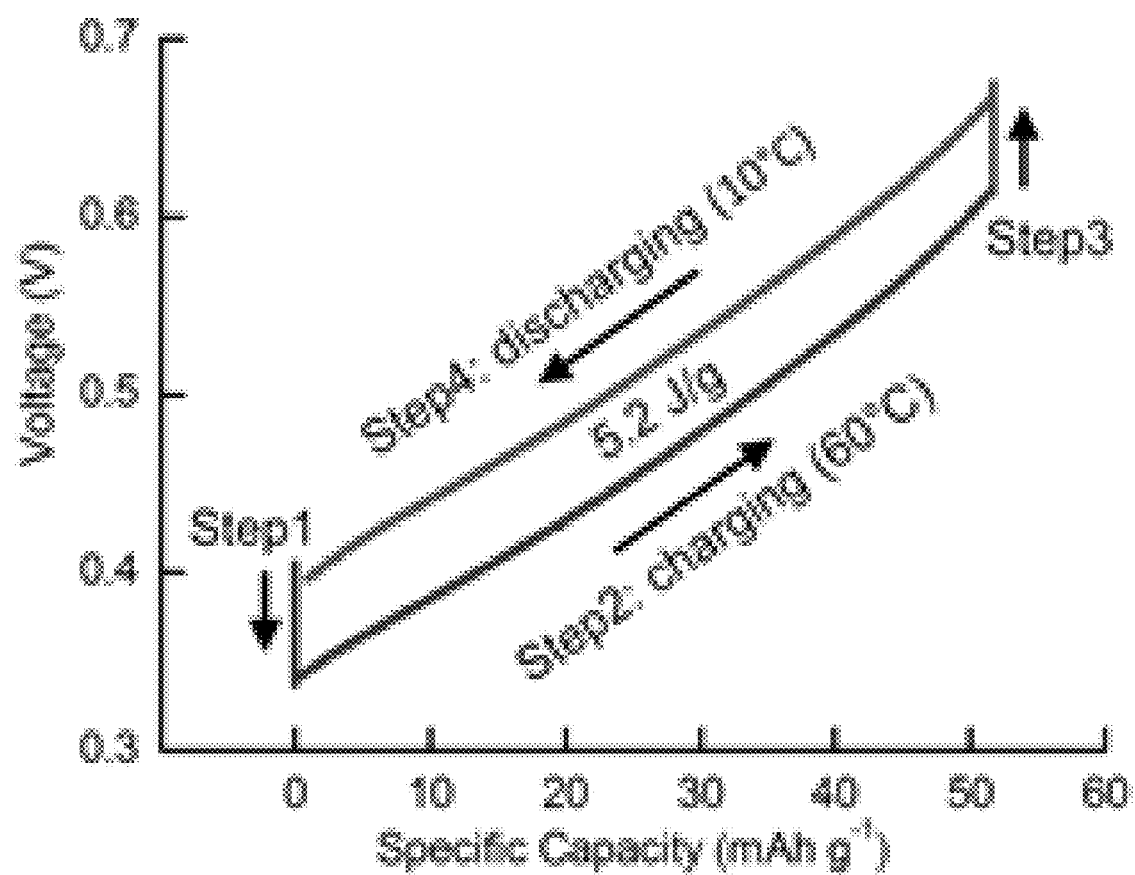

FIG. 12B shows the voltage vs. time plot of the full cell over one thermal cycle between 10 and 60° C. when the specific current density was 7.2 mA g$^{-1}$ with respect to active materials (all current, energy, and power densities were based on the mass of active materials at charged state, including CuHCF, electrolyte for Na$^+$, copper, and water for Cu$^{2+}$ in this example). The temperature of each process is shown by the dotted line, which is artificially superimposed for clarity. In process 1, the open-circuit voltage of the cell decreased from 0.406 to 0.337 V as the temperature increased from 10 to 60° C. Then the cell was charged for 250 min at 60° C. in process 2, and the voltage gradually increased. In process 3, the OCV of the cell increased from 0.613 to 0.679 V as the temperature was decreased back to 10° C. The cell was discharged in process 4 at 10° C. until the voltage reached the initial voltage of the discharged state at the beginning of process 1. The corresponding plot of voltage against specific charge capacity is shown in FIG. 12C. The average charging voltage was 59.0 mV lower than the average discharging voltage, and thus, electrical energy was generated with a net energy density of 5.2 J g$^{-1}$. The voltage spikes at the beginning of each process were electrochemical in nature and were due to overpotential and internal resistance. At the end of process 4, the discharging curve formed a nearly perfect closed loop with only a tiny loss of electric charges. The Coulombic efficiency for this cycle was adequately high, at about 98.6%.

Figure 13A:
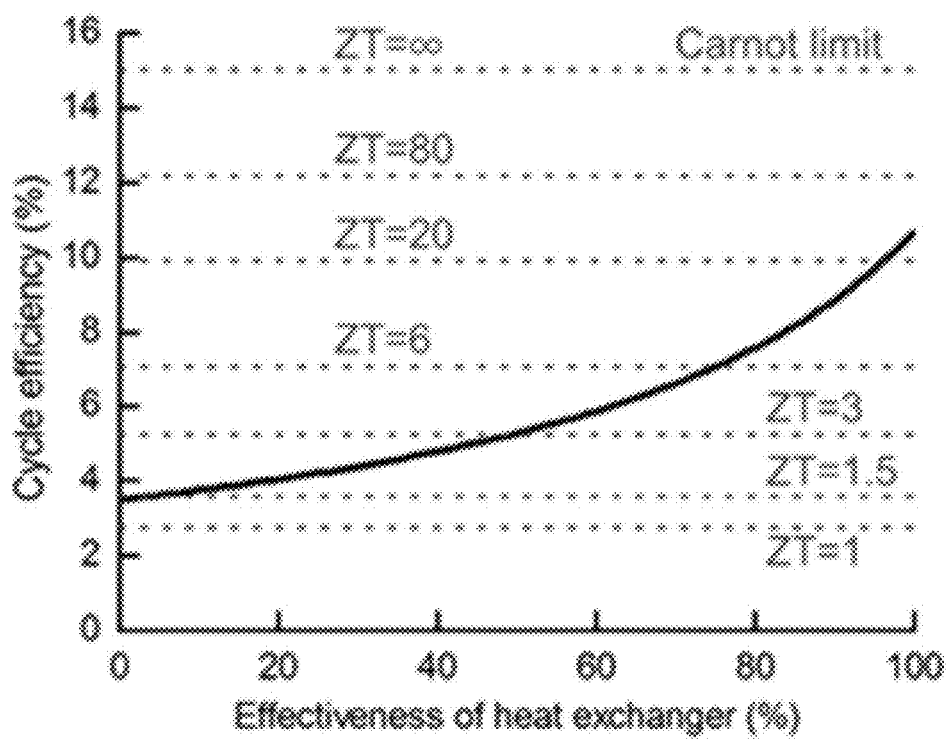
FIGS. 13A-13B are exemplary plots of cycle efficiency of a thermally regenerative electrochemical system, according to some embodiments.
Figure 13B:
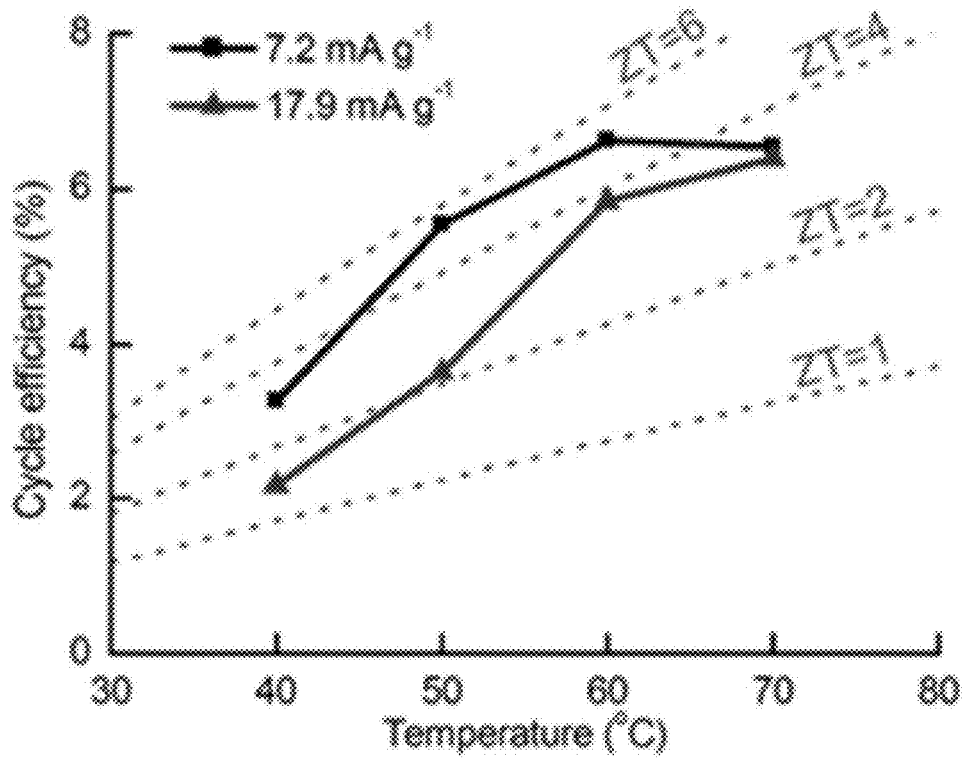

The efficiency of the cycle was estimated based on Equation (6). The effects of internal resistance and coulombic efficiency were both taken into account. FIG. 13A is a plot of the cycle efficiency vs. the effectiveness of the heat exchanger when cycled between 10 and 60° C. The current density was 7.2 mA g$^{-1}$. Dotted lines represent the efficiencies for each equivalent figure of merit (ZT) value, where the equivalent ZT value refers to that of a thermoelectric device with the same efficiency working between the same cold and hot sources. When a heat exchanger was not used, the cycle efficiency was 3.51%. As the effectiveness of the heat exchanger was enhanced, the cycle efficiency increased since the dominant energy loss due to heat capacity decreased. When the effectiveness of the heat exchanger reached 50% to 70%, the corresponding cycle efficiencies were 5.28% and 6.62%, respectively. 50% effectiveness represents the limit of direct contact of the cold and hot cells, and 70% is a reasonable value when heat exchangers are employed. If the effectiveness of the heat exchanger is 100%, the efficiency of the cycle is close to the theoretical Carnot efficiency. FIG. 13B shows the efficiency at various cycling conditions with T$_H$ varying between 40° C. and 70° C. and T$_L$ fixed at 10° C. Dotted lines represent the efficiencies for each ZT value. At a current density of 7.2 mA g$^{-1}$, the efficiencies when including a heat exchanger with 70% effectiveness in the calculations were 3.24% for T$_H$=40° C., 5.54% for T$_H$=50° C., 6.62% for T$_H$=60° C., and 6.55% for T$_H$=70° C. Without wishing to be bound by any particular theory, it is believed that the efficiency became higher as T$_H$ increased because of larger voltage differences between the charging and discharging curves and faster kinetics at higher temperature. Without wishing to be bound by any particular theory, it is believed that the change in this correlation between a T$_H$ of 60 and 70° C. was due to a decrease in the Coulombic efficiency that began at these temperatures (see FIG. 13). When the current density increased to 17.9 mA g$^{-1}$ for higher power output, the efficiencies (again, assuming a heat exchanger with an effectiveness of 70% was employed) were still as high as 2.17% for T$_H$=40° C., 3.63% for T$_H$=50° C., 5.85% for T$_H$=60° C., and 6.40% for T$_H$=70° C. despite the larger overpotential.

Figure 14A:
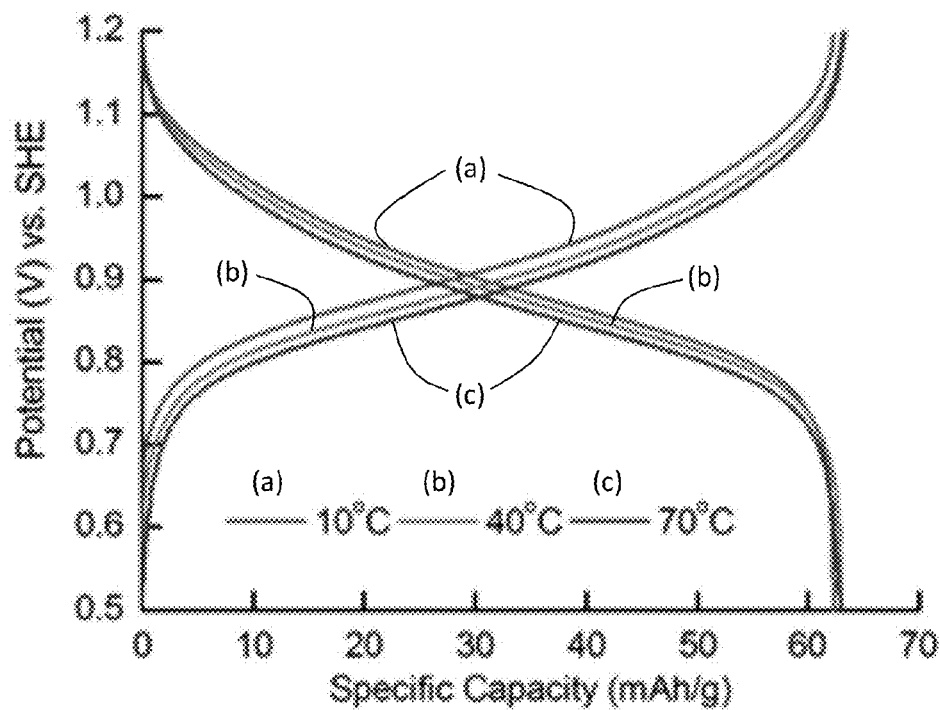
FIGS. 14A-14B are, according to some embodiments, exemplary plots illustrating the behavior of a CuHCF half cell under galvanostatic cycling at various temperatures.
Figure 14B:
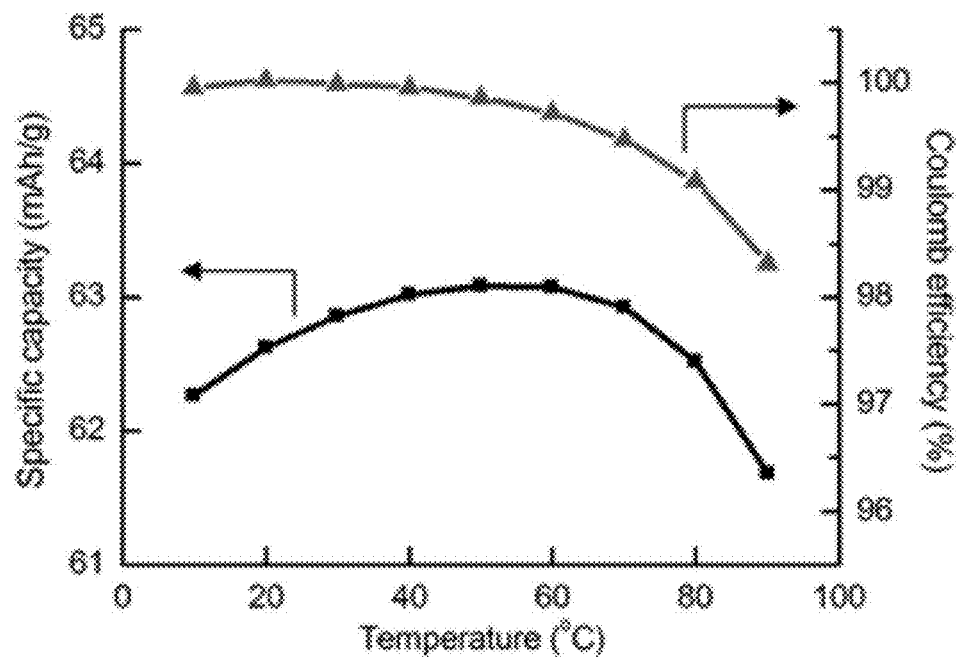

The galvanostatic cycling performance of a CuHCF half cell at temperatures ranging from 10 to 90° C. is shown in FIGS. 13A-13B. FIG. 14A is an exemplary plot of voltage (vs. standard hydrogen electrode (SHE)) as a function of specific charge capacity for a CuHCF half cell with an activated carbon counter electrode as a sodium ion sink at 10, 40, and 70° C. In the example shown in FIG. 14A, cycling rate was 5C, which took about 24 minutes for charging and discharging. The curves for different temperatures have similar shapes, but they exhibit shifting due to the thermogalvanic effect. FIG. 14B is an exemplary plot of specific charge capacity and coulomb efficiency of three cycles at each temperature. As shown in FIG. 14B, specific charge capacity increased as temperature increased until 60° C. For temperatures higher than 60° C., specific charge capacity decreased as temperature increased. Coulomb efficiency decreased slightly with increasing temperature, and its slope got stiffer with increasing temperature.

Figure 15A:
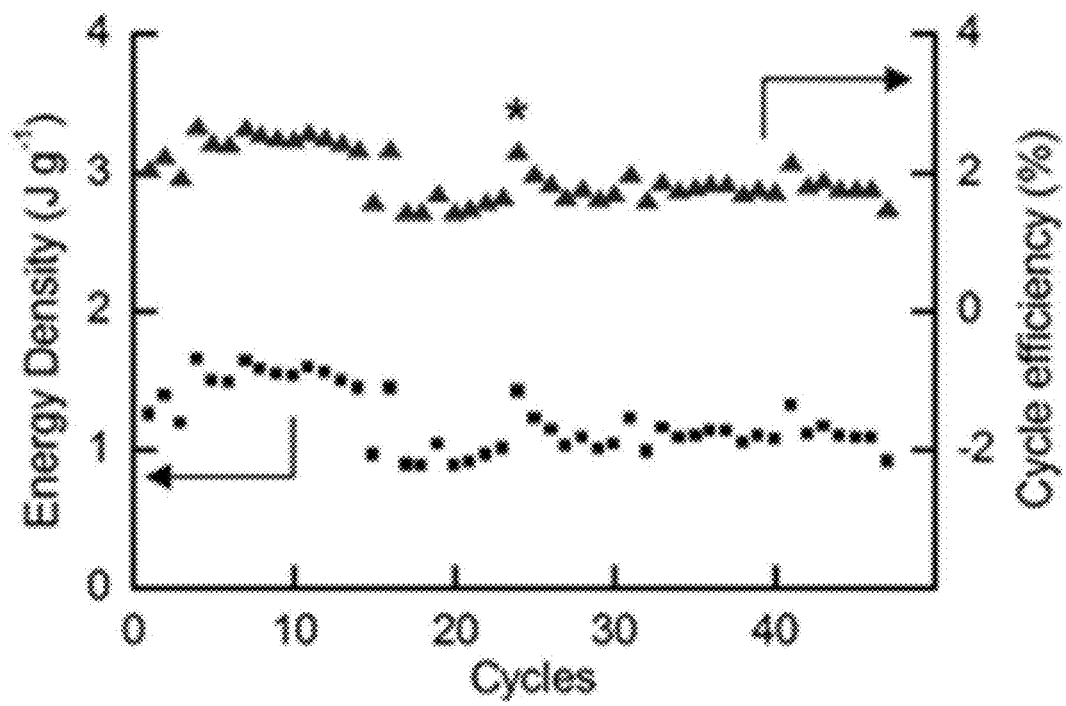
FIGS. 15A-15B are, according to some embodiments, exemplary plots illustrating the cycling performance of an electrochemical cell using CuHCF and Cu/Cu$^{2+}$ electrodes.
Figure 15B:
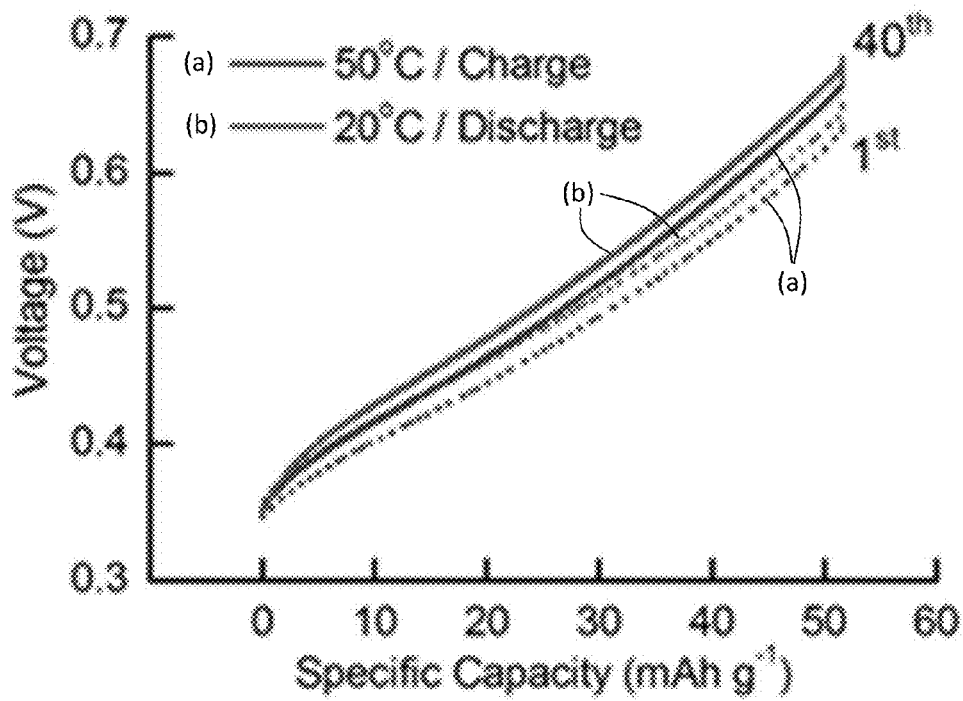

The cycling performance of the thermal energy harvesting system is shown in FIG. 15A. T$_H$ and T$_L$ were set to 50 and 20° C., respectively, to represent widely accessible temperatures of waste heat and room temperature. The current density was 17.9 mA g$^{-1}$. The energy density reached 1.26 J g$^{-1}$ in the initial cycle with an efficiency of 2.01%. The average efficiency was 1.91%, supposing 70% effectiveness of a heat exchanger. The asterisk denotes changing of the electrolyte because of severe drying after the 24$^{th}$ cycle. FIG. 15B compares the full cell voltage vs. specific capacity of CuHCF for the 1$^{st}$ (dotted line) and 40$^{th}$ (solid line)

cycles. A slight shift of the loop was observed, but there was no significant change in the overall shape. In addition, the cycling performance of CuHCF at higher temperature was confirmed by long-term galvanostatic cycling of a CuHCF electrode at 70° C. At this temperature, the capacity decay was only 9.1% over 500 cycles. (see FIG. 16). This result signified that this TREC for thermal energy harvesting was expected to have stable cycling with further optimization.

Figure 16A:
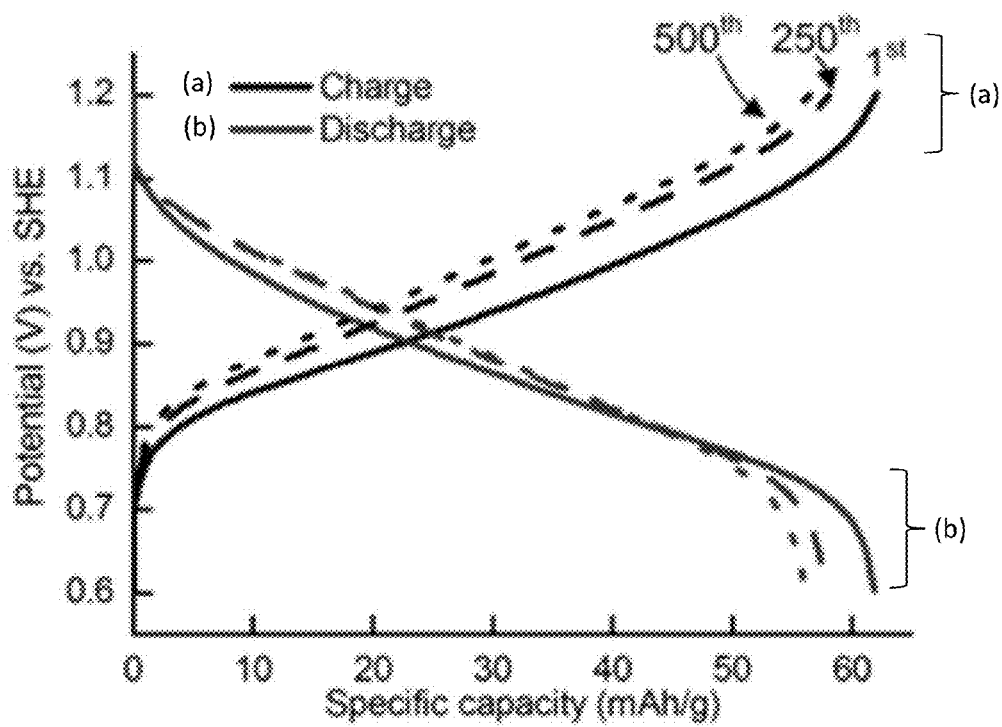
FIGS. 16A-16B are exemplary plots illustrating behavior of an electrochemical cell undergoing long-term galvanostatic cycling, according to some embodiments.
Figure 16B:
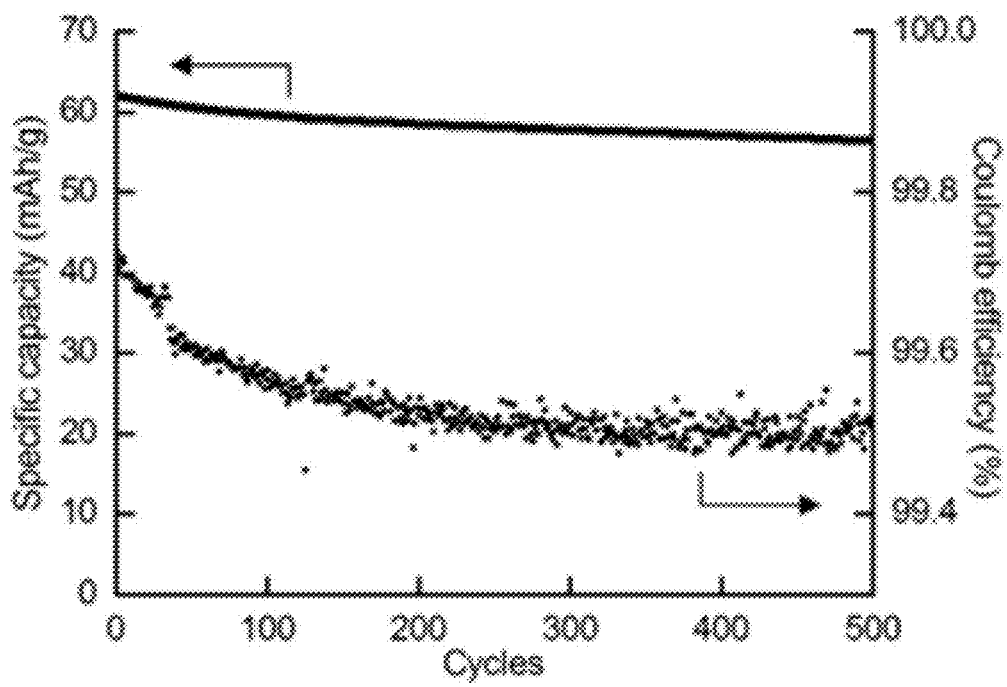

FIG. 16A is an exemplary plot of voltage (vs. SHE) as a function of specific charge capacity for long-term galvanostatic cycling of a thermogalvanic cell with a CuHCF electrode. While the shapes of the curves after 250 and 500 cycles did not significantly change compared to the curve of the first cycle, decaying of specific capacity was observed. FIG. 16B is an exemplary plot of specific charge capacity and coulomb efficiency as a function of number of cycles. After 500 cycles, 9.1% decaying of specific capacity was observed, and coulomb efficiency saturated at 99.5%.

Example 2

This example describes a charging-free thermally regenerative electrochemical system (TRES) comprising a $Fe(CN)_6^{3-/4-}$ positive electrode and a Prussian blue negative electrode.

Figure 17A:
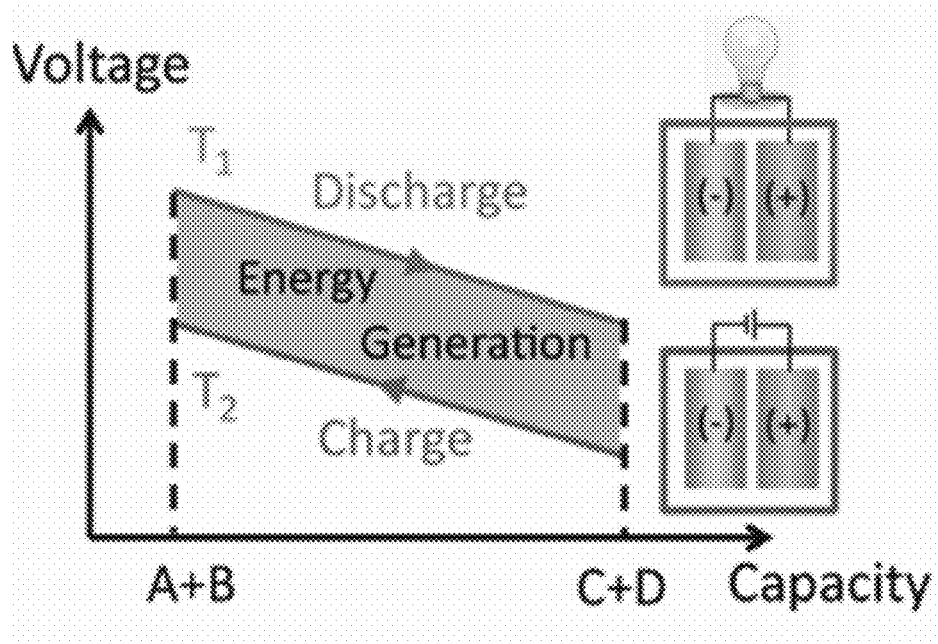
FIG. 17A is, according to some embodiments, an exemplary schematic diagram of an electrically-assisted thermally regenerative electrochemical system undergoing a thermodynamic cycle.
Figure 17B:
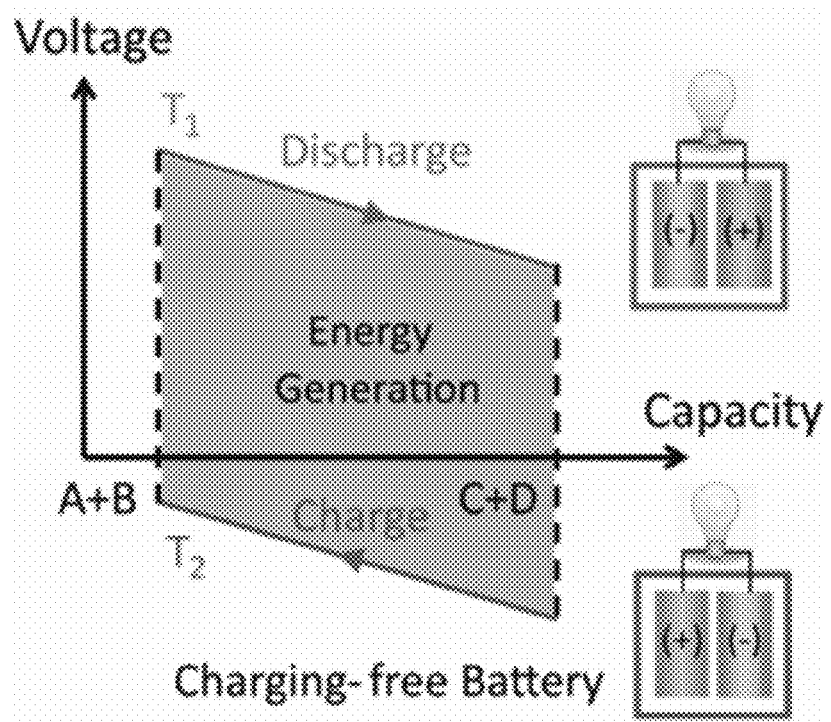
FIG. 17B is, according to some embodiments, an exemplary schematic diagram of a purely thermally regenerated electrochemical system undergoing a thermodynamic cycle.

The electrochemically active material could be discharged at a low temperature. At a higher temperature, the cell voltage decreased to a negative value such that the electrochemically active material could be regenerated (via a process that was the reverse of the discharging process) spontaneously (essentially corresponding to a discharge process rather than a charge process) (see FIG. 17). FIGS. 17A-17B show exemplary schematics of electrochemical cells that are and are not charging free. For example, FIG. 17A is an exemplary schematic diagram for an electrically-assisted thermally regenerative system. Net energy is generated as the regeneration voltage is smaller than the discharge voltage, but external charging is needed in each cycle. FIG. 17B, however, presents an exemplary schematic diagram for a charge free electrochemical cell. For the cell of FIG. 17B, the voltage shift due to temperature change is large enough such that the full cell voltage at second temperature $T_2$ is negative. The electrochemical process to return to the initial state (A+B) at $T_2$ is still discharge, regenerating the cell. Consequently, the system can be cycled without the input of electricity, which can simplify system design and lower cost. The heat-to-electricity efficiency of the system can reach 1.9% when a heat exchanger is used. Even without a heat exchanger, the efficiency is three times higher than that of previous thermogalvanic cells. Furthermore, the system can be configured to use only Earth-abundant materials, making it even more attractive for harvesting waste heat and renewable thermal energy.

At room temperature, the positive and negative electrodes of the charging-free cell were 0.3 M $K_3Fe(CN)_6$/0.5 M $K_4Fe(CN)_6$ aqueous solution and half-discharged Prussian blue nanoparticle ($KFe^{II}Fe^{III}(CN)_6$, PB), respectively. All chemicals described in this example were purchased from Sigma Aldrich.

PB nanoparticles were synthesized using a simple solution approach. To synthesize PB, 40 mL of 50 mM $FeCl_2$ was added to 40 mL of 25 mM $K_3Fe(CN)_6$ under strong stirring at room temperature, producing nanoparticles with an average particle size of about 100 nm. The precipitation was centrifuged and dried at 70° C. overnight. The PB electrode was prepared by mixing 70 wt % PB nanoparticles, 20 wt % Super P carbon black, and 10% polyvinylidene fluoride (PVDF) in N-Methyl-2-pyrrolidone (NMP) and drop casting onto a carbon cloth disc electrode (Fuel Cell Store) at 90° C. The carbon cloth disc had a diameter of 1.27 cm and the mass loading was about 5 mg PB $cm^{-2}$. The PB electrode was pre-cycled in 1 M $KNO_3$ aqueous electrolyte for 10 cycles to convert it from the so called "insoluble" phase to "soluble phase". Then it was discharged to the midpoint of the voltage curve before assembling the full cell. 0.5 M $K_4Fe_4(CN)_6$/0.3 M $K_3Fe_3(CN)_6$ catholyte was prepared by dissolving corresponding chemicals in deionized water. The concentration was chosen to be close to the solubility limit. A carbon cloth electrode disc with diameter of 1.27 cm served as a current collector for the catholyte. A Nafion 115 membrane was used to separate the liquid catholyte from the anode. The membrane was pretreated with concentrated sulfuric acid for two hours and stored in 0.5 M $KNO_3$ aqueous solution before use.

Measurements on the thermogalvanic coefficient of electrodes were performed against a calibrated Ag/AgCl/4 M KCl reference electrode (Fisher Scientific) in a three neck flask. The thermogalvanic coefficient of the reference electrode was measured to be 0.12±0.02 mV/K. A home-made plastic cell was used for all measurements of the full cell. The PB electrode and the cathode current collector were first attached to 50 μm thick stainless steel strips. Subsequently, the electrodes were inserted into the home-made plastic cell and separated by the Nafion 115 membrane. Then the $Fe(CN)_6^{3-/4-}$ catholyte and the $KNO_3$ electrolyte were injected into each side through holes on top of the plastic cell. The cycling tests of full cells were performed through loading the plastic cell in and out of a gravity convection oven (MTI) with temperature measured by a thermocouple. For high temperature cycling of the PB electrode, Ag/AgCl was used as the reference electrode, and another piece of PB electrode with three times the density of active materials was used as the counter electrode. High temperature cycling of $Fe(CN)_6^{3-/4-}$ catholyte was done in a symmetric configuration by injecting the solution to both sides of the plastic cell. All electrochemical measurements were done with a Bio-Logic VSP300 tester.

Figure 18A:
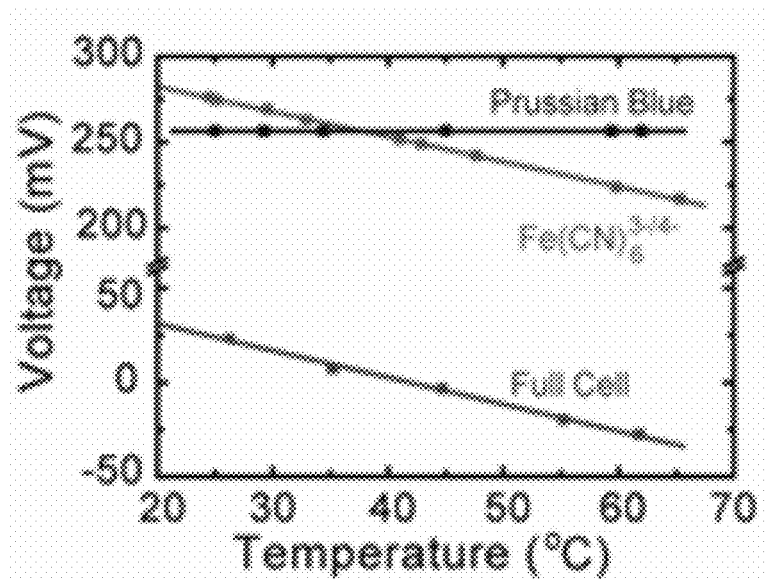
FIGS. 18A-18D are exemplary plots illustrating the discharging and regenerating characteristics of an Fe(CN)$_6^{3-/4-}$/Prussian Blue electrochemical cell, according to some embodiments.
Figure 18B:
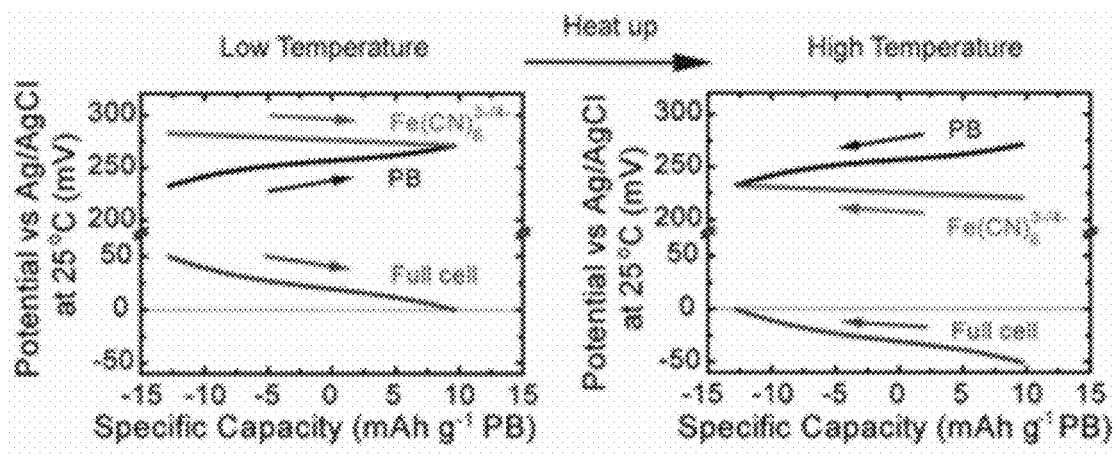

As shown in FIG. 18A, the positive electrode had a negative thermogalvanic coefficient of −1.46±0.02 mV/K while the potential of the PB electrode showed a very weak dependence on temperature (0.00±0.03 mV/K) from room temperature to 60° C. The cell voltage showed a thermogalvanic coefficient of 1.43±0.03 mV/K, which was consistent with the difference between the thermogalvanic coefficients of the two electrodes. The thermogalvanic coefficient also slightly depended on the state of charge (SOC). The temperature dependence of the PB electrode and the full cell were measured when PB was discharged to the midpoint of the voltage curve. In the full cell, the voltage polarity is reversed at low and high temperatures, suggesting that the cell can operate in both charging and discharging states. The electrochemical process of the electrodes and the full cell in a thermal cycle between 24° C. and 60° C. is illustrated in FIG. 18B. At the low temperature ($T_L$), the cell was discharged to 0 mV (illustrated as the voltage curve moving from left to right), producing electricity. Then the cell was disconnected and heated. The electrochemical potential of the $Fe(CN)_6^{3-/4-}$ electrode shifted down due to its negative thermogalvanic coefficient while the potential of the PB electrode remained almost unchanged. This led to a negative full cell voltage at the beginning of the high temperature process (right end in the scheme of $T_H$). In the reverse process at the high temperature ($T_H$) (moving from right to left in FIG. 18B), the absolute value of the full cell voltage decreased to 0 mV. Hence, during this process, the cell was discharged (instead of charged), and the current ran in the opposite direction. The last process was to cool the cell down to $T_L$ to complete the cycle. The minimum energy input in the cycle was the heat absorbed at $T_H$. Consequently, the theoretical efficiency of this charging-free electrochemical system is Carnot efficiency. Details on the efficiency calculation are discussed later in this example.

Figure 18C:
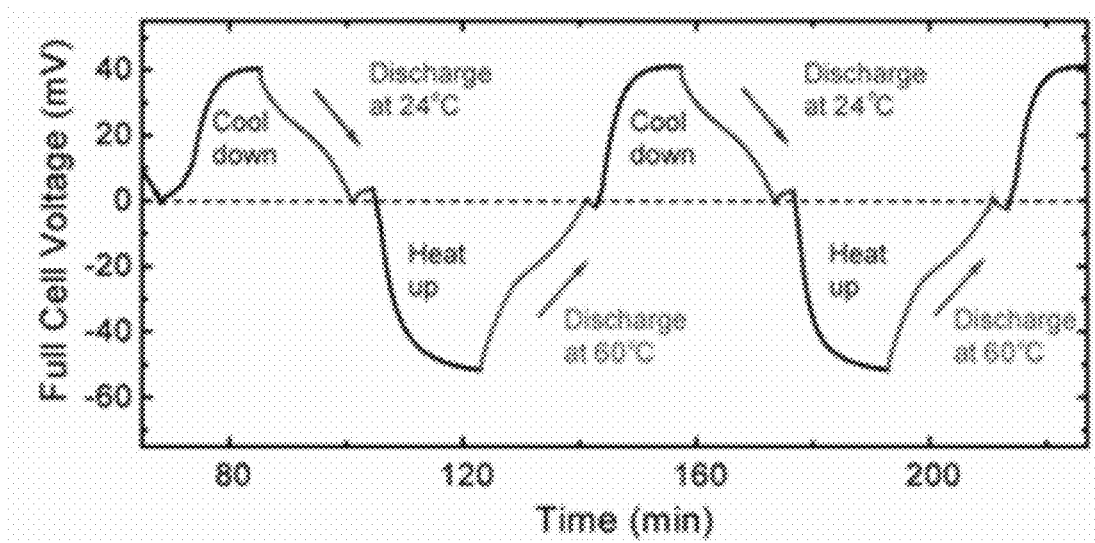
Figure 18D:
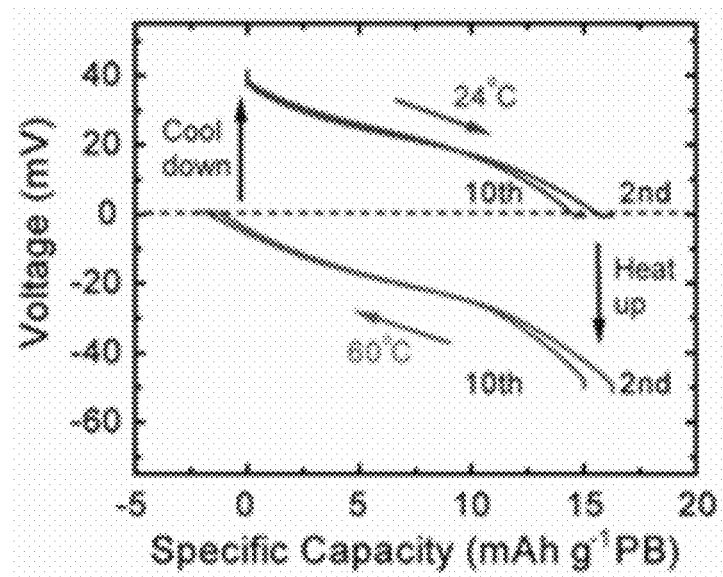

FIG. 18C is a plot of the experimentally determined full cell voltage as a function of time. The cell was cycled between room temperature (24° C.) and 60° C., and electricity was generated at both temperatures. The open-circuit voltage (OCV) at 24° C. was 41 mV, and the cell was discharged to 0 mV. After current stopped, the voltage increased to 4-5 mV due to relaxation. This small overpotential indicated that the system had fast kinetics. Then the cell was moved to an oven preheated to 60° C. When heated, the OCV became more negative and finally saturated at −52 mV. The cell was then discharged at 60° C. After the voltage reached 0 mV again, the cell was cooled down and returned to its initial state at 24° C. Without wishing to be bound by any particular theory, it is believed that the difference between the OCV at 24° C. and the OCV at 60° C. arose from the thermogalvanic coefficient's dependence on SOC. During the cooling and heating process, the cell was at different SOCs, and the cell thermogalvanic coefficients were different. It is believed that this led to different magnitudes of voltage change in cooling and heating. The current rate in both discharges was 60 mA g$^{-1}$, based on the mass of the PB electrode. The constant current discharge was followed by a short period of constant voltage discharge at 0 mV until the current was reduced to 30 mA g$^{-1}$. The data was also plotted as voltage versus specific capacity (FIG. 18D). It was clear that the voltage curve at both 24° C. and 60° C. had the same shape and the thermogalvanic effect simply shifted the curve down without affecting the nature of the electrochemical reactions. The plot also showed that the specific capacity was only about ¼-⅓ of the theoretical capacity of PB (60 mAh g$^{-1}$). This was because the potential difference between the two electrodes must be less than αΔT, the voltage change due to the thermogalvanic effect. Otherwise, the cell would need a charging process at either $T_H$ or $T_L$.

Figure 19A:
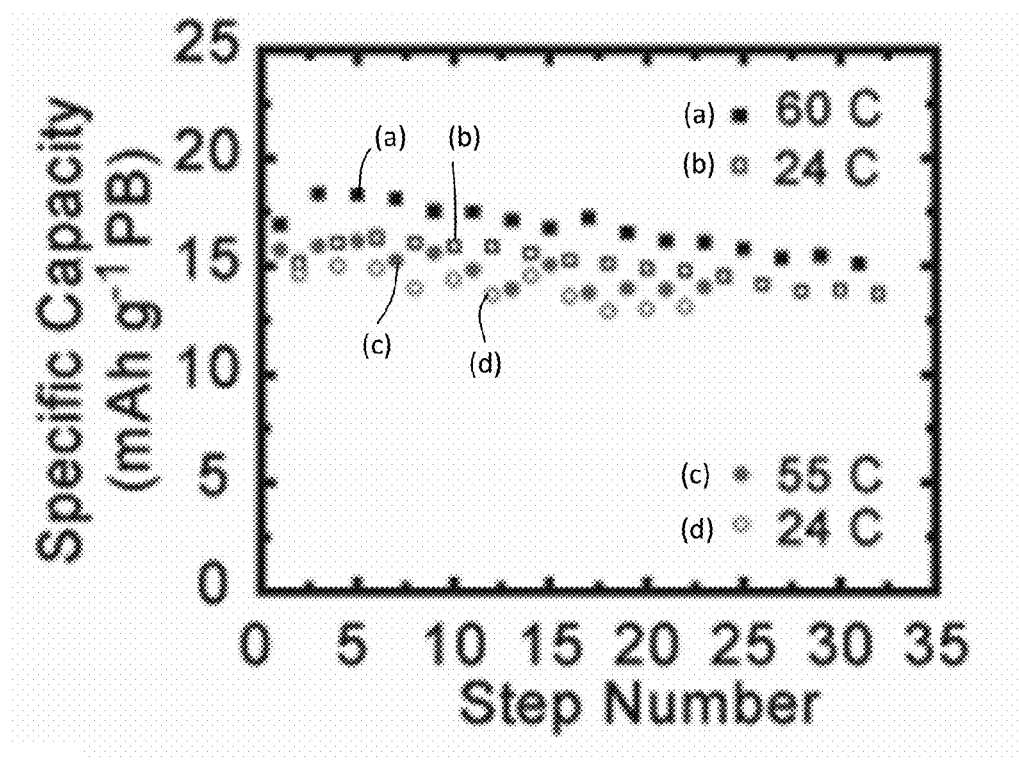
FIGS. 19A-19D are, according to some embodiments, exemplary plots illustrating the cycling performance of an Fe(CN)$_6^{3-/4-}$/Prussian Blue electrochemical cell.
Figure 19B:
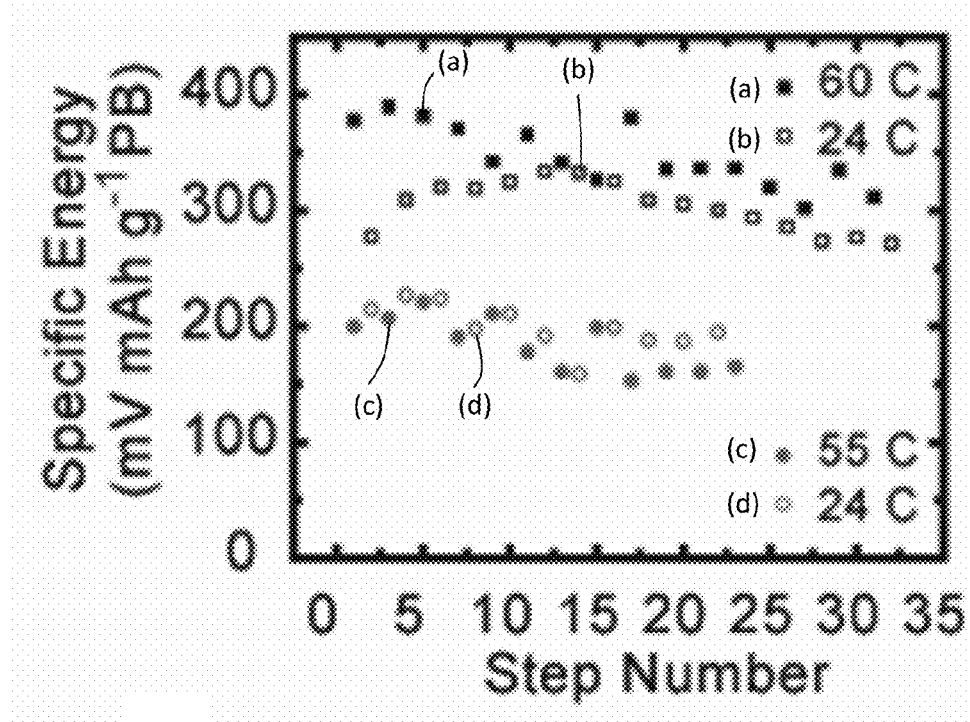

FIG. 19A illustrates the cycling performance of this charging-free system with respect to specific capacity and specific energy. The volume of Fe(CN)$_6^{3-/4-}$ and the mass of PB are about 100 µL and 5-6 mg, respectively. Discharges at both temperatures were done with a current rate of 60 mA g$^{-1}$ to 0 mV followed by constant voltage discharge with a cut-off of 30 mA g$^{-1}$. Results on cycles between 55° C./24° C. and 60° C./24° C. in air are plotted. Each cycle had two steps, one at high temperature and one at low temperature. For 60° C./24° C., the initial specific capacity based on the mass of PB was 15.2 mAh g$^{-1}$ and dropped slightly to 13.8 mAh g$^{-1}$ after 30 steps. The capacity between 55° C. and 24° C. was slightly lower. This demonstrates that the reaction was reversible and the system had a reasonable cycle life. The corresponding data on specific energy vs. step number is plotted in FIG. 19B. Although $T_H$ only changed by 5° C., the energy of the cell cycled between 24° C. and 60° C. was almost twice that of the cell cycled between 24° C. and 55° C. Without wishing to be bound by any particular theory, it is believed that this was because the higher temperature not only increased the full cell voltage, but also extended the capacity range and lowered the internal resistance at high temperature. It is believed that these three effects doubled the energy output of the electrochemical system.

Figure 19C:
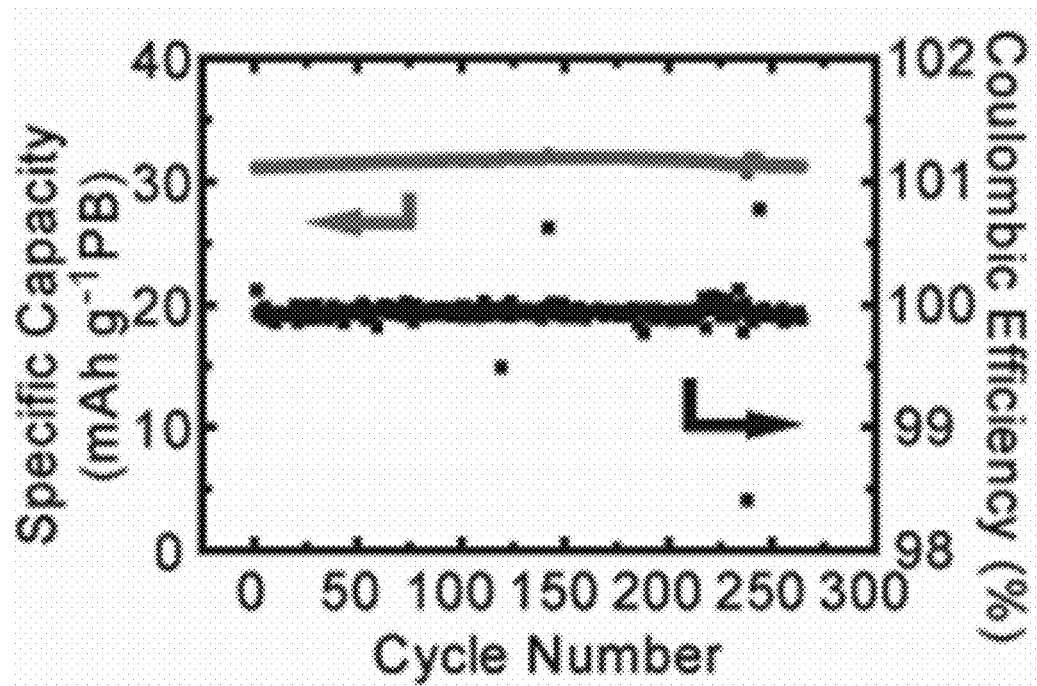
Figure 19D:
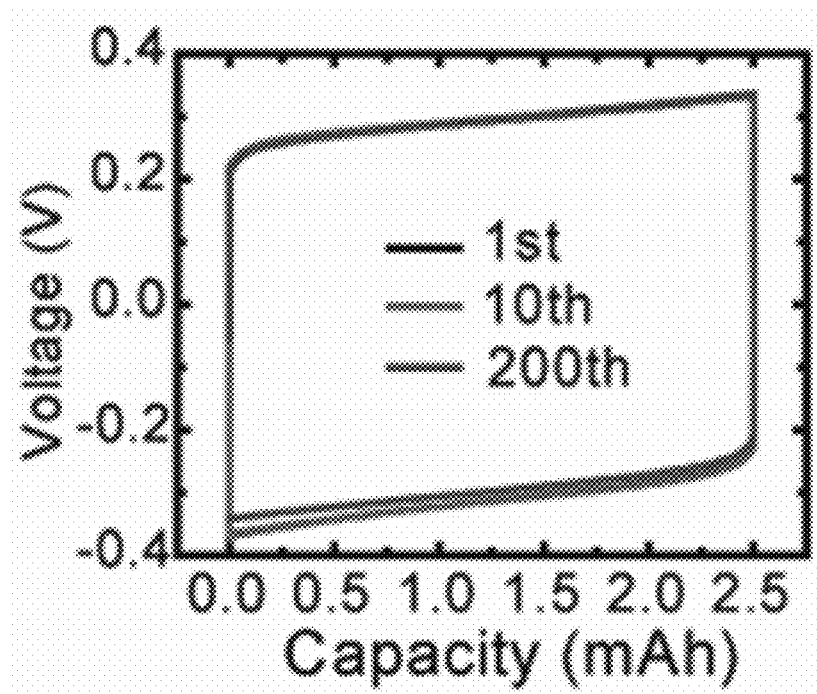

PB electrodes show excellent cycling performance at room temperature and Fe(CN)$_6^{3-/4-}$ is highly reversible, but there have been few studies of their high temperature performance, which is generally thought to be worse. To test the long term stability of the system, the cycle life of both electrodes was examined at 60° C. Both electrodes showed stable cycling over 200 cycles. For the PB electrode, oxygen dissolved in water significantly impacts cycle life, so the test was performed in a N$_2$ environment. Since only about 20 mAh g$^{-1}$ of the full capacity could be used in real operation, the electrode was cycled between 360 and 190 mV vs. Ag/AgCl at a current rate of 300 mA g$^{-1}$, which corresponded to a specific capacity of about 30 mAh g$^{-1}$. The capacity was chosen to be higher than that in real operation to estimate the lower boundary of cycle life. Substantially no decay was observed over 250 cycles (FIG. 19C) and the coulomb efficiency was as high as 99.94%. The Fe(CN)$_6^{3-/4-}$ electrode was tested in constant capacity cycling mode in air. The current was 10 mA. The voltage gap between charge and discharge even became slightly smaller than the first cycle as more surface of the carbon cloth electrode became activated (FIG. 19D). These observations support that the electrode material was stable under cycling and the system is promising for long term operation.

Figure 20A:
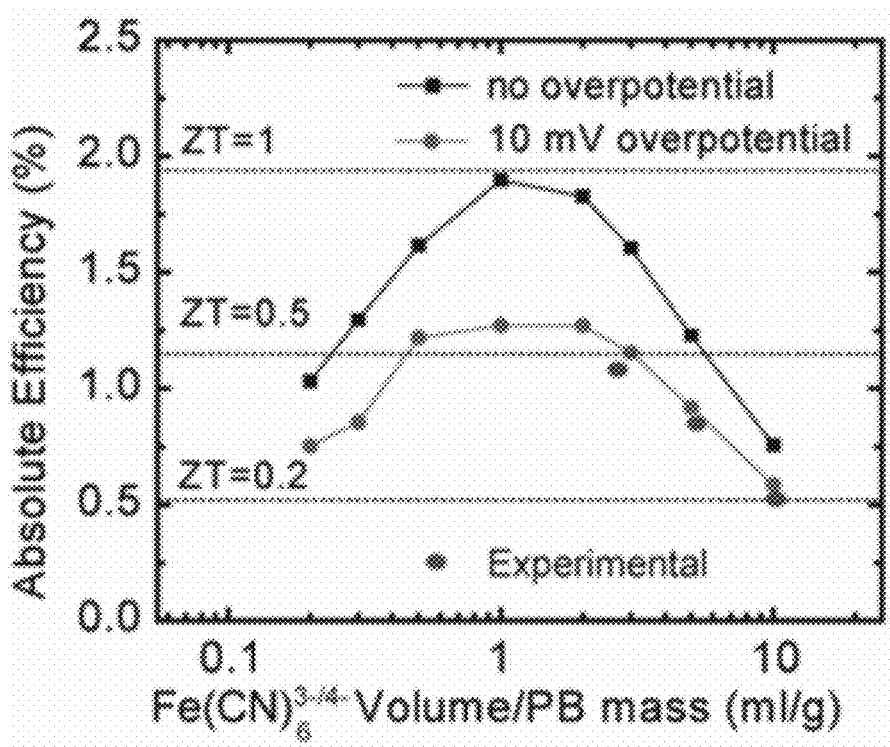
FIGS. 20A-20B are exemplary plots illustrating the heat-to-electricity conversion efficiency of an Fe(CN)$_6^{3-/4-}$/Prussian Blue electrochemical cell, according to some embodiments.

The efficiency for heat-to-electricity conversion (η) was calculated for the cycle between 24° C. and 60° C. and was based on the theory discussed in Example 1:

$$\eta = \frac{W}{Q_H + Q_{HX}}$$

where W was the total electrical work in one cycle or the total amount of discharged energy at both low and high temperatures, $Q_H$ was the heat absorbed at high temperature, and $Q_{HX}$ was the energy loss in the heat exchanging process. The absolute efficiency was a function of the ratio (φ) of Fe(CN)$_6^{3-/4-}$ volume to PB mass (FIG. 20A). The cell operated with a maximum efficiency of 1.9% at φ of about 1-2, assuming a heat exchanger effectiveness of 70% and no overpotential. The latter assumption was theoretically achievable at small currents or by minimizing the internal cell resistance with the use of a high surface current collector and nano-sized materials. The theoretical results, however, could be matched with the experiments (unconnected dots in FIG. 20A) by introducing an overpotential of 10 mV (lower curve in FIG. 20A). It is believed that there were two competing effects responsible for the cell efficiency maximum. When a large amount of Fe(CN)$_6^{3-/4-}$ catholyte was used, the catholyte's contribution to the change of the full cell voltage was negligible and thus, a larger charge capacity and output energy could be obtained. However, this happened at the cost of a larger heat capacity of the full cell requiring a larger heat input leading to a decrease in the overall efficiency. When a 10 mV overpotential was considered, the maximum efficiency was 1.3. This was lower than the efficiency of the TRES based on copper hexacyanoferrate (CuHCF) and Cu/Cu$^{2+}$ electrodes described in Example 1. It is believed that there are two reasons for this: 1) Fe(CN)$_6^{3-/4-}$ has a low solubility in water which limits the charge capacity and 2) only about ⅓ of the theoretical capacity can be used due to the charging-free characteristic. However, the efficiency is still much higher than thermogalvanic cells, another strategy based on the thermogalvanic effect but with the same architecture as thermoelectric devices. It is believed that the highest reported efficiency in thermogalvanic cells is 0.24% with hot side at 65° C. and cold side at 5° C. The efficiency of the same device working between 24° C. and 60° C. is estimated to be about 0.16% as the temperature difference is less.

Figure 20B:
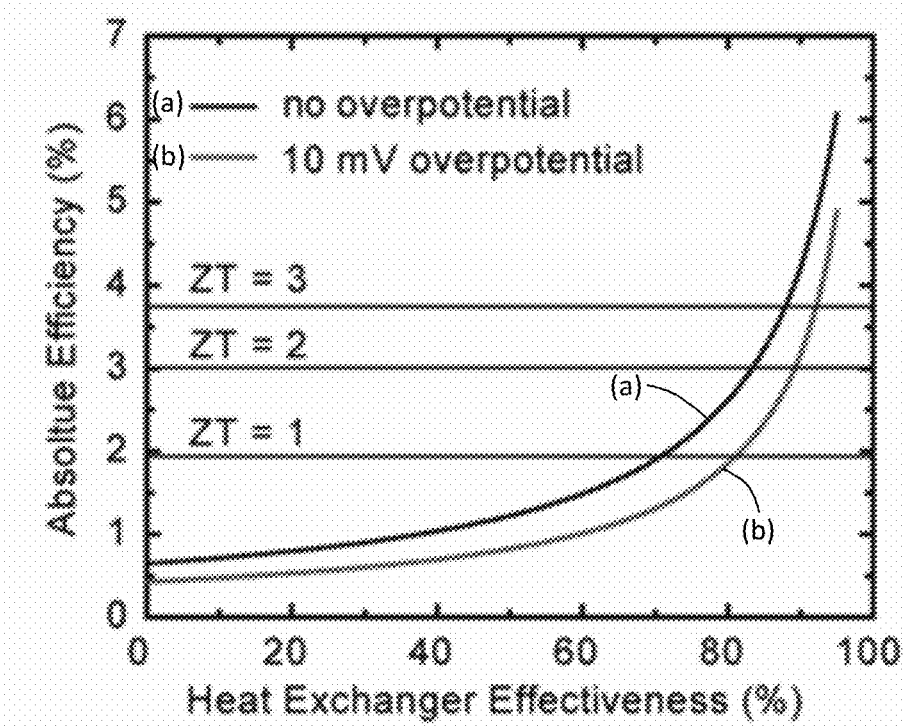

The conversion efficiency of this charging-free electrochemical system depended on the effectiveness of the heat exchanger (FIG. 20B). If effectiveness of 85% was considered, the heat-to-electricity conversion efficiency could reach 3.2% and 2.3% for 0 and 10 mV overpotential, respectively. If no heat exchanger was used, which simplified the design, efficiency was still around 0.5% and it was about a threefold over that of alternatives such as thermogalvanic cells. It is interesting to compare the efficiencies above with thermoelectric devices. For a cycle between 60° C. and 24° C., efficiencies of 1.9% and 1.3% would requires an ideal thermoelectric device with average ZT of 0.97 and 0.58, respectively, while efficiencies of 3.2% and 2.3% led to equivalent ZT of 2.3 and 1.3 for ideal thermoelectric devices. It is believed that further improvement in efficiency and power rate could be realized by reducing the internal resistance of electrodes and by using materials with high positive thermogalvanic coefficients and figures of merit (Y).

Example 3

This example describes the conceptual design and experimental validation of a heat recuperation scheme with high efficiency.

The efficiency of heat recuperation can be an important factor in TREC system efficiency. However, in certain instances in which low temperature differentials between the hot and cold cells, and constant temperature operation at the charge and discharge states of the thermodynamic cycle are used, it is not immediately apparent how to achieve highly efficient heat recuperation. This example describes a simple contact experiment showing a heat recuperation efficiency of 43.5% and a design capable of achieving higher efficiency (60-70%). Tests on key components to validate the design are also described.

Direct Contact Heat Recuperation

Figure 21:
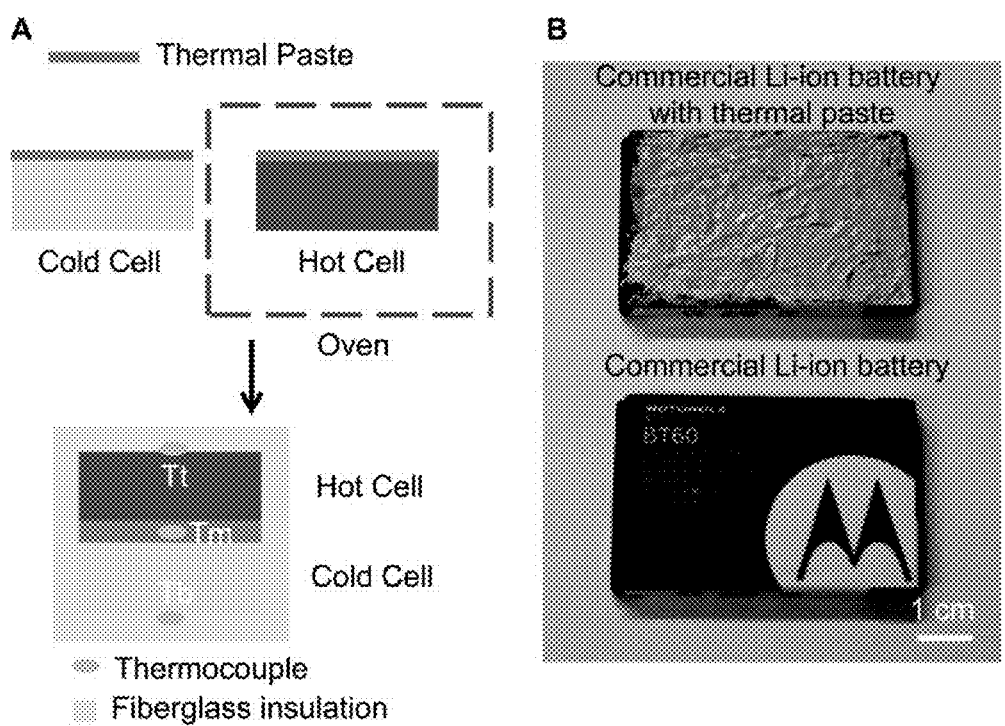
FIGS. 21A-21B are, according to some embodiments: (a) an exemplary schematic illustration of heat recuperation by direct contact; and (b) a commercial Li-ion battery with and without thermal paste.

One example of a heat recuperation configuration is to directly contact the hot and the cold cell, which can lead to a theoretical heat recuperation efficiency of 50%. In this example, a commercial Motorola Li-ion battery pack with a capacity of 1130 mAh and a mass of 23.2 grams was used. Its temperature was monitored by thin thermocouple wires attached to its surface. The experimental process is illustrated in FIG. 21A. First, both batteries were covered with the same amount of thermal paste (0.7 gram). FIG. 21B shows photographic images of a commercial Li-ion battery with and without thermal paste. One battery was placed in an oven set to 50° C. for 2 hours to equilibrate with the environment. The hot cell was subsequently removed from the oven and pressed onto the cold cell. The two cells were surrounded by fiberglass insulation during heat exchange. The temperature of the cold cell was calculated as the average of temperatures at the top ($T_m$) and bottom surfaces ($T_b$) of the cold cell.

Figure 22:
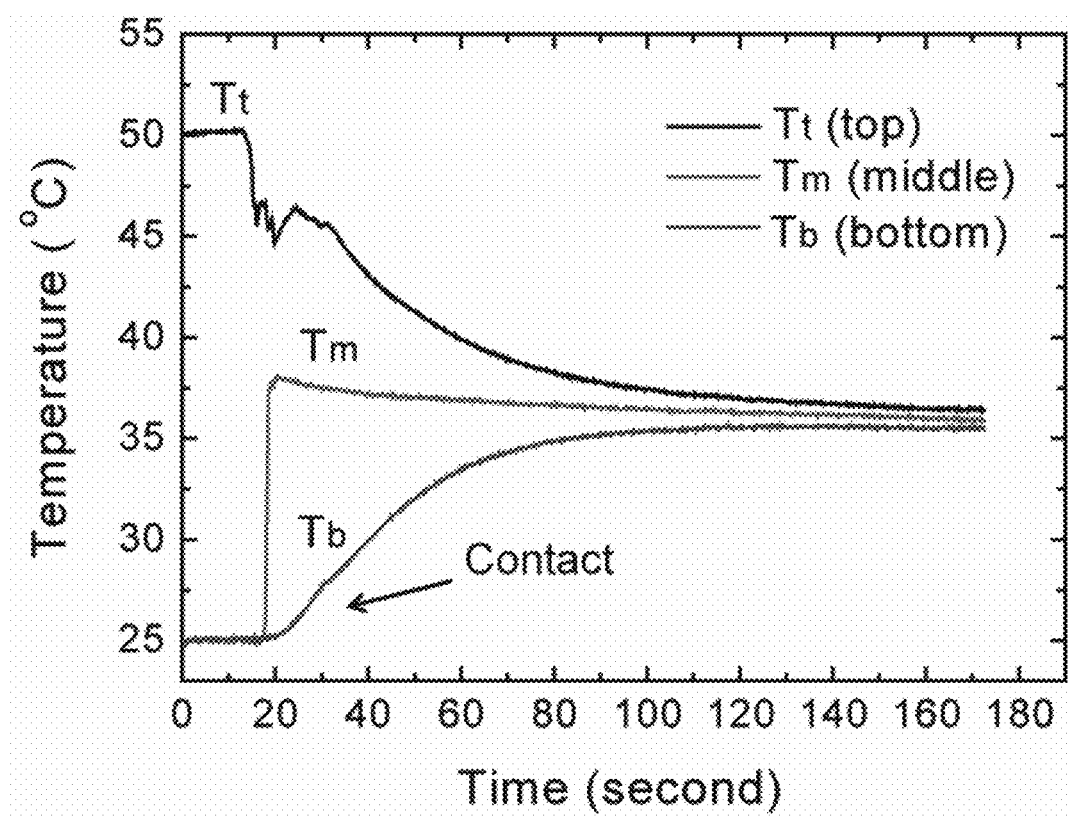
FIG. 22 is exemplary plot of temperature as a function of time at the top surface of a hot cell (top), interface between a hot cell and a cold cell in direct contact (middle), and bottom surface of a cold cell in direct contact with the hot cell (bottom), according to some embodiments.

The experimental results, showing temperature change when a hot cell and a cold cell contact each other, are shown in FIG. 22. $T_t$, $T_m$ and $T_b$ are the temperatures at the top of the hot cell, between the two cells, and at the bottom surface of the cold cell, respectively. The highest average temperature between $T_m$ and $T_b$ was 35.95° C. in the experiment. The temperatures of the cold cell ($T_C$) and the hot cell ($T_H$) before contact were 25.0 and 50.2° C., respectively. Consequently, the heat recuperation efficiency was (35.95−25.0)/(50.2−25.0)=43.5%.

The results indicated that heat recuperation efficiency of about 40% could be achieved.

Step-Wise Heat Recuperation: Concept

It is believed that the direct contact scheme is generally limited to 50% recuperation efficiency. Higher efficiency can be achieved with more sophisticated designs. Here, the use of a liquid, such as water, as a heat carrier to transfer heat from hot TREC cells to cold TREC cells can be considered. Ideally, hot cells would be cooled to the ambient temperature, and energy rejected from hot cells would be used to heat cold cells to the desired high operational temperature. In certain cases, temperature inversion happens: the original hot cells become cooler than the original cold cells, and heat rejected from the originally hot cell cannot be transferred to the originally cold cell after this temperature inversion.

To overcome this challenge, a step-wise process was developed. In this scheme, hot cells are cooled by multiple thermal reservoirs from high to low temperature in sequence, then the reservoirs transfer absorbed energy to cold cells step by step from low temperature to high temperature. This ensures that the heat transfer between hot cells and cold cells happens at a small temperature difference with high effectiveness.

Figure 23:
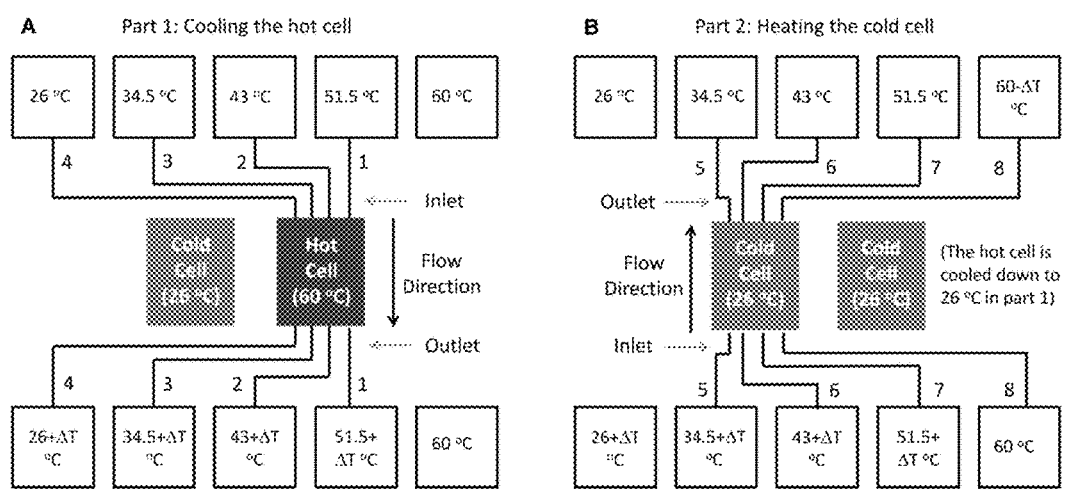
FIGS. 23A-23B are, according to some embodiments, exemplary schematic illustrations of: (a) step-wise cooling of a hot cell; and (b) step-wise heating of a cold cell.

The design of such a system is illustrated in FIG. 23. In this exemplary system, the hot cell is initially at 60° C., and the cold cell is initially at 26° C. (room temperature). In the exemplary system, the reservoir at 26° C. is the ambient reservoir, and the reservoir at 60° C. is the external heat source. The hot cell can be cooled down and the cold cell can be heated up step by step using intermediate hot and cold reservoirs containing a heat transfer fluid (HTF, water for example) at different temperatures (51.5, 43, and 34.5° C. in FIG. 23). The reservoirs may be connected to the hot and cold cells with tubing, which is not shown in FIG. 23. In this exemplary system, reservoirs were used to explain the step-wise heat recuperation concept. These hot and cold reservoirs can be replaced by heat exchangers in practical systems. The cooling of the hot cell originally at 60° C. can be done by four steps using HTF at 51.5, 43, 34.5, and 26° C., respectively. In each step, the HTF temperature increases slightly, absorbing heat from the hot cell. The heated HTFs at 34.5, 43 and 51.5° C. can be diverted to cold cells in sequence (FIG. 23B) to transfer the gained heat to the cold cell. If the effectiveness of heat exchange between the cell and HTFs is 1 (as demonstrated experimentally), there is no energy loss for reservoirs at 34.5, 43 and 51.5° C., since all heat received from the hot cell is transferred to the cold cell. The only extra energy needed is the last step in heating, warming the cold cell to 60° C. using an external reservoir at 60° C., which is $C_c$*8.5 K with $C_c$ the heat capacity of the cell in the unit of J K$^{-1}$. Consequently the heat recuperation efficiency ($\eta_{HX}$) is $$1 - C_c * 8.5 K / C_c * (60° C. - 26° C.) = 75\%$$

In general, if there are n+1 reservoirs at $T_L$, $T_L+\Delta T$, $T_L+2\Delta T$, ... and $T_H$ ($\Delta T = (T_H - T_L)/n$), $$\eta_{HX} = \frac{n-1}{n} \qquad (8)$$

Experimental Validation of the Step-Wise Heat Recuperation System

Figure 24:
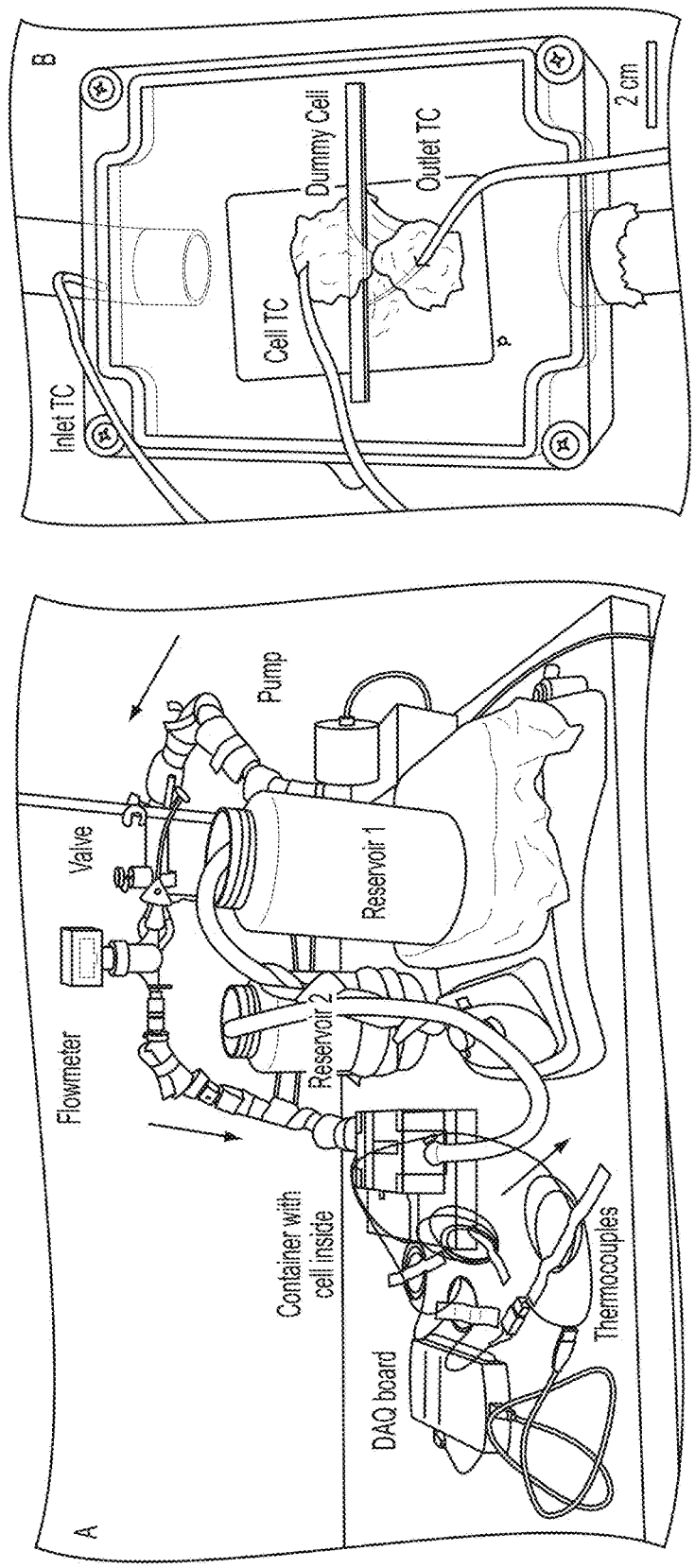
FIGS. 24A-24B are exemplary photographs of a heat exchange system, according to some embodiments.

To validate the step-wise heat recuperation approach, a prototype system was built as shown in FIGS. 23A-B. For each heat exchange step, water was pumped from reservoir 1 (1.5 L) at a flow rate of 2.3 liters per minute. The flow rate was controlled by a valve and a flowmeter. The pumped water flowed through a plastic chamber with a stainless steel dummy battery inside and drained to the other empty reservoir (reservoir 2). After each step of heat exchange, reservoirs 1 and 2 were replaced by another set of reservoirs at a different temperature for the next step. Water flowed to reservoir 2 in the heating process was used in the cooling process. A dummy cell made of 304 stainless steel, which has a thermal diffusivity ($4 \times 10^{-6}$ m² s$^{-1}$) similar to batteries ($10^{-6}$ to $10^{-5}$ m² s$^{-1}$), was used. The size of the dummy battery was 3.3 cm×7 cm×0.6 cm. In comparison, a typical phone battery has a size of 3 cm×5 cm×0.5 cm (Motorola). To calculate the heat exchanged between water and the cell, temperatures at the inlet, cell, and outlet were measured with K-type thermocouples (TCs) and recorded with a data acquisition (DAQ) board at a frequency of 10 Hz. The cell temperature was measured with a thermocouple embedded in a hole drilled in the center of the cell (FIG. 24B).

Figure 25:
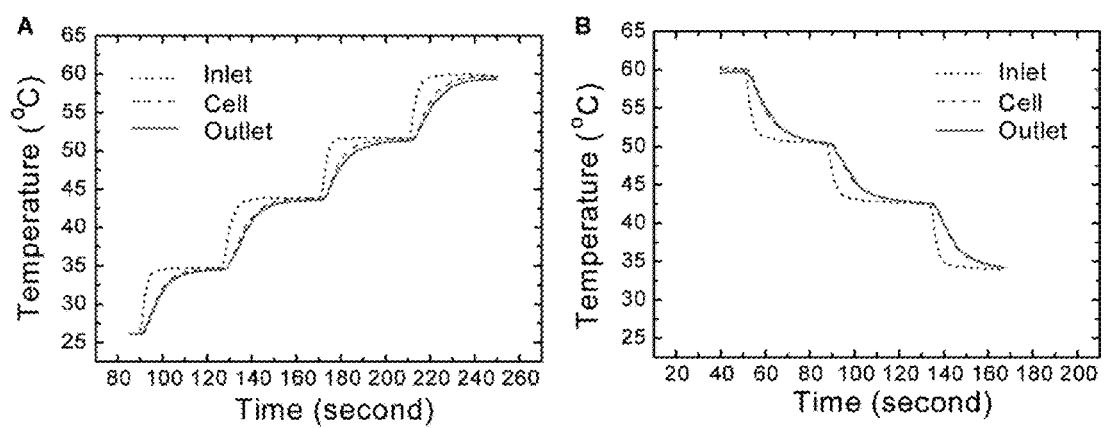
FIGS. 25A-25B are, according to some embodiments, exemplary plots of temperature as a function of time for: (a) a heating process; and (b) a cooling process.

FIG. 25 shows the measured temperature at the inlet ($T_{in}$), cell ($T_{cell}$), and outlet ($T_{out}$) during heating and cooling. In the experiment, heating (FIG. 23B) was performed before cooling (FIG. 23A). This switch did not affect any results relating to efficiency, as cells in real systems go through cyclic processes. $T_{in}$ behaved like a step function as the temperature of the reservoirs changed from 26° C. to 60° C. and decreased back to 34.5° C. step by step. The last step in cooling (34.5→26° C.) was not performed, as heat harvested in this step cannot be used for heating in following cycles and thus was not used in any calculations. $T_{cell}$ and $T_{out}$ gradually responded to $T_{in}$ due to the heat capacity of the dummy cell. The highest temperature $T_{cell}$ and $T_{out}$ reached was 59.6° C. at the end of heating. The fast and efficient heat exchange between cell and water was reflected by the small difference between $T_{cell}$ and $T_{out}$. Based on the small temperature difference between $T_{cell}$ and $T_{out}$, an effectiveness of 1 for the heat exchange between the cell and the HTF can be assumed. The gap between $T_{in}$ and $T_{out}$ indicated heat rejected from or lost to the cell.

Based on equation (8), the theoretical efficiency of the procedure above is (4−1)/4=75%. The experimental heat recuperation efficiency can be expressed as $$\eta_{ex} = \frac{\text{Heat rejected from the hot cell to reservoirs at 51.5, 43, and 34.5° C.}}{\text{Heat absorbed by the cold cell from reservoirs at 34.5, 43, 51.5, and 60° C.}} \quad (9)$$

In the i th step, heat rejected to the reservoir ($Q_i$) is:

$$Q_i = \int \dot{m} C_{water} \Delta T dt \quad (10)$$

where $\dot{m}$ is the volumetric flow rate of water in the unit of m³ s$^{-1}$, $C_{water}$ is the heat capacity of water in the unit of J m$^{-3}$ K$^{-1}$, and $\Delta T = T_{out} - T_{in}$. $Q_i$ is positive for the cooling process and negative for the heating process.

In experiments, the flow rate $\dot{m}$ was kept constant by the flowmeter and valve. $C_{water}$ was nearly constant between 26 and 60° C. (about 0.1% difference). Thus, based on FIG. 25 and equations (9) and (10):

$$\eta_{ex} = -\frac{\sum \text{cooling with reservoirs at 51.5, 43,} \text{ and 34.5° C.} \int \Delta T dt}{\sum \text{heating with reservoirs at 34.5, 43, 51.5,} \text{ and 60° C.} \int \Delta T dt} \quad (11)$$

$$= -\frac{-225.5 Ks}{329.5 Ks}$$

$$= 0.684$$

The achieved experimental efficiency (68.4%) was close to the theoretical value (75%). One reason for the difference may be heat loss through walls of the container. More detailed analysis showed that the heat dissipation loss became negligible (about 1%) when the system dimension increased to about one meter, suggesting that the experimental efficiency could reach about 74%. It is believed that by further increasing the number of reservoirs, heat recuperation efficiency could exceed 80%.

Step-Wise Design with Heat Exchangers Instead of Thermal Reservoirs

The design and experiments above demonstrate that heat recuperation efficiency of 70% may be reasonable. Thermal reservoirs at different temperatures can be made through mixing hot water and water at ambient temperature with different ratios. This method does not result in any energy loss. However, it may be more practical and compact to use heat exchangers to create HTFs at different temperatures for heat exchange with TREC cells. In the following part, the heat recuperation efficiency of a system with heat exchangers instead of thermal reservoirs at intermediate temperatures is analyzed. Although the overall efficiency becomes lower as extra loss exists due to effectiveness of heat exchangers, the analysis shows that the design is capable of achieving efficiency of 60-70%.

Figure 26:
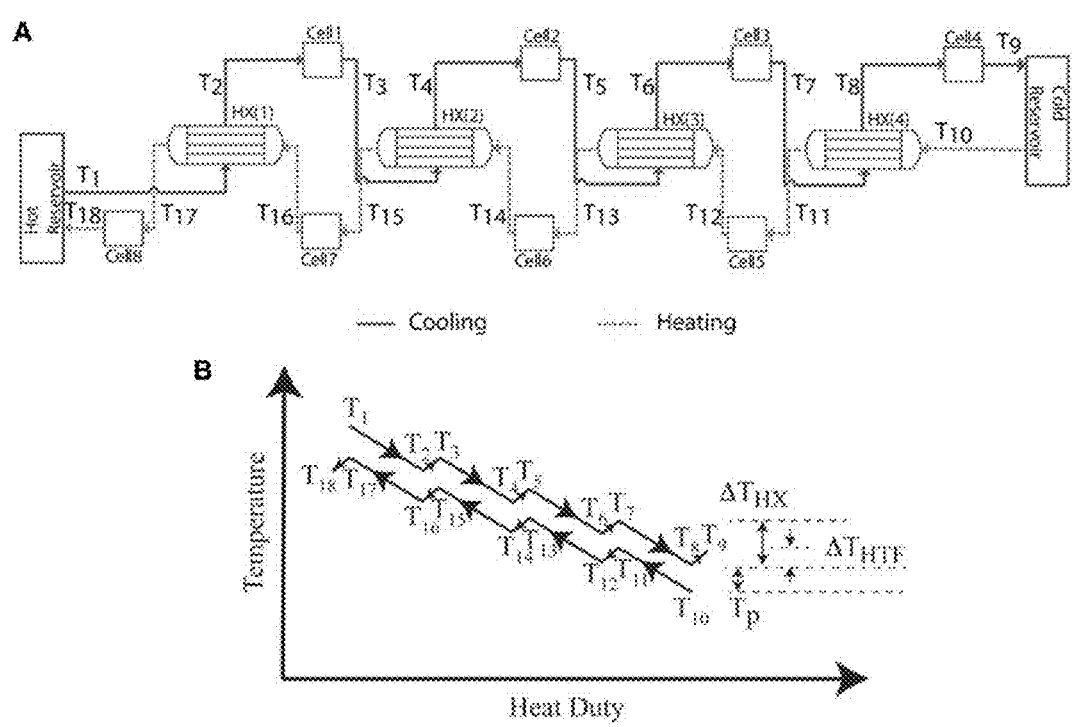
FIGS. 26A-26B are, according to some embodiments: (a) an exemplary schematic illustration of a design for heat recuperation with heat exchangers; and (b) an exemplary pinch diagram of temperature as a function of heat duty for a heat recuperation cycle at a given time.

The system structure is presented in FIG. 26. This figure shows the case with eight TREC cells and four heat exchangers (HXs, n=4), although systems may use any number of additional cells and HXs to increase efficiency. In this design, two HTF streams are utilized to transport thermal energy from hot cells to cold cells. Each cell in this configuration undergoes a transient heat transfer with the HTF.

In this design, each cell is cooled/heated by multiple steps with HTFs at the outlet of the HXs, which act as the thermal reservoirs described above. Cells 1-4 are in the cooling process, and Cells 5-8 are in the heating process. Two reservoirs, one at high temperature ($T_1$) and one at ambient temperature ($T_{10}$), are utilized to assist the heat transfer process.

Starting from left to right, in this example, an HTF with the temperature of $T_1$ is introduced in HX1, and its temperature at the outlet is reduced by $\Delta T_{HX}$ (e.g. $T_1 - T_2$). In this exemplary arrangement, the HTF exchanges heat with Cell 1, and its temperature is increased by $\Delta T_{HTF}$ (e.g. $T_3 - T_2$) to recuperate some of the thermal energy of Cell 1. Subsequently, the HTF flows through other HXs and cells in sequence, going through the same heat transfer processes at lower temperatures before exiting the recuperation step at a temperature of $T_9$. On the other side, in this example, the HTF with the inlet temperature of $T_{10}$ is introduced in HX4, absorbs thermal energy and then flows through cell (5) transferring some of its thermal energy to the cell. The temperature of the HTF drops by $\Delta T_{HTF}$ in this process. Then, it flows through other HXs and cells in sequence, undergoing the same heat transfer processes at higher temperatures. The corresponding pinch diagram is shown in FIG. 26B. At the end of this step, the temperatures of the cells become the same as that of the HTFs. The temperatures of cells 1-4 are $T_3$, $T_5$, $T_7$ and $T_9$, while the temperatures of cells 5-8 are $T_{12}$, $T_{14}$, $T_{16}$ and $T_{18}$. In this way, heat exchange happens between cells with small temperature difference (e.g. cell 3 and 5), and thus higher recuperation efficiency is realized. After this step, cells are disconnected from that stream and connected to another HX for the next recuperation step. Connection and disconnection are realized by automatic valves in the practical system.

This heat recuperation method can be further developed to a practical continuous procedure that contains all four steps (discharge, heating, charge and cooling) in the cycle, which will be explained below.

Heat recuperation efficiency can be defined as:

$$\eta_{HX} = \frac{\text{Heat absorbed by the } n \text{ cold cells} -}{\text{Energy extracted from the hot reservoir}} \over {\text{Heat rejected in cooling the } n \text{ hot cells}} \quad (12)$$

As heat recuperation is a cyclic process, the system can be analyzed by considering only energy change in a certain step. Assuming all cells and the temperature difference between cells are identical, the efficiency is written as:

$$\eta_{HX} = \frac{n \int MC_{cell} dT_{cell} - \int \dot{m} C_{HTF}(T_1 - T_{18}) dt}{n \int \dot{m} C_{HTF} \Delta T_{HTF} dt} \quad (13)$$

where $T_{18}$ is the temperature of THF flowing into the hot reservoir. M is the mass of a cell and $C_{cell}$ is the specific heat of a cell (J Kg$^{-1}$ K$^{-1}$). $T_{cell}$ is the temperature of a cell. $\dot{m}$ is the flow rate of HTF in the unit of kg s$^{-1}$. $C_{HTF}$ is the specific heat of the HTF (J Kg$^{-1}$ K$^{-1}$). $\Delta T_{HTF}$ is the temperature difference of HTF before and after heat exchange with the cell. The integral is from the beginning to the end of one step. If the effectiveness of heat exchange between cells and HTFs is 1:

$$\int MC_{cell} dT_{cell} = \int \dot{m} C_{HTF} \Delta T_{HTF} dt \quad (14)$$

From FIG. 26B, $$T_1 - T_{18} = T_p + \Delta T_{HTF} \quad (15)$$

Suppose that $\dot{m}$ and $C_{cell}$ are constant during heat recuperation. Applying formula (14) and (15) to (13) results in:

$$\eta_{HX} = \frac{\int [(n-1)\Delta T_{HTF} - T_p] dt}{\int n \Delta T_{HTF} dt} = \frac{(n-1)\overline{\Delta T_{HTF}} - \overline{T_p}}{n \overline{\Delta T_{HTF}}} \quad (16)$$

where $\overline{\Delta T_{HTF}}$ and $\overline{T_p}$ are the time-averaged value of corresponding integrals. This equation illustrates that the system efficiency is $$\eta_{HX} = \frac{n-1}{n}$$

with ideal HXs ($T_p = 0$), which converges to the configuration with thermal reservoirs, since HTFs at outlets of HXs act as thermal reservoirs and there is no loss within HXs. In the ideal case, the two lines shown in FIG. 26B would be superpositioned. The effectiveness of a heat exchanger is defined as $$\varepsilon = \frac{\dot{q}}{\dot{q}_{max}} = \frac{\Delta T_{HX}}{\Delta T_{HX} + T_p} \approx \frac{\Delta T_{HX}}{\Delta T_{HX} + \overline{T_p}} \quad (17)$$

Thus, the pinch temperature difference can be expressed in terms of the effectiveness and replaced in the recuperation efficiency, $$\eta_{HX} = \frac{(n-1)\overline{\Delta T_{HTF}} - \Delta T_{HX}\left(\frac{1-\varepsilon}{\varepsilon}\right)}{n \overline{\Delta T_{HTF}}} \quad (18)$$

If the temperature difference between the hot and the cold source is defined as $\Delta T = T_1 - T_{10} = \overline{T_p} + n\Delta T_{HX} - (n-1)\overline{\Delta T_{HTF}}$, then $$\Delta T_{HX} = \frac{\left(\frac{\Delta T}{n}\right) + \frac{n-1}{n}\overline{\Delta T_{HTF}}}{1 + \frac{1-\varepsilon}{n\varepsilon}} \quad (19)$$

Thus, $\eta_{HX}$ is only a function of the given parameters $\Delta T$, n, $\varepsilon$, and $\overline{\Delta T_{HTF}}$. The effectiveness of heat exchange between the HTF and the cell is assumed 1 as demonstrated experimentally in the previous section.

Figure 27:
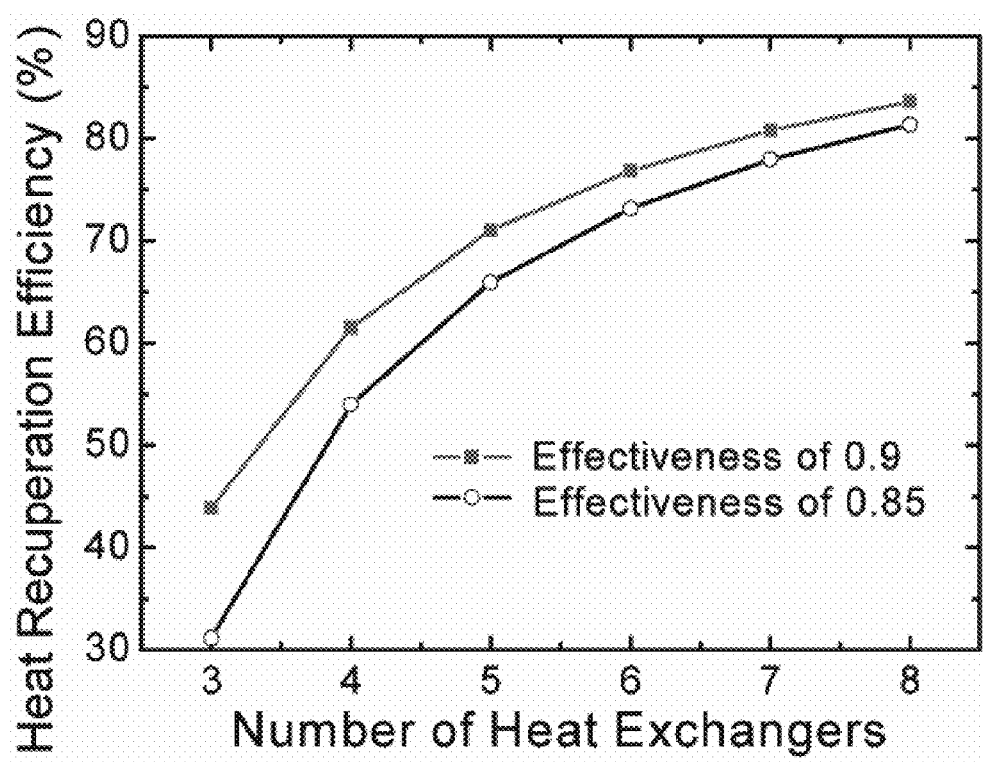
FIG. 27 is an exemplary plot of heat recuperation efficiency as a function of number of heat exchangers, according to some embodiments.

The dependence of $\eta_{HX}$ on the number of heat exchangers is plotted in FIG. 27 at two different heat exchanger effectiveness values (an effectiveness of 0.9 and an effectiveness of 0.85) that are available for commercial heat exchangers. This figure shows that over 50% heat recuperation efficiency can be achieved with n larger or equal to 4 and that 80% heat recuperation efficiency is achievable.

Continuous Operation

To realize a continuous process with heat exchangers, all cells in the system can be divided into four groups: discharge at $T_L$, heating, charge at $T_H$, and cooling. At each moment, a certain number of cells can be operated in each group, and each cell can undergo all four groups in a full cycle. For example, Table 1 shows the procedure for a system with two-step heating/cooling, where charge/discharge time is the same as cooling/heating time. In this procedure, each cell operates through the four steps with a time offset so that the whole process is continuous. Cool 1 represents the cooling process from $T_H$ to $(T_H+T_L)/2$, and Cool 2 is from $(T_H+T_L)/2$ to $T_L$. Heat 1 is from $T_L$ to $(T_H+T_L)/2$, and Heat 2 is from $(T_H+T_L)/2$ to $T_H$. C and DC represent charge and discharge, respectively. For each cell, the switch between different cooling steps and heating steps is realized by opening and closing valves between cells and heat exchangers.

TABLE 1

The procedure for two steps in heating/cooling and heating/cooling time the same as charge/discharge time

| Time Period | Cell No. 1 | 2 | 3 | 4 | 5 | 6 |
|---|---|---|---|---|---|---|
| 1 | Cool 1 | Cool 2 | DC at $T_L$ | Heat 1 | Heat 2 | C at $T_H$ |
| 2 | Cool 2 | DC at $T_L$ | Heat 1 | Heat 2 | C at $T_H$ | Cool 1 |
| 3 | DC at $T_L$ | Heat 1 | Heat 2 | C at $T_H$ | Cool 1 | Cool 2 |
| 4 | Heat 1 | Heat 2 | C at $T_H$ | Cool 1 | Cool 2 | DC at $T_L$ |
| 5 | Heat 2 | C at $T_H$ | Cool 1 | Cool 2 | DC at $T_L$ | Heat 1 |
| 6 | C at $T_H$ | Cool 1 | Cool 2 | DC at $T_L$ | Heat 1 | Heat 2 |
| 7 (same as 1) | Cool 1 | Cool 2 | DC at $T_L$ | Heat 1 | Heat 2 | C at $T_H$ |

In general, if the step number for heating/cooling is n, and the ratio of discharge/charge time to cooling/heating time of each step is m, then n cells are in heating and cooling, respectively, while m cells are in discharge and charge, respectively.

Example 4

This example describes an ion-selective-membrane-free electrochemical system comprising a nickel hexacynoferrate cathode and a silver/silver chloride anode. In TREC systems such as CuHCF//Cu$^{2+}$/Cu, an ion-selective membrane is typically used to avoid side reactions between CuHCF and Cu$^{2+}$. Ion-selective membranes may be expensive, and it may be difficult to completely block penetration of ions such as Cu$^{2+}$ during long-term operation. As described in this example, an ion-selective-membrane-free electrochemical system comprising a nickel hexacyanoferrate (NiHCF, KNi$^{II}$Fe$^{III}$(CN)$_6$) cathode and a silver/silver chloride anode was developed. The reactions of the two half cells were:

Cathode: KNi$^{II}$Fe$^{III}$(CN)$_6$+K$^+$+$e^-$→K$_2$Ni$^{II}$Fe$^{II}$(CN)$_6$ Anode: AgCl+$e^-$→Ag+Cl$^-$ In this system, ions involved in each electrode did not have side reactions with each other, so the ion-selective membrane was unnecessary and could be replaced by an inexpensive porous separator. The full cell had a thermogalvanic coefficient of −0.74±0.05 mV K$^{-1}$ and a heat-to-electricity conversion efficiency of 2.6% and 3.5% when cycled between 15° C. and 55° C. at a current rate of C/2 (20 mA g$^{-1}$) with assumed heat recuperation efficiency of 50% and 70%, respectively.

All chemicals for synthesis of nickel hexacyanoferrate (NiHCF) were purchased from Sigma Aldrich. NiHCF nanoparticles were synthesized using a simple solution approach by dropping 40 mL of 50 mM Ni(NO$_3$)$_2$ aqueous solution into 40 mL of 25 mM K$_3$Fe(CN)$_6$ aqueous solution under strong stirring at 50° C. at a speed of about one drop per second. The precipitation was centrifuged and dried at 70° C. overnight. The average size of as-synthesized particles was about 50 nm.

The NiHCF electrode was prepared by mixing 70 wt % NiHCF nanoparticles, 20 wt % Super P carbon black, and 10% polyvinylidene fluoride (PVDF, Kynar) in N-Methyl-2-pyrrolidone (NMP) and drop casting onto a carbon cloth disc electrode (Fuel Cell Store) at 90° C. The carbon cloth disc had a diameter of 1 cm, and the mass loading was about 3 mg NiHCF cm$^{-2}$.

An aqueous KCl solution was used as the electrolyte. As discussed in further detail below, the KCl concentration was selected to be 3 M. 0.2 M Ni(NO$_3$)$_2$ was added to stabilize NiHCF at high temperature based on the common ion effect. To optimize the performance of NiHCF, the pH of the electrolyte was tuned to 2 by adding HNO$_3$.

Figure 28:
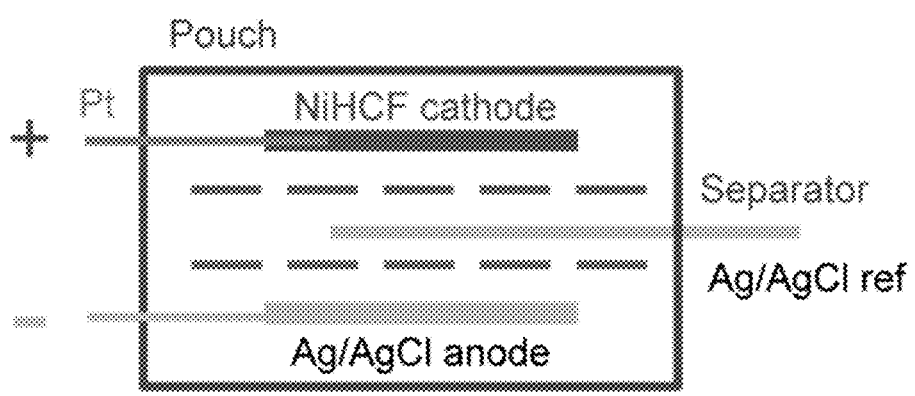
FIG. 28 is, according to some embodiments, an exemplary schematic illustration of a pouch cell.

The NiHCF electrode, an Ag/AgCl reference electrode made by precharging a silver rod in 1 M KCl solution, an Ag film, and the electrolyte were assembled in a pouch cell configuration, as shown in FIG. 28. Typically, about 500 μl of electrolyte was used in the cell. A glass fiber filter (Whatman) was used as a separator. The Ag film, which had a thickness of about 25 μm and a size of 2 cm by 2 cm, was partially charged inside the pouch cell to form an Ag/AgCl anode with a high porous surface area. Specifically, the Ag film was charged to 1 mAh and then discharged back by 0.5 mAh. The in situ formed Ag/AgCl film electrode then acted as the anode. Pt foil was used as the current collector for the cathode, and Ag foil was used as the current collector for the anode. The typical thickness of the pouch cell was 1-1.5 mm.

Temperature-dependent electrochemical characteristics were measured with a home-made temperature cycler. Thermocouples were attached to both sides of the pouch cell, and the temperatures of the thermocouples were acquired by a data acquisition board and controlled with fluctuations of less than about 0.1° C. The compact design allowed the temperature to be switched in less than three minutes so that other effects, such as self-discharge and dissolved oxygen, could be minimized.

Using the temperature cycler, electrode potentials of the NiHCF and Ag/AgCl electrodes were measured at different temperatures. The pouch cell configuration described above was used, and the potential of each electrode was measured using the reference Ag/AgCl electrode exposed to the same electrolyte in the pouch. The temperature was changed in the sequence of 55° C., 15° C., 45° C., 25° C., 35° C., and 15° C. Each temperature step lasted for eight minutes, and the voltage became steady after three minutes in each step, indicating that the system quickly reached equilibrium and that there was no obvious effect due to self-discharge. For thermal cycling between 55 and 15° C., the current acquired by the EC-lab software for the VMP3 tester was monitored. Once a step (charge or discharge) was finished as current became zero, the temperature was switched accordingly.

The dependence of full cell voltage on temperature was investigated for different states of charge (SOC) for a 3 M KCl cell. For specific charge capacities of 5, 15, 25, 35, 45, and 55 mAh g$^{-1}$, where 0 mAh g$^{-1}$ represented the fully discharged state, it was found that full cell voltage was linearly related to temperature in the range of 15 to 55° C., indicating that thermogalvanic coefficient α was constant in that temperature range.

The dependence of thermogalvanic coefficient α (mV K$^{-1}$) of the full cell on specific charge capacity (mAh g$^{-1}$) at KCl concentrations ([KCl]) of 1 M, 2 M, 3 M, and 4 M was also investigated. For all KCl concentrations, it was found that α showed an inverse bell shape against specific charge capacity. α was flat for specific charge capacities in the range of 10-50 mAh g$^{-1}$, but its absolute value became smaller when the system approached a fully charged or a fully discharged state. Moreover, it was found that lower KCl concentrations led to more negative temperature coefficients for all specific charge capacities, which may have been a result of changes in K$^+$ and Cl$^-$ activity.

For example, the dependence of thermogalvanic coefficient α at 50% SOC on [KCl] was investigated and found to show a trend consistent with the derivation of α from the Nernst equation:

$$E = E_0 + \frac{RT}{F}\ln([K^+][Cl^-]) \qquad (20)$$

$$\alpha = \alpha_0 + \frac{R}{F}\ln([K^+][Cl^-]) \qquad (21)$$

$$= \alpha_0 + 0.0862 \text{ mV K}^{-1}\ln([K^+][Cl^-])$$

where E was the electrode potential, R was the ideal gas constant, and F was the Faraday constant (96485 C mol$^{-1}$). $E_0$ and $\alpha_0$ were the electrode potential and thermogalvanic coefficient with unit activity of ions for a certain SOC. The activities of the solid phases, which were assumed to be 1, were not shown in the equations. The activity coefficients of the ions were assumed to be 1, so the activities of the ions were replaced by concentration. While the experimental dependence of α on [KCl] appeared to generally be consistent with the dependence α on [KCl] derived from the Nernst equation, some deviation may have arisen from the activity coefficient and influence of Ni$^{2+}$, which could also be inserted into NiHCF. The thermogalvanic coefficient mainly came from the half cell of NiHCF, as previous studies showed that the thermogalvanic coefficient of Ag/AgCl was 0.22-0.26 mV K$^{-1}$ with 1 M KCl and 0.12 mV K$^{-1}$ with 4 M KCl. The dependence of α on KCl concentration led to a trade-off between voltage gap (|αΔT|) and heat capacity. Since K$^+$ and Cl$^-$ were stored in the electrolyte, higher [KCl] indicated a smaller amount of KCl electrolyte was required and thus less energy was needed to heat the system. However, it also reduced the absolute value of α and the voltage gap between discharge and charge (|αΔT|).

To estimate the optimized concentration of KCl electrolyte, the efficiencies at different KCl concentrations were calculated and listed in Table 2. The thermogalvanic coefficients at different [KCl] were experimentally obtained as the value at 50% state of charge. The voltage gap was the average difference between discharge and charge voltage after taking overpotential into account. 12 mV was used for the overpotential based on data at 1 C and C/2 rates. The heat capacities of KCl electrolyte at all concentrations were assumed to be 4.0 J cm$^{-3}$ K$^{-1}$. The heat capacities of NiHCF, Ag and the KCl electrolyte were taken into account. 3 M KCl was determined to be the optimal concentration, as it resulted in the highest efficiencies.

TABLE 2

Estimation of heat-to-electricity efficiency at different [KCl]

| [KCl] (M) | thermogalvanic coefficient α (mV K$^{-1}$) | αΔT (mV) | voltage gap (mV) | W (mWh g$^{-1}$) | $Q_H$ (mWh g$^{-1}$) | $C_p$ΔT (mWh g$^{-1}$) | Efficiency with $\eta_{HR}$ = 50% (%) | Efficiency with $\eta_{HR}$ = 70% (%) |
|---|---|---|---|---|---|---|---|---|
| 1 | -1.04 | 41.6 | 29.6 | 1.07 | 12.3 | 72.3 | 2.20 | 3.14 |
| 2 | -0.80 | 32 | 20 | 0.72 | 9.45 | 42.5 | 2.35 | 3.25 |
| 3 | -0.75 | 30 | 18 | 0.65 | 8.86 | 32.5 | 2.58 | 3.48 |
| 4 | -0.63 | 25.2 | 13.2 | 0.48 | 7.44 | 27.5 | 2.24 | 3.03 |

A thermal cycle of a NiHCF//Ag/AgCl full cell with 3 M KCl/0.2 M Ni(NO$_3$)$_2$ electrolyte was investigated. The temperature was well controlled, with fluctuations of less than 0.1° C. At the end of each discharge or charge, the cell was rested for three minutes to allow the temperature to change and the system to reach equilibrium. The dependence of electrode potentials on specific capacity at current rates of 1 C (40 mA g$^{-1}$) and C/2 (20 mA g$^{-1}$) was investigated. All electrode potentials were measured versus the Ag/AgCl reference electrode exposed to the same electrolyte in the pouch cell. The current rate and specific capacity were based on the mass of NiHCF. At both 1 C and C/2 rates, the battery was heated to 55° C. and charged to 640.0 mV. The battery was then cooled to 15° C., which increased the open circuit voltage (OCV) to 660.1 mV for 1 C and 661.6 mV for C/2. Next, the cell was discharged to 485 mV at 15° C. and then heated to 55° C. again. The electricity produced in one cycle (W) normalized to the mass of NiHCF could be written as:

$$W = Q_{dis}\bar{V}_{dis} - Q_{ch}\bar{V}_{ch} = Q_{dis}(\bar{V}_{dis} - \bar{V}_{ch}/CE) \qquad (22)$$

where Q was the specific capacity normalized to the mass of NiHCF and $\bar{V}$ was the average full cell voltage. The subscripts dis and ch indicated discharge and charge, respectively. CE was the coulombic efficiency, which was defined as $Q_{dis}/Q_{ch}$. From equation (22), it could be seen that in addition to large specific discharge capacity and voltage gap between discharge and charge, high coulombic efficiency was also important to achieve high energy output and conversion efficiency. $\bar{V}_{dis} - \bar{V}_{ch}$ and $\bar{V}_{dis} - \bar{V}_{ch}/CE$ were defined as the apparent and effective voltage gap, respectively, as the latter one directly determined the energy difference between discharge and charge.

For 1 C rate, in discharge, the average voltages of NiHCF and Ag/AgCl were 566.27 mV and 4.37 mV, respectively, and the specific capacity was 35.4 mAh g$^{-1}$ based on the mass of NiHCF. In charge, the average voltages of NiHCF and Ag/AgCl were 542.42 mV and -3.93 mV, respectively, and the specific capacity was 35.5 mAh g$^{-1}$. As a result, the apparent and effective voltage gaps were 15.8 and 14.2 mV, respectively. The total specific discharge and charge energies were 19.90 mWh g$^{-1}$ and 19.40 mWh g$^{-1}$, respectively; thus, 0.50 mWh g$^{-1}$ of heat energy was converted to electricity. The heat-to-electricity conversion efficiency ($\eta$) was calculated as:

$$\eta = \frac{W}{Q_H + Q_{HR}} = \frac{W}{T_H \Delta S + Q_{HR}} = \frac{W_{discharge} - W_{charge}}{|\alpha| T_H Q_c + (1 - \eta_{HR}) C_p \Delta T} \quad (23)$$

where W was the difference between discharge and charge energy in a cycle. $Q_{HR}$ was the extra energy needed to heat the cell. $Q_c$ was the discharge capacity at $T_H$, $C_p$ was the heat capacity of the cell. $\eta_{HR}$ was the heat recuperation efficiency, indicating how much energy rejected in the cooling process could be reused for the next heating process. Values of 50-70% were considered to be reasonable for $\eta_{HR}$.

An example efficiency calculation for the 3 M KCl electrolyte cell with a $T_H=55°$ C.$=328$ K is shown. To simplify the calculations, all values were normalized to the mass of NiHCF. W was calculated based on the full cell voltage curves as $W_{discharge}-W_{charge}$. Its value was 0.50 mWh g$^{-1}$ based on the mass of NiHCF. The value of $Q_H$ was calculated as follows:

$$Q_H = |\alpha| T_H Q_c = 0.74 \text{ mV K}^{-1} \times 328 \text{ K} \times 35.5 \text{ mAh g}^{-1} = 8.62 \text{ mWh g}^{-1}$$

In calculating $C_p$, the specific heat of NiHCF, Ag and 3 M KCl electrolyte were considered. The specific heat of NiHCF was 1.1 J g$^{-1}$ based on differential scanning calorimetry (DSC) measurement. For 1 gram of NiHCF electrode, the amount of 3 M KCl electrolyte needed was 35.5 mAh/(96485 C mol$^{-1}$*3 mol L$^{-1}$)=0.442 mL. The specific heat of 3 M KCl was 3.1 J g$^{-1}$ K$^{-1}$ based on DSC measurement, and its density was 1.22 g mL$^{-1}$. The amount of Ag needed was 35.5 mAh/(96.485 C mol$^{-1}$/108 g mol$^{-1}$)=0.133 g. The specific heat of Ag was 0.24 J g$^{-1}$ K$^{-1}$. Thus, the heat capacity based on the mass of NiHCF was 1.1+ 3.1*1.23*0.442+0.133*0.24=2.82 J g$^{-1}$ K$^{-1}$. As $\Delta T=40$ K, $C_p \Delta T=112.8$ J g$^{-1}$=31.3 mWh g$^{-1}$.

Consequently the heat-to-electricity conversion efficiency with $\eta_{HR}=50\%$ was:

$$\eta = \frac{0.50}{8.62 + 3.13 \times (1 - 0.5)} = 2.1\%$$

Heat-to-electricity efficiency values were also calculated for current rates of 1 C and C/2 and for heat recuperation efficiencies of 0%, 50%, and 70%. These values are shown in Table 3. For example, for a 3 M [KCl] cell at a 1 C (40 mA g$^{-1}$) current rate, $Q_H=8.617$ mWh g$^{-1}$ with $\alpha$ of −0.74 mV K$^{-1}$. The total heat capacity of electrolytes and electrodes was 2.84 J g$^{-1}$ K$^{-1}$, and $C_p\Delta T=31.6$ mWh g$^{-1}$ for temperature cycling between 15 and 55° C. Based on these values, $\eta$ reached 1.3%, 2.1% and 2.8% for $\eta_{HR}$ of 0%, 50% and 70%.

For a 3 M KCl cell at C/2 rate (20 mA g$^{-1}$), the average discharge voltage increased to 565.7 mV, and the average charge voltage decreased to 545.8 mV, as lower current led to smaller overpotential. The specific capacity also increased to 36.0 mAh g$^{-1}$ for discharge and 36.1 mAh g$^{-1}$ for charge. Consequently, the discharge and charge energy were 20.35 mWh g$^{-1}$ and 19.71 mWh g$^{-1}$, respectively. The energy converted to electricity reached 0.65 mWh g$^{-1}$, 29% higher than that at 1 C rate, and the corresponding $\eta$ were 1.6%, 2.6% and 3.5% for $\eta_{HR}$ of 0%, 50% and 70%.

TABLE 3

Calculation of conversion efficiency at different current rate*

| Current rate | $\overline{V}_{dis}$ (mV) | $\overline{V}_{ch}$ (mV) | $Q_{dis}$ (mAh g$^{-1}$) | CE (%) | W (mWh g$^{-1}$) | $Q_H$ (mWh g$^{-1}$) | $C_p\Delta T$ (mWh g$^{-1}$) | Conversion efficiency at different $\eta_{HR}$ | | |
|---|---|---|---|---|---|---|---|---|---|---|
| | | | | | | | | 0% | 50% | 70% |
| 1 C | 561.9 | 546.4 | 35.4 | 99.72 | 0.50 | 8.62 | 31.6 | 1.3 | 2.1 | 2.8 |
| C/2 | 565.7 | 545.8 | 36.0 | 99.72 | 0.65 | 8.76 | 32.1 | 1.6 | 2.6 | 3.5 |

*All symbols are the same as those in equations (22) and (23)

For long term operation, cycle life of TREC is important. The specific capacity, coulombic efficiency, average charge/discharge voltage, and thermal-to-electricity efficiency were investigated against cycle number. The cell was cycled at 1 C rate for the first 35 cycles, then at C/2 for 50 cycles. The capacity fading rate was on average 0.10% and 0.18% per cycle at 1 C and C/2, respectively. The higher capacity fading at C/2 was likely due to a longer operation time at 55° C. The Coulombic efficiency was 99.2% at the beginning, but rapidly increased to about 99.5-99.7% after 5 cycles. The average charge/discharge voltage showed a steady increasing trend of about 0.1 mV per cycle. The apparent voltage gap between charge and discharge ($\overline{V}_{dis}-\overline{V}_{ch}$) was about 4 mV higher at C/2 compared to 1 C rate, as a result of lower overpotential. Moreover, the effective voltage gap ($\overline{V}_{dis}-\overline{V}_{ch}$/CE) was lower than the apparent voltage gap ($\overline{V}_{dis}-\overline{V}_{ch}$) due to non-100% Coulombic efficiency. The difference was about 5 mV at the beginning and decreased to about 2 mV as the Coulombic efficiency gradually increased and stabilized around 99.7%. The absolute conversion efficiency ($\eta$) was a synergistic result of the three factors above based on equation (22). At 70% heat recuperation, $\eta$ was 2.2% in the first cycle due to low Coulombic efficiency, and gradually increased to 2.9% after 30 cycles. The following cycles at C/2 showed $\eta$ of 3.5% at the beginning, with $\eta$ decreasing slowly to 2.9% after 50 cycles. This may have been because CE was steady in this part and the major fading factor was the decreasing capacity and apparent voltage gap. The fading rate was reduced, as evaporation was fully eliminated by employing pouch cell configuration.

A conversion of the efficiencies above to equivalent ZT values can help evaluate the performance of TREC cells against thermoelectric (TE) cells. For a temperature cycle between 15 and 55° C., at a heat recuperation efficiency of 70%, the efficiency achieved at 1 C was 2.8%, and the efficiency achieved at C/2 was 3.5%. A TE device would need to reach ZT of 1.4 and 2.1 to achieve the same efficiencies for the same high and low temperatures. At a heat recuperation efficiency of 50%, the efficiency achieved at 1 C was 2.1% and at C/2 was 2.6%. The corresponding effective ZT values were 0.94 and 1.3. State-of-the-art TE materials, however, have a ZT of 1-1.5 for temperatures below 100° C.

A possible concern of the NiHCF//AgCl/Ag system may be the cost of Ag. For Ag, the mass loading required 0.7 mg Ag cm$^{-2}$. Even if 5 mg cm$^{-2}$ were needed in a commercial cell due to increased capacity per area, then 50 grams would be needed per square meter, which costs about $35 per square meter ($700 per kilogram). In contrast, the cost of a Nafion ion-selective membrane is about $200 per square meter. Even with the high mass loading of 5 mg per square centimeter, the cost would still be less than 20% of Nafion membranes. The cost could be further reduced by replacing Ag with inexpensive electrodes.

In summary, an ion-selective-membrane-free electrochemical system with nickel hexacyanoferrate (NiHCF, $KNi^{II}Fe^{III}(CN)_6$) cathode and Ag/AgCl anode was demonstrated to convert low-grade heat to electricity. As ions involved in each electrode did not interfere with the opposite electrode, expensive ion-selective membranes were not needed in this system. The system showed a heat-to-electricity conversion efficiency of 3.5% under 70% heat recuperation when it was cycled between 15 and 55° C. at a C/2 current rate. The system also showed adequate cycle life compared to previous results.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
a first electrode comprising a first electrochemically active material having a first thermogalvanic coefficient and a second electrode comprising a second electrochemically active material having a second thermogalvanic coefficient, wherein:
the electrochemical cell is configured to be discharged at a discharge voltage and at a discharge temperature at or below about 200° C. such that the first electrochemically active material is at least partially electrochemically consumed;
the electrochemical cell is configured to regenerate first electrochemically active material from a product of at least a portion of the first electrochemically active material consumed during discharge at a regeneration voltage that is at least about 5 mV lower than the discharge voltage and a regeneration temperature that is different than the discharge temperature and at or below about 200° C. such that at least a portion of the regeneration of the first electrochemically active material is driven by a change in temperature of the electrochemical cell, wherein the regeneration of the first electrochemically active material occurs via a process in which reverse reactions of electrochemical reactions that occur during discharge proceed; and at least one of the first electrochemically active material and the second electrochemically active material is in a solid phase in both a reduced state and an oxidized state, wherein the absolute value of the difference between the first thermogalvanic coefficient of the first electrochemically active material and the second thermogalvanic coefficient of the second electrochemically active material is at least about 0.5 millivolts/Kelvin.

2. The electrochemical cell of claim 1, wherein the at least one of the first electrochemically active material and the second electrochemically active material in the solid phase comprises particles.

3. The electrochemical cell of claim 1, wherein the at least one of the first electrochemically active material and the second electrochemically active material in the solid phase is suspended in a fluid, wherein the at least one of the first and second electrodes comprising the electrochemically active material in the solid phase is a flowable electrode.

4. The electrochemical cell of claim 1, wherein the at least one of the first electrochemically active material and the second electrochemically active material in the solid phase comprises an intercalation compound, wherein the intercalation compound comprises a metal oxide, a metal chalcogenide, a Prussian Blue analogue, and/or a graphitic compound.

5. The electrochemical cell of claim 1, wherein the at least one of the first electrochemically active material and the second electrochemically active material in the solid phase is capable of undergoing a conversion reaction and/or comprises an elemental metal.

6. The electrochemical cell of claim 1, wherein the electrochemical cell is configured to regenerate first electrochemically active material from a product of at least a portion of the first electrochemically active material consumed during discharge at a regeneration voltage that is from about 5 millivolts to about 10 volts lower than the discharge voltage.

7. The electrochemical cell of claim 1, wherein the electrochemical cell is located in an ambient environment having a temperature, and the electrochemical cell is discharged at a discharge temperature that is within about 5° C. of the temperature of the ambient environment and/or the electrochemical cell is regenerated at a regeneration temperature that is within about 5° C. of the temperature of the ambient environment.

8. The electrochemical cell of claim 1, wherein the temperatures of the first and second electrodes of the electrochemical cell are within about 5° C. of each other during regeneration and/or discharge.

9. The electrochemical cell of claim 1, wherein the specific heat capacity of at least one of the first electrode and the second electrode is less than about 5 J/g K.

10. The electrochemical cell of claim 1, wherein a charge capacity of at least one of the first electrode and the second electrode is greater than about 30 mAh/g.

11. The electrochemical cell of claim 1, wherein the regeneration temperature is at least about 5° C. different than the discharge temperature.

12. A system comprising a first electrochemical cell of claim 1 and further comprising a second electrochemical cell to which heat is transferred from the first electrochemical cell.

13. The system of claim 12, wherein the second electrochemical cell is configured to be regenerated while the first electrochemical cell is discharged.

14. A system comprising a first plurality of electrochemical cells, wherein each of the first plurality of electrochemical cells is an electrochemical cell of claim 1, and a second plurality of electrochemical cells, wherein heat is transferred from each of the first plurality of electrochemical cells to each of the second plurality of electrochemical cells.

15. An electrochemical cell, comprising:
a first electrode comprising a first electrochemically active material having a first thermogalvanic coefficient, and a second electrode comprising a second electrochemically active material having a second thermogalvanic coefficient, wherein:
the electrochemical cell is configured to be discharged at a discharge temperature such that the first electrochemically active material is at least partially electrochemically consumed, and
the electrochemical cell is configured to regenerate first electrochemically active material from a product of at least a portion of the first electrochemically active material consumed during discharge at a temperature different than the discharge temperature, such that at least a portion of the regeneration of the first electrochemically active material is not driven by the application of electrical current external to the electrochemical cell and is driven by a change in temperature of the electrochemical cell, wherein the regeneration of the first electrochemically active material occurs via a process in which reverse reactions of electrochemical reactions that occur during discharge proceed;
wherein the electrochemical cell is configured such that the discharge and regeneration can occur without the application of an external electrical current,
wherein the absolute value of the difference between the first thermogalvanic coefficient of the first electrochemically active material and the second thermogalvanic coefficient of the second electrochemically active material is at least about 0.5 millivolts/Kelvin, and
wherein electricity is generated during each of the discharge and regeneration steps.

* * * * *